INVENTOR
KARL K. WOMACK
BY Ronald J. Clark
ATTORNEY

March 10, 1970 K. K. WOMACK 3,500,337

DATA HANDLING SYSTEM EMPLOYING A FULL WORD MAIN MEMORY TRANSFER WITH INDIVIDUAL INDIRECT BYTE ADDRESSING AND PROCESSING

Filed Sept. 27, 1967

35 Sheets-Sheet 4

March 10, 1970 K. K. WOMACK 3,500,337

DATA HANDLING SYSTEM EMPLOYING A FULL WORD MAIN MEMORY TRANSFER WITH INDIVIDUAL INDIRECT BYTE ADDRESSING AND PROCESSING

Filed Sept. 27, 1967

35 Sheets-Sheet 5

March 10, 1970 K. K. WOMACK 3,500,337

DATA HANDLING SYSTEM EMPLOYING A FULL WORD MAIN MEMORY TRANSFER WITH INDIVIDUAL INDIRECT BYTE ADDRESSING AND PROCESSING

Filed Sept. 27, 1967 35 Sheets-Sheet 6

March 10, 1970 K. K. WOMACK 3,500,337

DATA HANDLING SYSTEM EMPLOYING A FULL WORD MAIN MEMORY TRANSFER WITH INDIVIDUAL INDIRECT BYTE ADDRESSING AND PROCESSING

Filed Sept. 27, 1967 35 Sheets-Sheet 7

March 10, 1970 K. K. WOMACK 3,500,337

DATA HANDLING SYSTEM EMPLOYING A FULL WORD MAIN MEMORY TRANSFER WITH INDIVIDUAL INDIRECT BYTE ADDRESSING AND PROCESSING

Filed Sept. 27, 1967 35 Sheets-Sheet 8

March 10, 1970 K. K. WOMACK 3,500,337

DATA HANDLING SYSTEM EMPLOYING A FULL WORD MAIN MEMORY TRANSFER WITH INDIVIDUAL INDIRECT BYTE ADDRESSING AND PROCESSING

Filed Sept. 27, 1967 35 Sheets-Sheet 9

March 10, 1970 K. K. WOMACK 3,500,337

DATA HANDLING SYSTEM EMPLOYING A FULL WORD MAIN MEMORY TRANSFER WITH INDIVIDUAL INDIRECT BYTE ADDRESSING AND PROCESSING

Filed Sept. 27, 1967

35 Sheets-Sheet 10

March 10, 1970 K. K. WOMACK 3,500,337

DATA HANDLING SYSTEM EMPLOYING A FULL WORD MAIN MEMORY TRANSFER WITH INDIVIDUAL INDIRECT BYTE ADDRESSING AND PROCESSING

Filed Sept. 27, 1967 35 Sheets-Sheet 12

March 10, 1970 K. K. WOMACK 3,500,337

DATA HANDLING SYSTEM EMPLOYING A FULL WORD MAIN MEMORY TRANSFER WITH INDIVIDUAL INDIRECT BYTE ADDRESSING AND PROCESSING

Filed Sept. 27, 1967 35 Sheets-Sheet 13

March 10, 1970 K. K. WOMACK 3,500,337

DATA HANDLING SYSTEM EMPLOYING A FULL WORD MAIN MEMORY TRANSFER WITH INDIVIDUAL INDIRECT BYTE ADDRESSING AND PROCESSING

Filed Sept. 27, 1967

35 Sheets-Sheet 14

March 10, 1970 K. K. WOMACK 3,500,337

DATA HANDLING SYSTEM EMPLOYING A FULL WORD MAIN MEMORY TRANSFER WITH INDIVIDUAL INDIRECT BYTE ADDRESSING AND PROCESSING

Filed Sept. 27, 1967 35 Sheets-Sheet 17

March 10, 1970 K. K. WOMACK 3,500,337

DATA HANDLING SYSTEM EMPLOYING A FULL WORD MAIN MEMORY TRANSFER WITH INDIVIDUAL INDIRECT BYTE ADDRESSING AND PROCESSING

Filed Sept. 27, 1967 35 Sheets-Sheet 18

March 10, 1970 K. K. WOMACK 3,500,337

DATA HANDLING SYSTEM EMPLOYING A FULL WORD MAIN MEMORY TRANSFER WITH INDIVIDUAL INDIRECT BYTE ADDRESSING AND PROCESSING

Filed Sept. 27, 1967

35 Sheets-Sheet 20

March 10, 1970 K. K. WOMACK 3,500,337

DATA HANDLING SYSTEM EMPLOYING A FULL WORD MAIN MEMORY TRANSFER WITH INDIVIDUAL INDIRECT BYTE ADDRESSING AND PROCESSING

Filed Sept. 27, 1967 35 Sheets-Sheet 21

March 10, 1970 K. K. WOMACK 3,500,337

DATA HANDLING SYSTEM EMPLOYING A FULL WORD MAIN MEMORY TRANSFER WITH INDIVIDUAL INDIRECT BYTE ADDRESSING AND PROCESSING

Filed Sept. 27, 1967 35 Sheets-Sheet 22

March 10, 1970 K. K. WOMACK 3,500,337
DATA HANDLING SYSTEM EMPLOYING A FULL WORD MAIN MEMORY TRANSFER WITH INDIVIDUAL INDIRECT BYTE ADDRESSING AND PROCESSING
Filed Sept. 27, 1967 35 Sheets-Sheet 26

March 10, 1970 K. K. WOMACK 3,500,337

DATA HANDLING SYSTEM EMPLOYING A FULL WORD MAIN MEMORY TRANSFER WITH INDIVIDUAL INDIRECT BYTE ADDRESSING AND PROCESSING

Filed Sept. 27, 1967 35 Sheets-Sheet 27

March 10, 1970 K. K. WOMACK 3,500,337

DATA HANDLING SYSTEM EMPLOYING A FULL WORD MAIN MEMORY TRANSFER WITH INDIVIDUAL INDIRECT BYTE ADDRESSING AND PROCESSING

Filed Sept. 27, 1967 35 Sheets-Sheet 28

March 10, 1970 K. K. WOMACK 3,500,337

DATA HANDLING SYSTEM EMPLOYING A FULL WORD MAIN MEMORY TRANSFER WITH INDIVIDUAL INDIRECT BYTE ADDRESSING AND PROCESSING

Filed Sept. 27, 1967

35 Sheets-Sheet 30

3,500,337

DATA HANDLING SYSTEM EMPLOYING A FULL WORD MAIN MEMORY TRANSFER WITH INDIVIDUAL INDIRECT BYTE ADDRESSING AND PROCESSING

Karl K. Womack, Endicott, N.Y., assignor to International Business Machines Corporation, Armonk, N.Y., a corporation of New York

Filed Sept. 27, 1967, Ser. No. 670,918

Int. Cl. G06f *1/00;* G11b *13/00*

U.S. Cl. 340—172.5 7 Claims

ABSTRACT OF THE DISCLOSURE

The present invention is directed toward a novel combination of elements for the plural manipulation of address indicia and is employed for effecting improved computer operation in processing incoming data. More specifically, the instant invention comprises a plurality of address registers which, taken collectively, are employed to store the current address of the next data to be processed. However, when taken individually, each of these addresses contains a portion of the current address, which portion is employed for a special purpose function. Each of the registers is responsive to certain circuitry which causes the updating of the address indicia held in the respective address register.

Cross-reference to related applications

A co-pending U.S. application entitled, "Storage Addressing Mechanism Having Plural Address Generating Paths," of W. P. Hanf et al. Ser. No. 670,917, filed Sept. 27, 1967 and assigned to the assignee of the present invention, describes in complete detail the access paths responsive to the registers employed in the instant invention. An additional co-pending U.S. application entitled "Data Handling Apparatus Employing an Active Storage Device With Plural Selective Read and Write Paths," of K. A. Bell et al. Ser. No. 670,919, filed Sept. 27, 1967 and assigned to the assignee of the present invention, describes in complete detail the selective read and write modes required to store a single byte selected by the present invention.

Background of the invention

The present invention is directed toward a data handling and data manipulation circuit for increasing the speed of operation in a data processing system. This speed improvement is achieved basically through a broad function of transferring data by a plurality of bytes from a main storage device into an intermediate storage device and then changing to a second mode of operation of processing a single byte at a time. Several modes of operation are contained herein to take advantage of the various capabilities of the present combination of circuits.

Existing processing units are of varied design. These systems may include one which processes information in serial form or parallel form or various combinations of both. Depending upon the circuitry made available to the system, any number of bytes or words may be processed in parallel form or various combinations of both. However, in these systems, the arithmetic and logic portion of the system is capable of processing in parallel the number of words or bytes accessed from main memory. In general, this means that when a plurality of words are accessed from the main memory the remaining circuitry has the capability of manipulating this same number of words in parallel.

A new system, described in the K. A. Bell et al. application, provides a new combination of a main memory accessing mechanism for transferring a multi-byte word from main memory to an active storage device. Thereafter, processing is achieved by operating on each byte. The active storage device is a quick reaction memory due to its relatively small size. The present invention, therefore, is employed to designate and to control automatically which byte of the word is to be processed next. Versatility is required to maximize the processing capabilities of the present device for the many situations which may occur. Several various combinations of indirect addressing are described in detail hereinafter to cover circumstances or situations under which they can be advantageously employed. A complete inventory of descriptions covering each environment under which the present invention may be employed has not been attempted. Various generic situations are described in which the present combination of circuits can be advantageously employed. One skilled in the art can thereafter utilize the present invention in other environments to solve other problems.

Summary

The inventive concept herein described is embodied in a plurality of distinct and separately operable registers into which data is transferred from the program under which a processing system is being controlled. The data is identical in form but is operated on by circuitry associated with each respective register in a manner controlled by certain other mechanisms. Under certain defined circumstances, selected registers are employed for addressing data for its subsequent transfer and processing, while in other circumstances, it is advantageous to employ other of the registers. During the processing operation, the data is tested for various configurations and in response to each configuration, a separate mode of operation is performed by the processor. The various modes of operation all are directed toward one final function and that is the proper identification of the plurality of data words whereby the desired byte of a plurality of bytes is operated upon by the processing system. As an aid in understanding the operation of the present invention, the environment will be described in which the present invention operates.

Brief description of the several views of the drawings

The foregoing and other objects, features and advantages of the invention will be apparent from the following more particular description of a preferred embodiment of the invention, as illustrated in the accompanying drawings, wherein

FIGURE 2 shows the manner in which FIGURES 2*a* through 2*o* are combined;

FIGURES 2*a* through 2*o* show a more detailed block diagram of the instant invention;

FIGURE 3 shows the manner in which FIGURES 3*a* through 3*p* are combined;

FIGURES 3*a* through 3*p* show an embodiment of the indirect byte addressing mechanism in addition to other responsive circuits;

Detailed description

Figure 1:
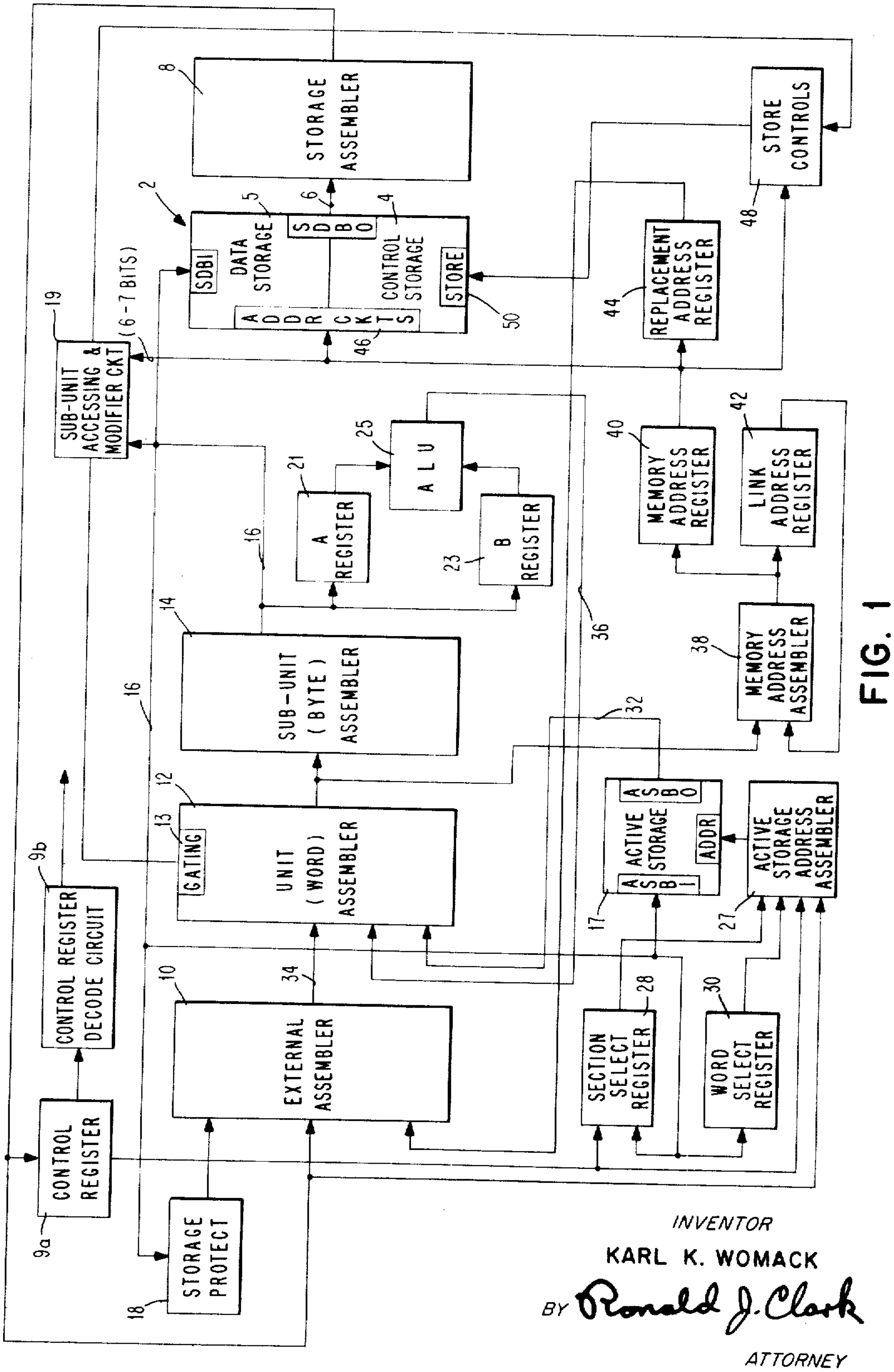
FIGURE 1 is a generalized block diagram of the system.

Referring to FIGURE 1, there can be seen a block diagram of a data processing system which can advantageously employ the present invention. A main storage circuit 2 is of standard design employing cores, transistor stages, or any other well-accepted storage medium as the mechanism for storing an individual bit in a storage word. The words employed in the present environment comprise four individual bytes of data. Each of the bytes comprises eight binary bits of information and one bit of information is held in one storage element. Therefore, upon each access to the main storage circuit 2, 32 bits of information are interrogated from or written into the 32 corresponding storage elements. The main storage circuit 2 performs a second function and that is to store the control words in a control storage area 4 integral with a data and program information storage area 5. As is well known, the purpose of the control words is to control the logic manipulation within the remaining circuit elements of the central processing system whereby the data contained in the data storage sub-section 5 is effectively processed.

All information read from main storage is placed on a storage data bus out 6 which transfers the words of information from main storage 2 to a storage data bus out assembler 8. The output of the assembler 8 is applied to a control register 9*a* and subsequently to a control decode circuit 9*b* and directly to an external assembler circuit 10. Control words read from the control storage area 4 are placed in the control register 9*a* and then decoded to bring up the proper gating and branching lines to perform the function indicated by the control word. Data or instructions read from the data storage area are gated into the external assembler 10. The data flow from the assembler 10 is thereafter under the control of the particular control word in command. Depending upon the particular control word presently being executed, the data is gated into a unit or word assembler 12 and thereafter selectively gated in response to a gating circuit 13 into a sub-unit or byte assembler 14. The output of the sub-unit assembler 14 forms a main data bus 16. The main data bus 16 transfers words from the assembler 14 to an active storage circuit 17, an external register 18, a sub-unit accessing register and modifier circuit 19, and a pair of input registers 21 and 23. The registers 21 and 23 form the inputs to an arithmetic logic unit 25. The bus 16 forms an input to the main storage unit 2. The active storage unit 17 is a separate storage unit unrelated to main storage and comprises transistor storage elements for the storage of data. The selection of the transistor as the storage element is prompted out of the requirement that active storage have as fast an access time as is possible. The addressing of the active storage circuit 17 is accomplished by an active storage address assembler 27. The assembler 27 receives information from a plurality of sources including a section select register 28, a word select register 30, the storage assembler 8, the control register 9*a*, and the decode circuit 9*b*. The active storage X and Y drive lines are the output of the assembler 27. Data is fed into the active storage circuit 17 from the main data bus 16 and is read from active storage onto an active storage bus out 32 and is entered into the unit assembler 12.

The external assembler circuit 10 is a group of gating circuits that receive data words from the storage assembler 8 and a group of hardware registers, one of which is shown at 18. The output of the external assembler 10 is an external assembler bus out 34 which is applied to the unit or word assembler 12.

The unit assembler 12 is divided into four sets of latch type circuits; each set may hold one byte of data. The input to the word assembler 12 is from the external assembler 10, active storage bus out 32, and an arithmetic bus 36. The output of the unit assembler 12 is applied to the sub-unit assembler 14 and a memory address assembler 38. The output of the memory address assembler 38 is applied to a memory address register 40 and a link address register 42. The output of the register 40 is applied to a replacement address register 44 and to an address circuit 46 in main storage 2. The output of the register 40 is applied to a store control circuit 48 which in turn activates a store circuit 50 with control signals. The output of the register 42 is applied to the assembler 38. The output of the register 44 is applied to the assembler 10.

Figure 2A:
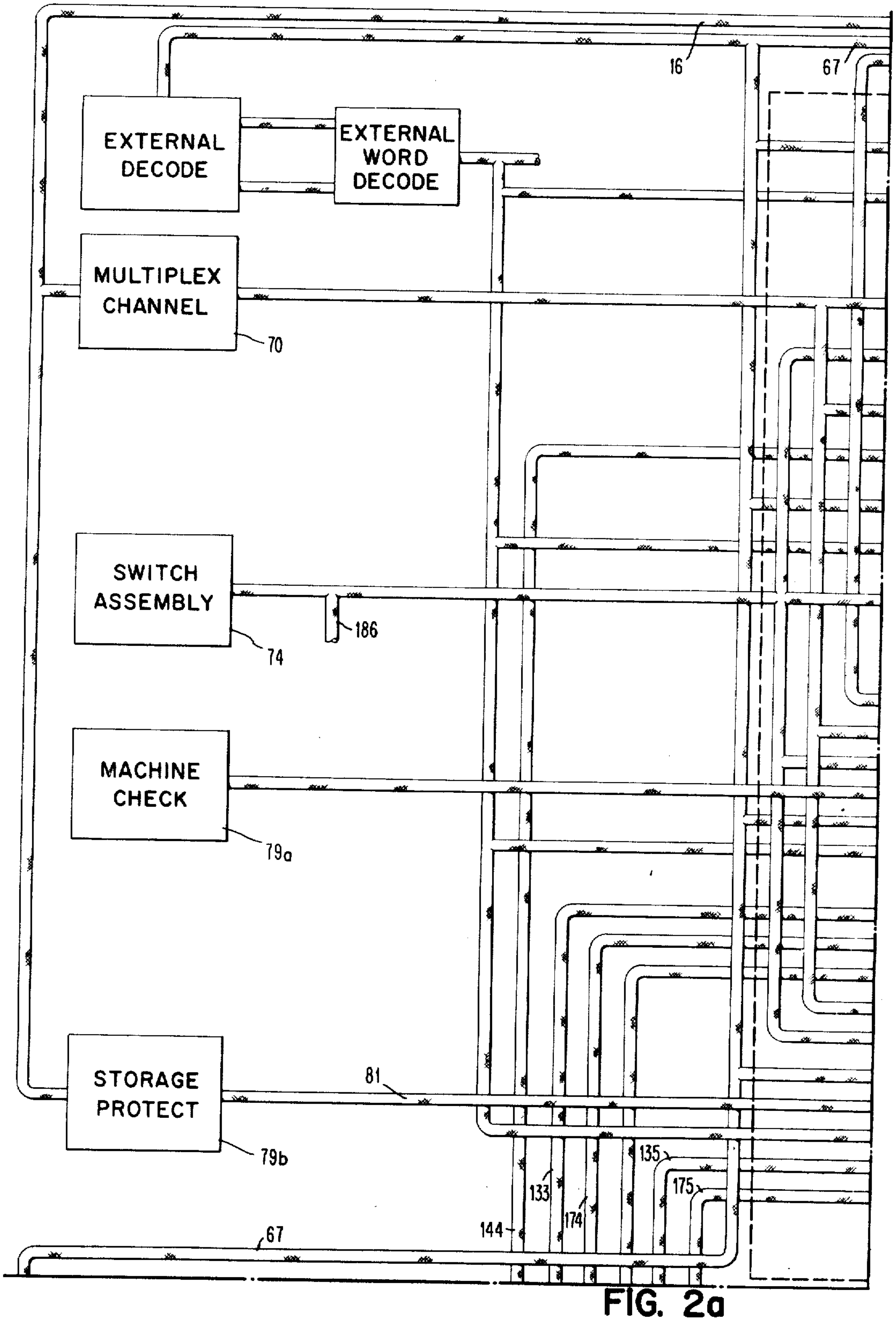
Figure 2B:
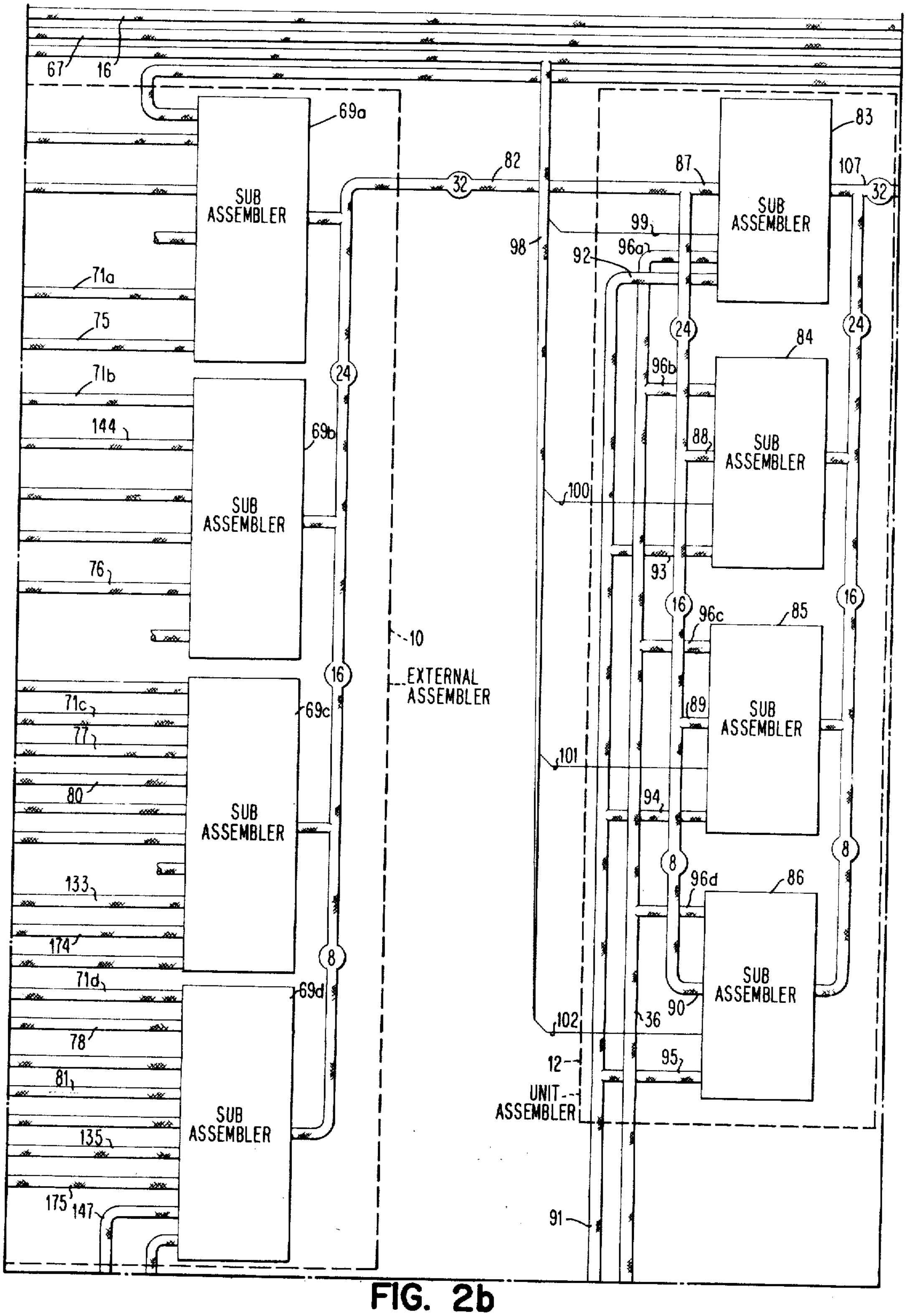
Figure 2C:
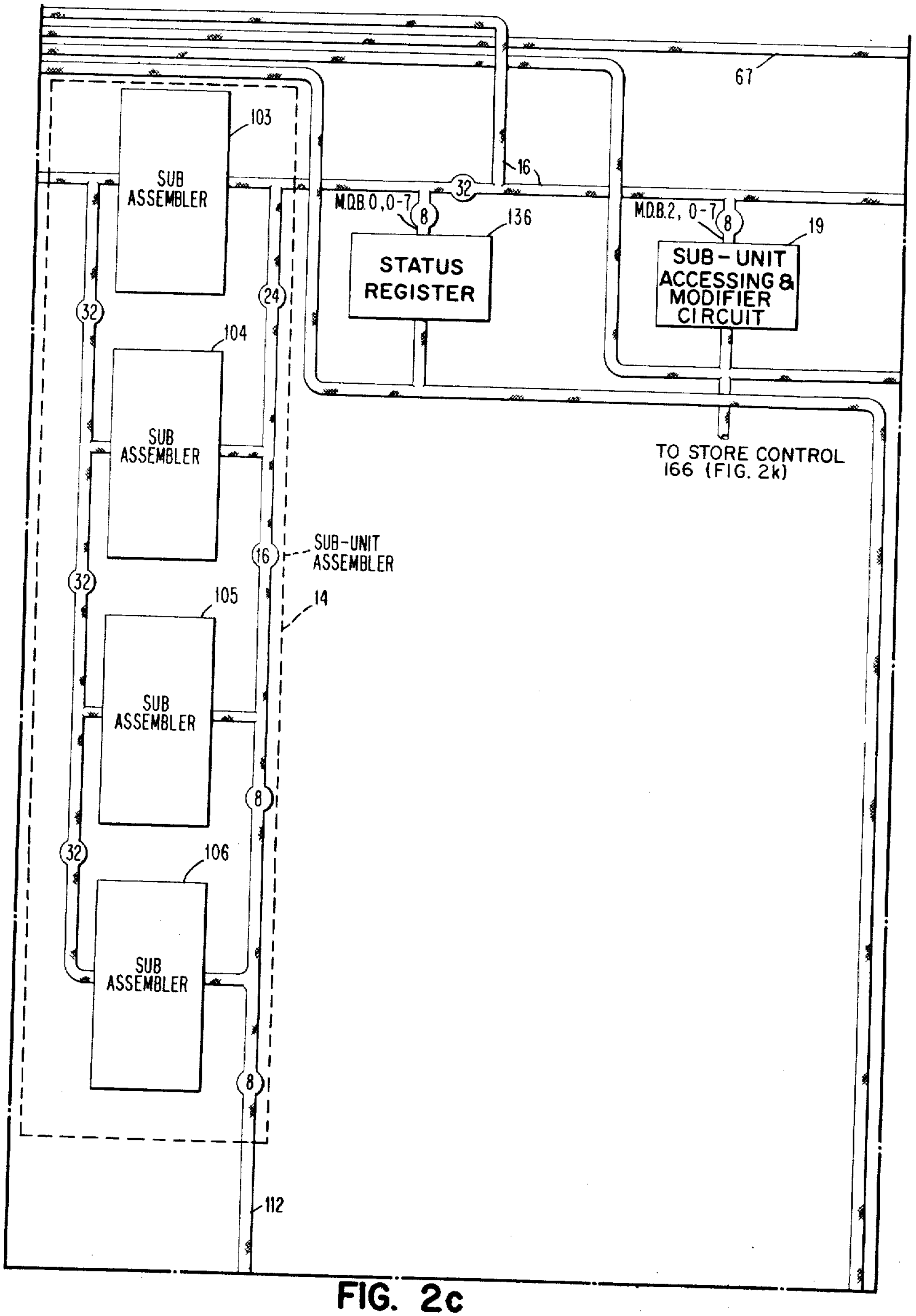
Figure 2D:
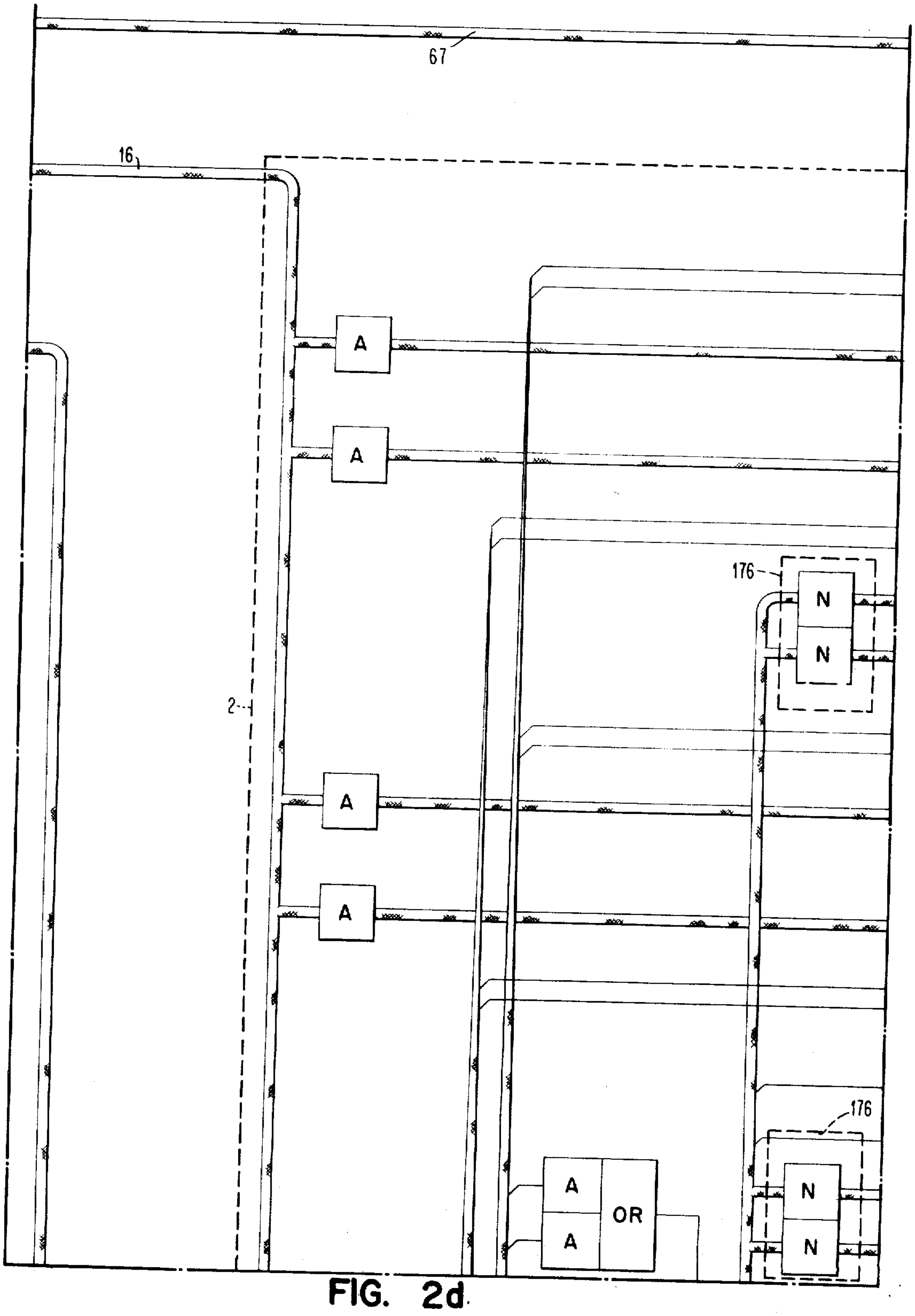
Figure 2E:
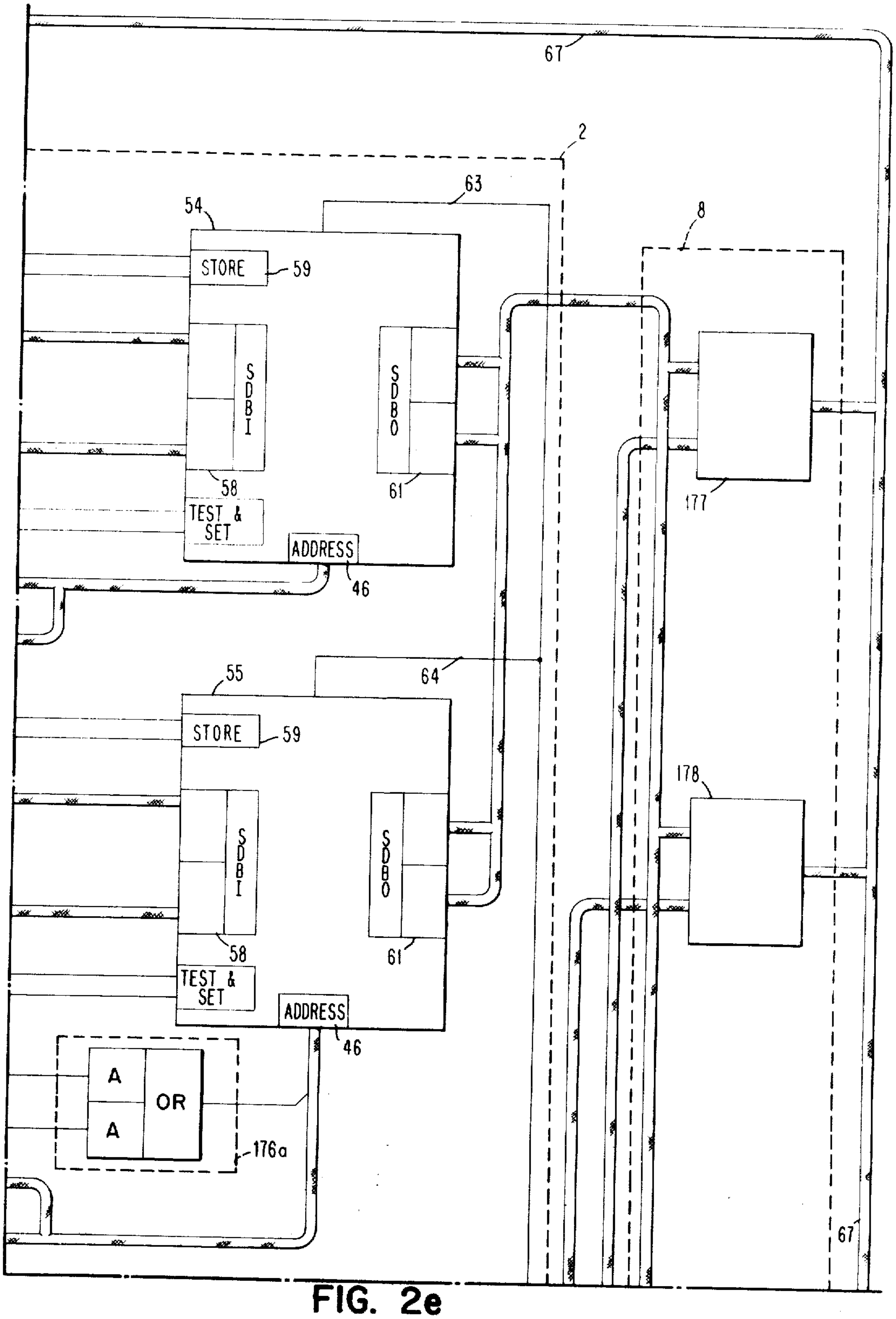
Figure 2F:
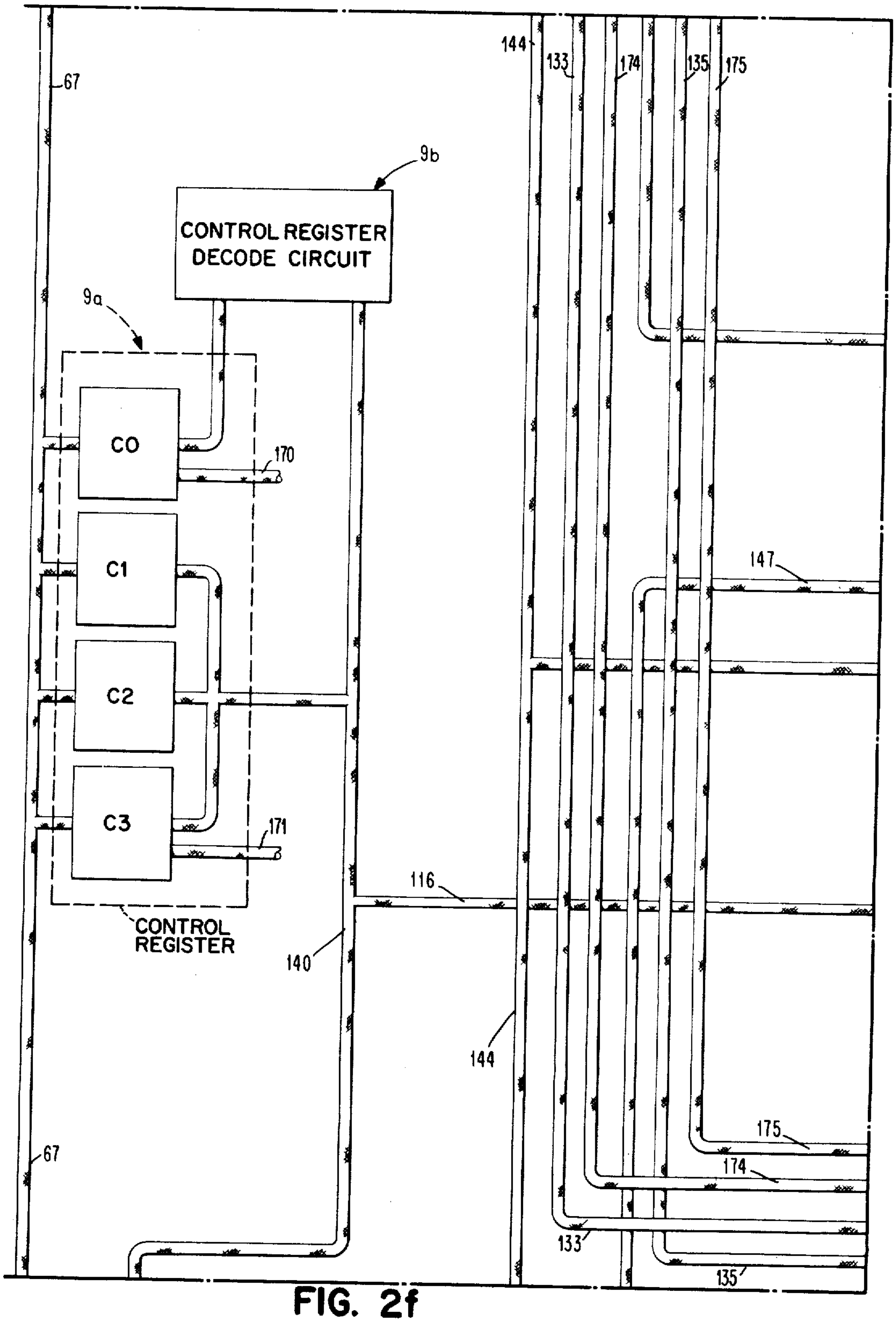
Figure 2G:
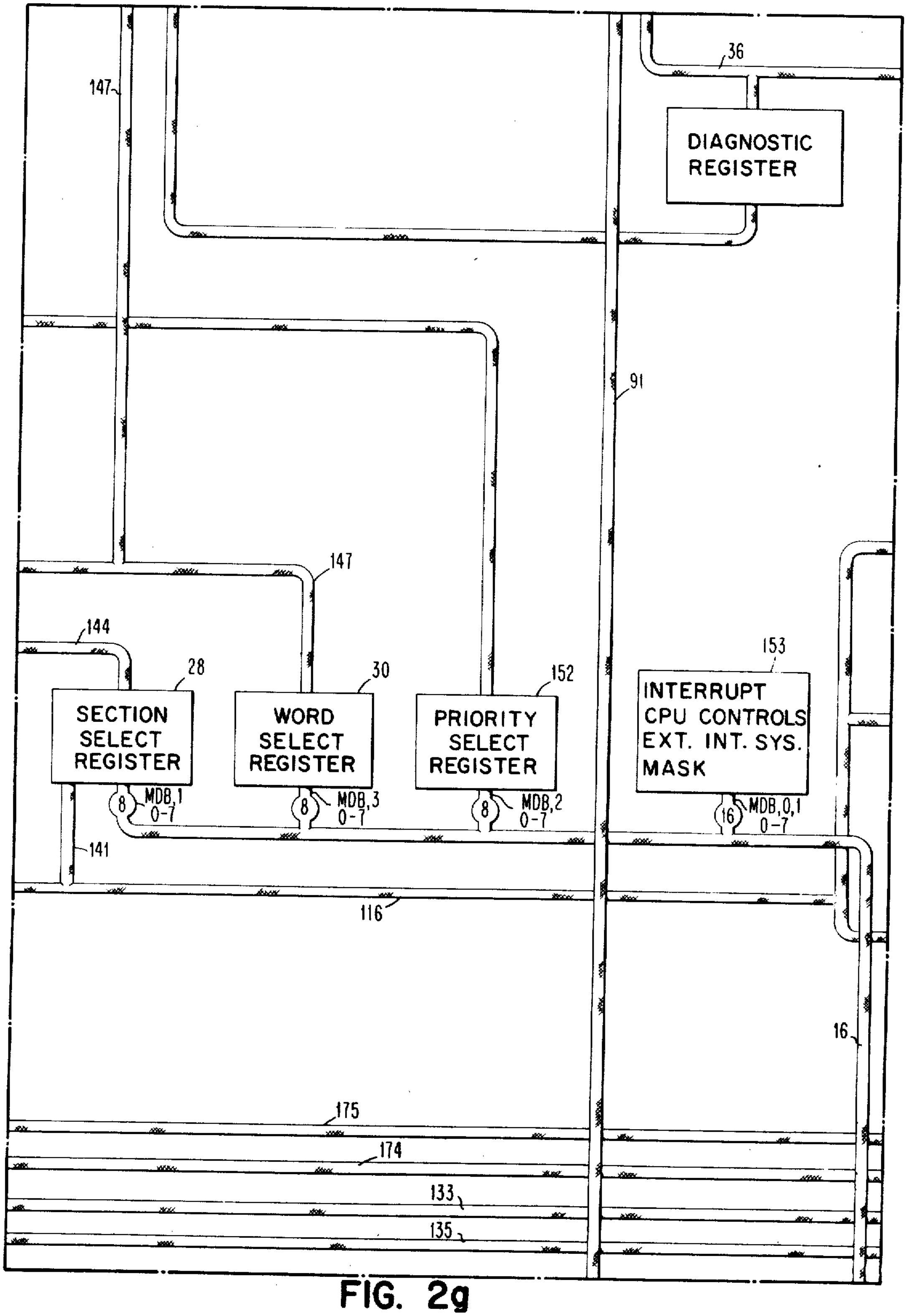
Figure 2H:
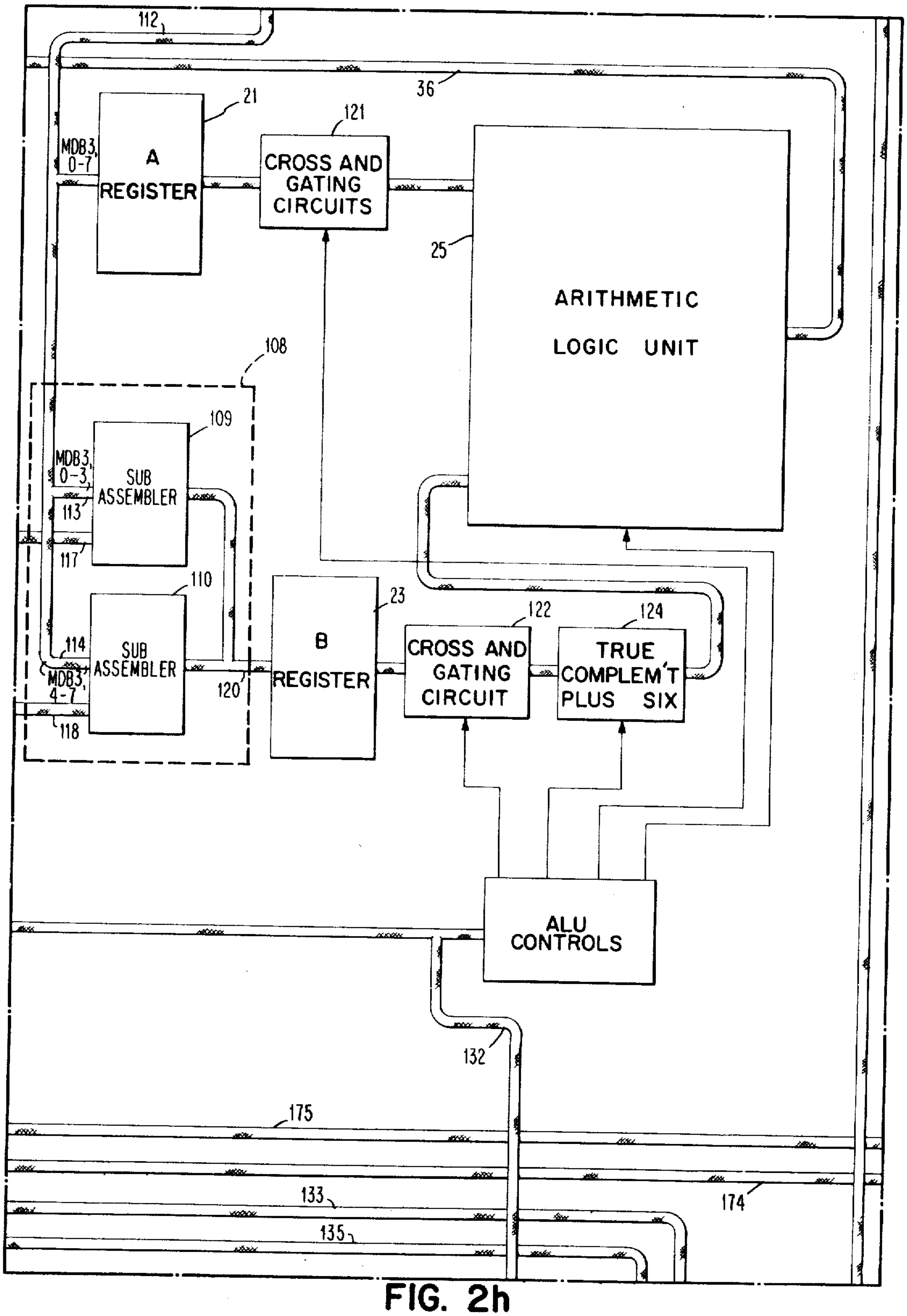
Figure 2I:
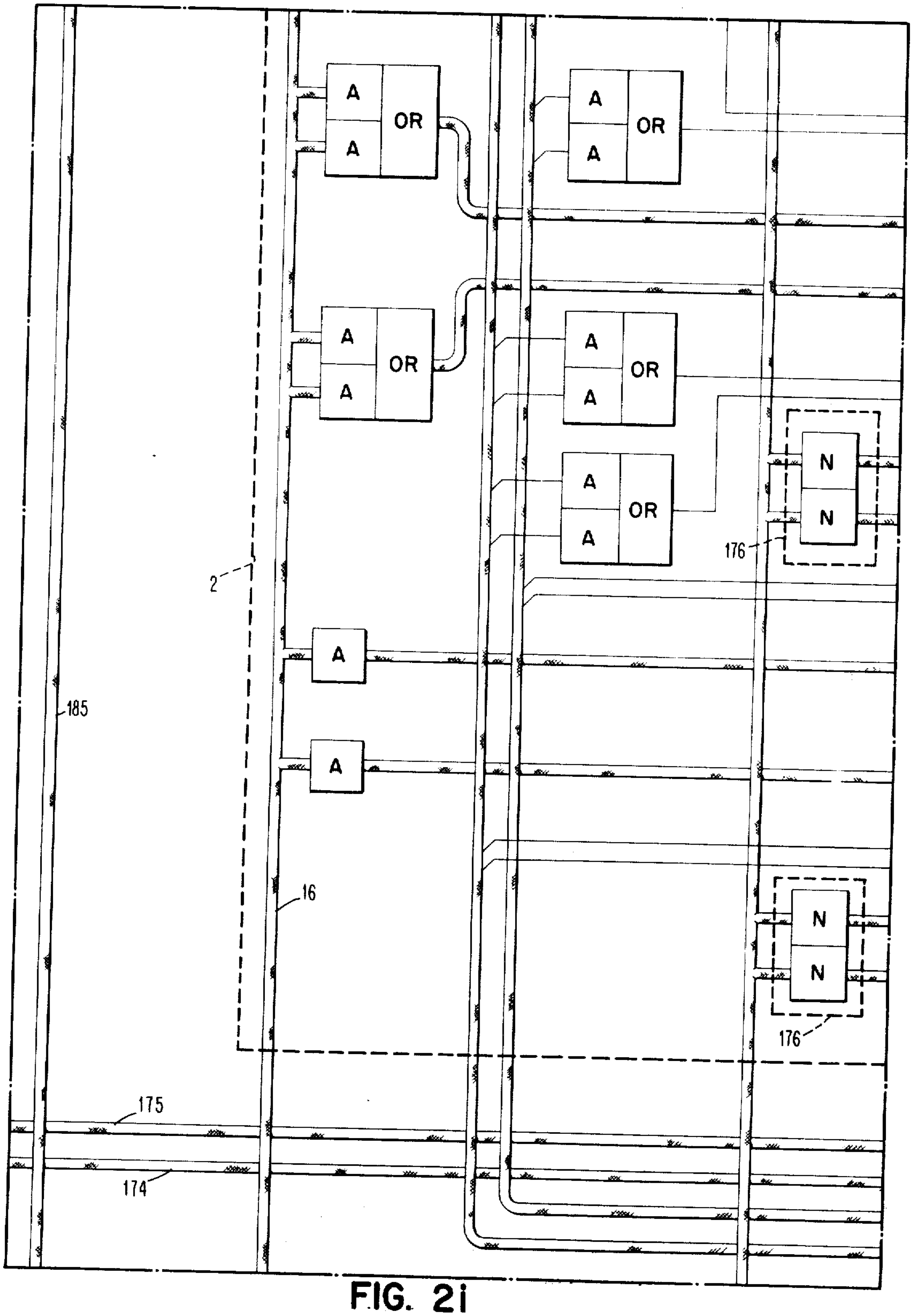
Figure 2J:
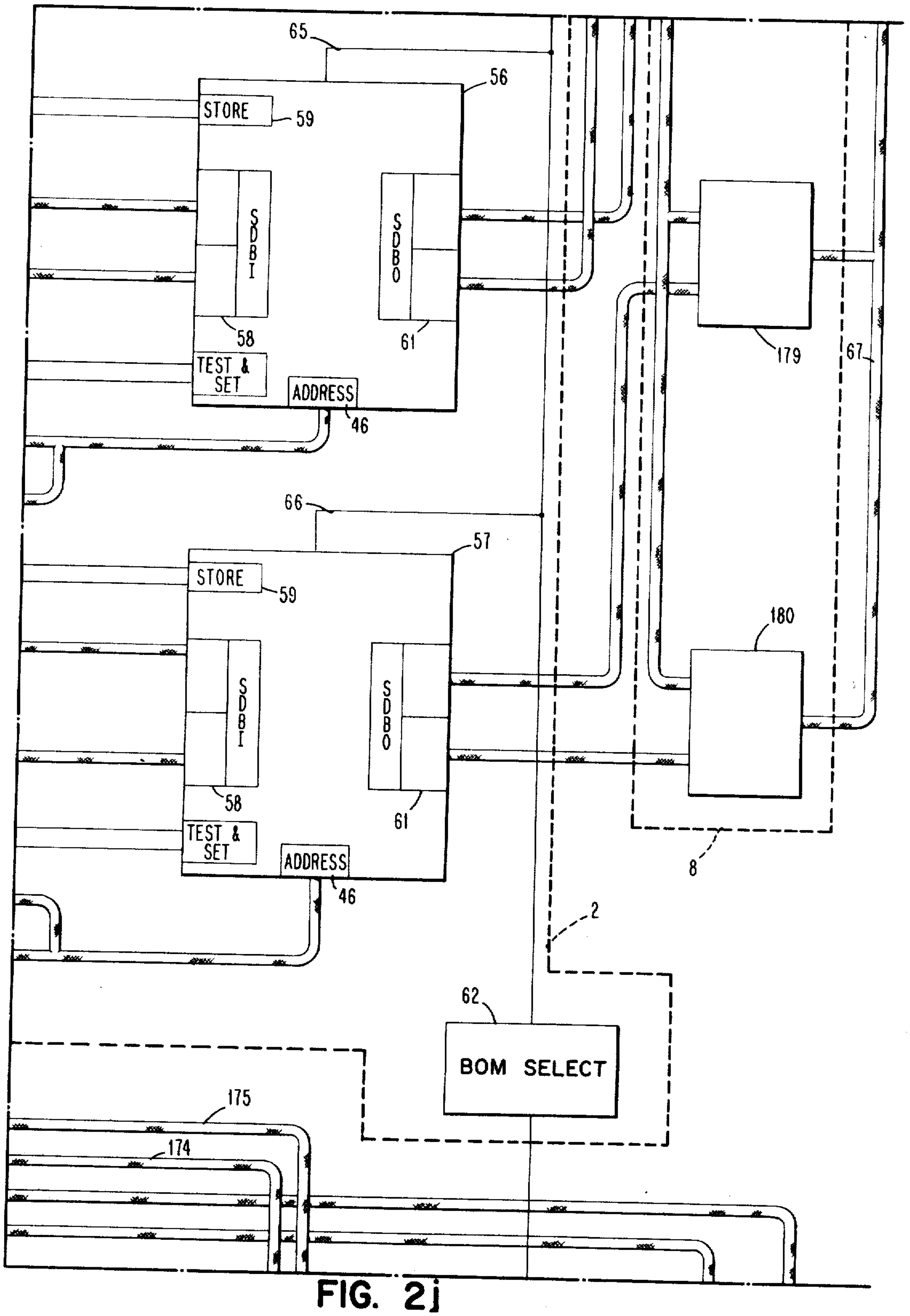
Figure 2K:
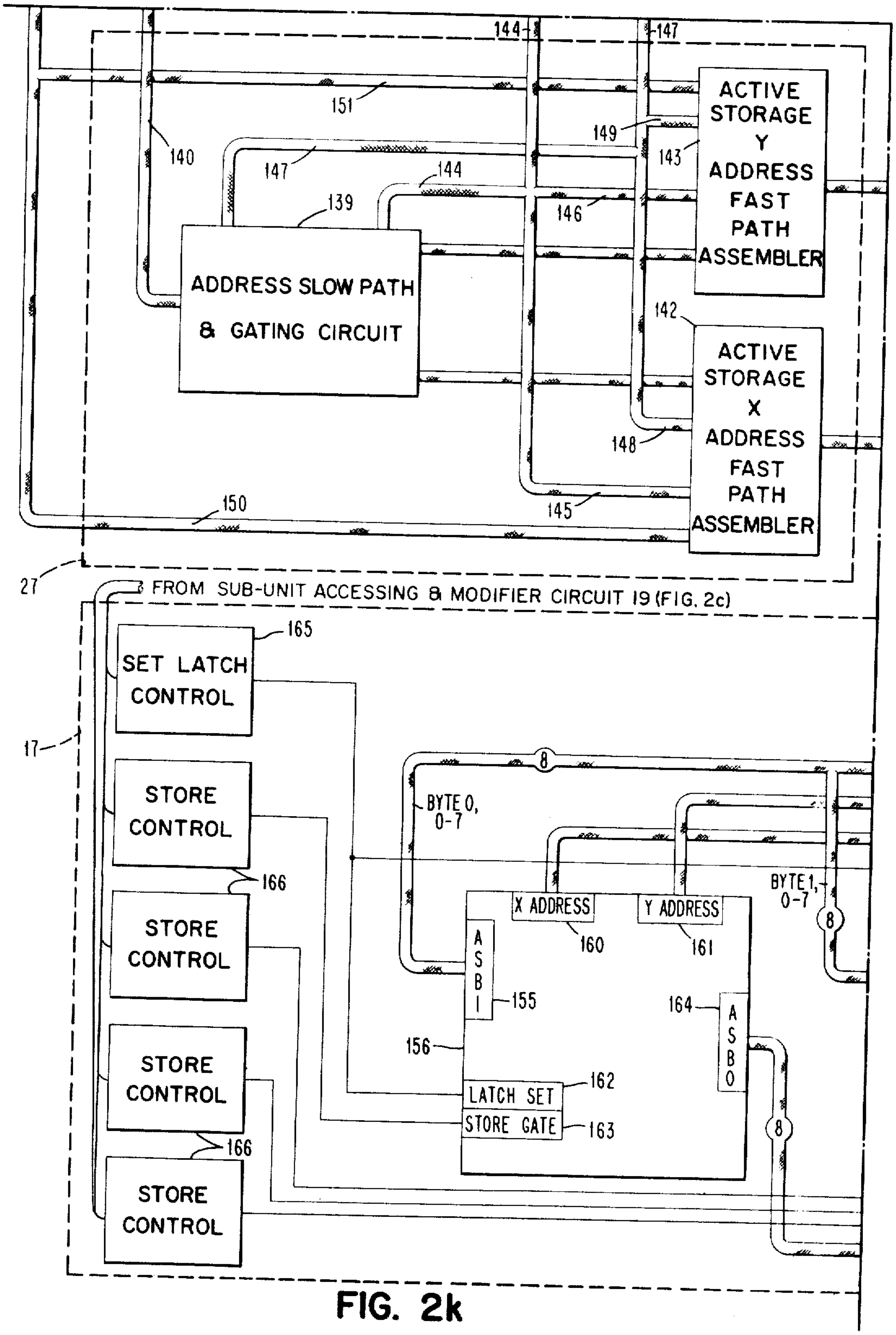
Figure 21:
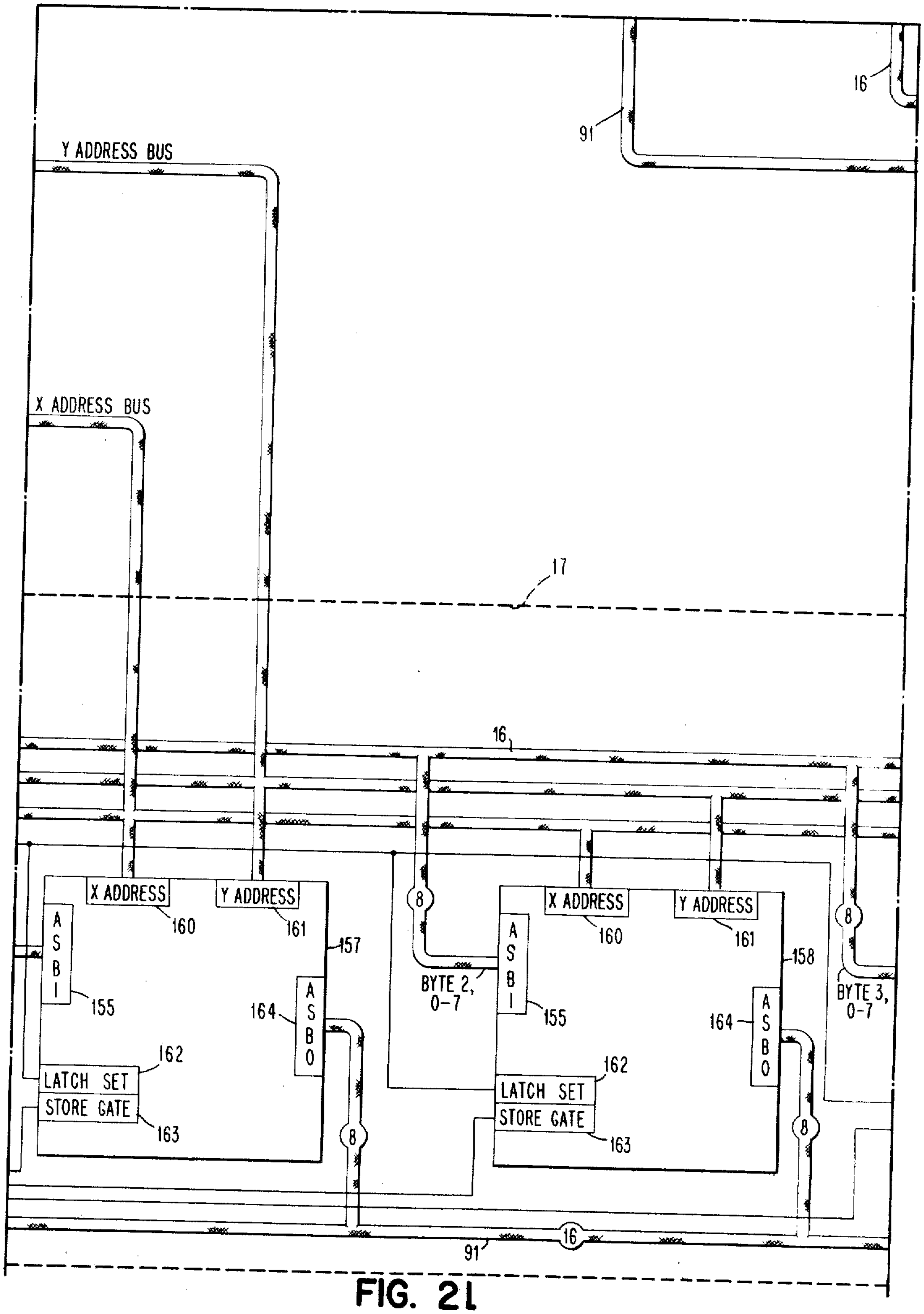
Figure 2M:
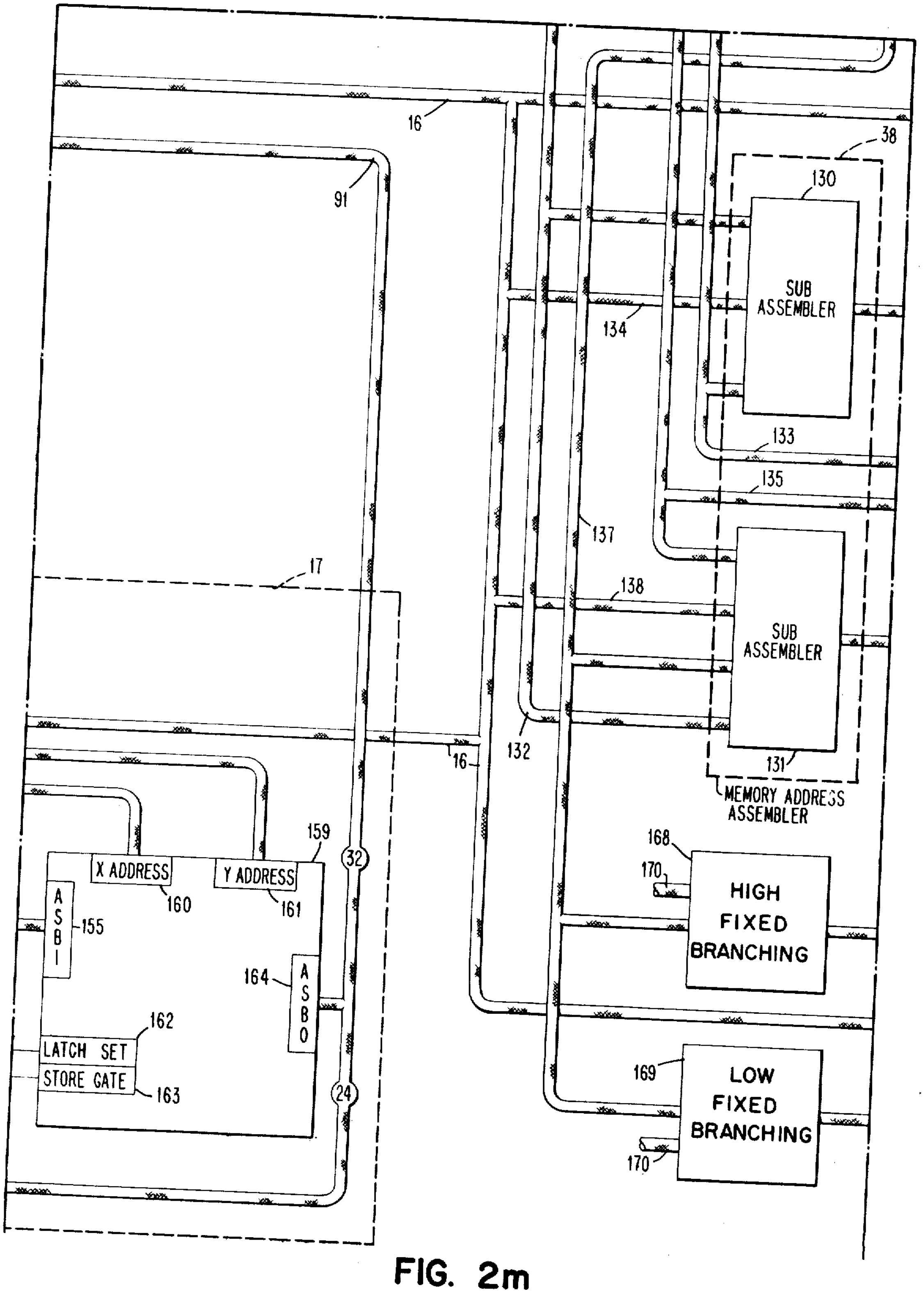
Figure 2N:
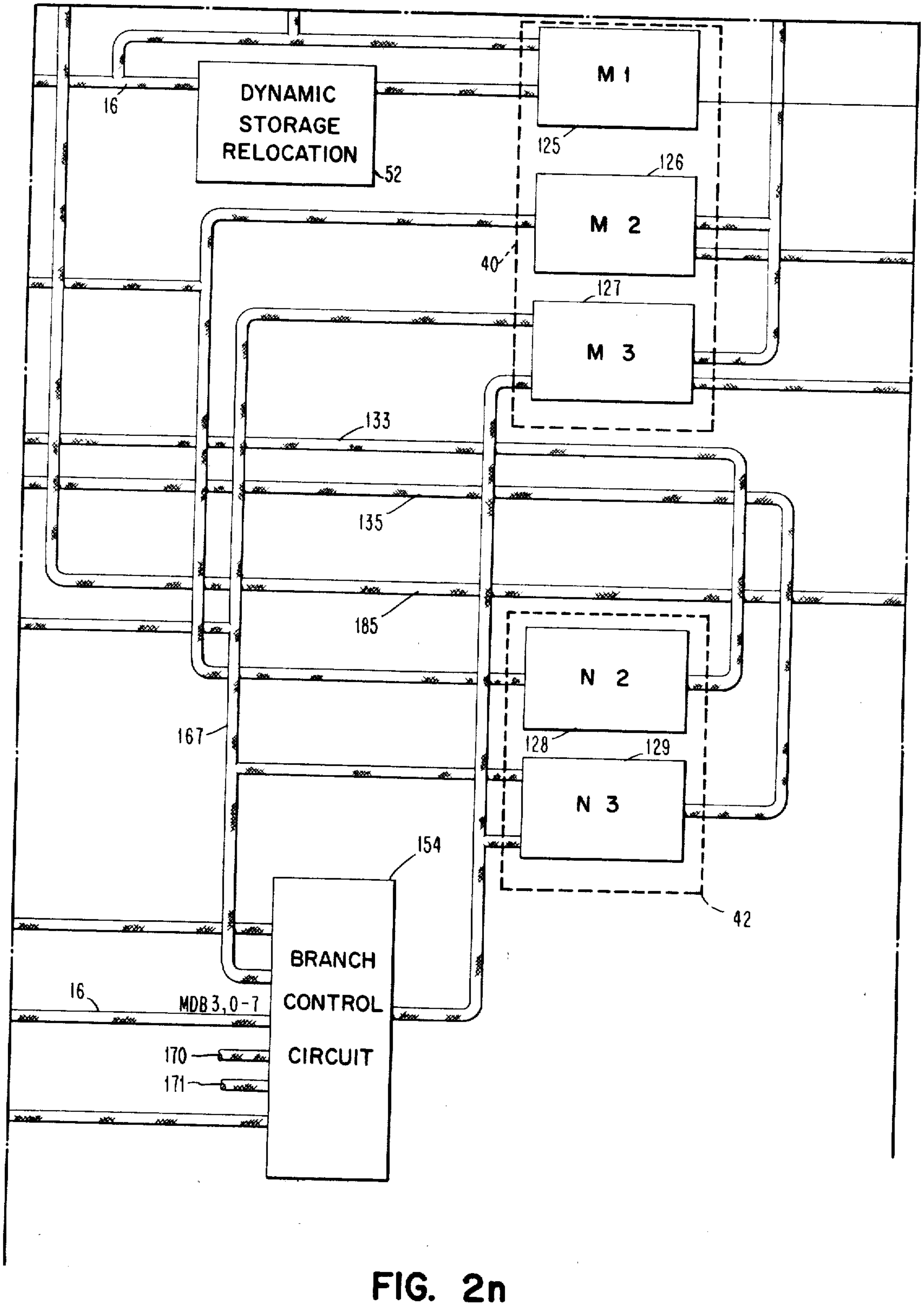
Figures 2, 2O:
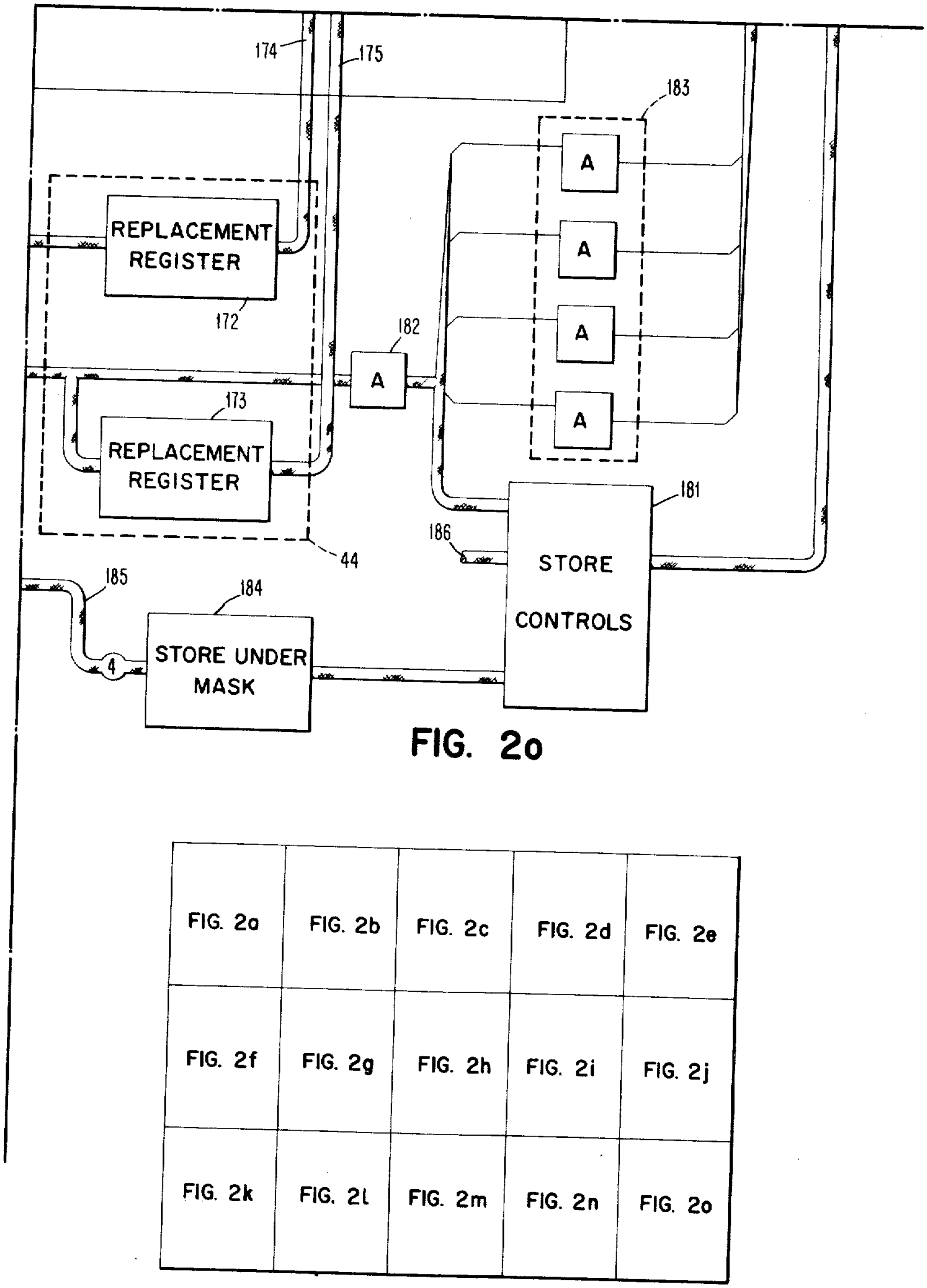

Referring to FIGURES 2*a* through 2*o*, there can be seen a more detailed block diagram of a data processing system which can advantageously employ the present invention. A main storage circuit 2 is of standard design, employing cores, transistor stages, or any other well-accepted storage medium as a mechanism for storing an individual bit in a storage word. The memory selected is of the expandable type employing a plurality of basic operating modules, shown in FIGURES 2*e* and 2*j*, (BOM) 54 through 57. Each of the modules 54 through 57 is comparably equipped and employs the following enumerated circuits as ancillary circuits to the basic storage medium. A storage data bus in (SDBI) circuit 58 accepts the information from the main data bus 16. A store circuit 59 is an enabling circuit which indicates that the information available on the SDBI 58 associated with the BOM having the active store circuit 59 is to be stored at the location identified by the contents of the address circuit 46. In summary, the store circuit 59 provides a half select current to all locations in the selected BOM and the lines selected by the address in the address circuit 46 supply the remaining required half select current. The line selected thereby is energized to accept data from the SDBI 58. In a write-out situation, the word selected by the address circuit 46 interrogates a word location and reads it out into a storage data bus out (SDBO) circuit 61.

Each of the remaining basic operating modules is comparably equipped for storing or for reading out a unit of information, which unit comprises 16 data bits. As a matter of convenience, this unit is further divided into byte sizes comprising eight data bits. Therefore, a basic operating module contains a half word of information. A BOM select control circuit 62 is the means whereby pairs of the BOM's are selected. The details of the BOM select control are well known in the prior art. Briefly, this circuit operates to enable pairs of a plurality of output lines 63 through 66 in various combinations for reading out two half words into the storage data assembler 8. The output of the storage data assembler 8 is a storage data assembler bus out (SDABO) 67. This bus 67 comprises, as a matter of convenience for the present embodiment, a full unit of information or, more specifically, 32 data bits. This means that the SDABO 67 accents in any combination an output from the various BOM's 54 through 57. Furthermore, the SDABO combines these half words in such a manner as to properly present, in parallel, a full unit of information or a full word to the external assembler 10.

The external assembler 10, shown in FIGURE 2*b*, has a separate sub-assembler 69*a* through 69*d* responsive to each sub-unit of information. As previously mentioned, the information carried by SDABO 67 is a word comprising four bytes; therefore, each sub-assembler 69*a* through 69*d* handles one byte. The external assembler accepts information from an additional plurality of sources. For example, information from a multiplex channel 70 is distributed among the subassemblers 69*a* through 69*d* by the buses 71*a* through 71*d* respectively. The multiplex channel also is 32 bits in width and the corresponding bytes are applied to the correspondingly numbered sub-assemblers in the external assembler 10. An additional input is from the various switches on the console panel shown as a switch assembly 74. The switches 74 are able to enter information, especially addresses, into the main memory by way of the external assembler 10. Each switch has the capability of entering one hexadecimal digit. Since the hexadecimal digit requires four binary bits of information for description thereof, each sub-assembler is capable of accepting two switch positions. The switches are identified as AB, CD, EF, GH and are applied to the sub-assemblies 69*a* through 69*d* by the buses 75 through 78 respectively. Additional sources of information for application to the external assembler originate in a machine check register 79. The machine check register only finds access to the external assembler 10 by the sub-assembler 69*c* over a bus 80. The storage protect register is applied to the sub-assembler 69*d* by a bus 81.

The output of the external assembler 10 is applied to the unit assembler 12 by a bus 82 capable of carrying a full unit of information or 32 bits separated into four byte channels. The unit assembler 12 comprises four sub-assemblers 83 through 86, each capable of handling a sub-unit of information or a byte. The respective channels of bus 82 are distributed among the sub-assemblies 83 through 86 by a plurality of buses 87 through 90 respectively. The unit assembler 12 receives a second series of input signals from the active storage circuit 17 over an active storage bus out 91. Corresponding bytes from the active storage bus out 91 are applied to the sub-assemblers 83 through 86 by a plurality of buses 92 through 95 respectively. In this manner, byte 0 from the ASBO 91 is applied to the sub-assembler 83 associated with byte 0 from the data bus 82. An additional input to the unit assembler 12 is applied thereto from the arithmetic logic unit 25 by the arithmetic bus 36. The bus 36 has the capacity of carrying in parallel the output from the ALU 25. In this embodiment, the bus carries eight data bits or one byte. This byte is applied selectively in parallel to the sub-assemblers 83 through 86 by a plurality of buses 96*a* through 96*d* respectively.

The sub-assemblers 83 through 86 are gated to the sub-unit assembler 14 by a series of enabling signals on an accessing bus 98. These enabling signals are applied to the various sub-assemblers 83 through 86 by an equal plurality of gating lines 99 through 102 respectively. These gating signals not only enable the output from the associated sub-assembler 83 through 86 respectively, but also open the input gate to a respective sub-assembler 103 through 106 in the sub-unit assembler 14. In this manner, the contents of the sub-assemblers 83 through 86 can be gated to a sub-assembler 103 through 106 within the sub-unit assembler 14. The information from the unit assembler 12 is gated to the sub-unit assembler 14 over a bus 107. Again, the bus 107 is capable of carrying four bytes or four sub-units of information from the output of the unit assembler 12. This bus 107 is applied to each of the sub-assemblies 103 through 106 of the byte assembly 14. The output from the sub-unit assembler 14 is the main data bus 16 which bus is capable of carrying four bytes of information or a full unit of information.

The output from the sub-unit assembler 14 is applied in parallel to the A register 21 and a B register assembler 108, shown in FIGURE 2*h*. The B assembler 108 further comprises a plurality of sub-assemblers 109 and 110. The output from the sub-assembly 106 can be selectively applied to either of the sub-assemblers 109 and 110 over a bus 112 comprising additionally a plurality of buses 113 and 114, applied to the respective sub-assemblies 109 and 110. The sub-assemblers 109 and 110 have a further series of input signals applied thereto over a control register bus 116. The bus 116 is three bytes or 24 bits in width and is applied selectively to either of the sub-assemblers 109 and 110 by an additional pair of buses 117 and 118 respectively. The output of the B assembler 108 is applied to the B register 23 by a B assembler output bus 120. The A register 21 and B register 23 inputs to the ALU 25 are applied thereto by well-known cross and partial gating circuits 121 and 122 respectively. The gating circuit 121 is capable of crossing the high four bits with the low four bits or gating only the high or the low to the ALU 25. The gating circuit 122 is capable of shifting only the high or the low four bits of the B register 23 to the ALU 25. A true complement and plus six circuit 124 is located intermediate the circuits 122 and 25. The details of any of these circuits are not necessary for the understanding of the present invention.

The mechanism for generating an address in main memory 2 is the memory address register 40 and the memory address assembler 38. The link address register 42 provides a mechanism for saving the last previous contents of the register 40 in response to a branching situation. The register 40 comprises a further plurality of registers 125 through 127 and each register has the capacity for storing one byte of address information, and the bytes are called the M1, M2, and M3 bytes respectively. The register 42 comprises a pair of individual byte registers 128 and 129. The memory address assembler 38 comprises two sub-assemblers 130 and 131. Like all other assemblers, the assembler 38 receives information from a plurality of input sources and also control signals from the control register 9*a* over a bus 132 and the bus 116. The register 9*a* comprises a unit of information consisting of four bytes of control data. The control register decode circuit 9*b* operates to decode the various inputs from the register 9*a*. The output of the decode circuit 9*b* is distributed throughout the remaining part of the circuitry to enable the AND gate circuits and therefore to gate information from and into the remaining circuits of the machine.

The remaining inputs of the sub-assembler 130 comprise the output of the register 128 as applied by a bus 133, and the output of the unit sub-assembler 85 as applied thereto through the sub-assembler 105 and by the bus 16 and a further bus 134. The contents of the bus 133 are applied also to sub-assembler 69*c*. The remaining inputs to the sub-assembler 131 comprise the output of the register 129 as applied by a bus 135, the output of a status register 136 as applied by a bus 137, and the output of the sub-assembler 86 as applied thereto through the sub-assembler 106 and by the bus 16 and a further bus 138. The contents of the bus 135 are applied also as an input to the sub-assembler 69*d*.

The memory address assembler 38 selectively gates data bits from the main data bus 16, from the link register 42, from the current control word, or the status register 136 into the register 40.

The output of the register 9*a* is applied to an address slow path and gating circuit 139 within the active storage address assembler 27, shown in FIGURE 2*k*, and the section select register 28 by the bus 116 and a plurality of lines 140 and 141 respectively. The output of the circuit 139 is applied to an active storage X address assembler fast path circuit 142 and to an active storage Y address assembler fast path circuit 143. The circuit 142 generates the X axis address line and the circuit 143 generates the Y axis addressing lines. Together they select a single word from the active storage memory 17. The register 28 furnishes information to the circuits 142 and 143 over a bus 144 and a plurality of branch buses 145 and 146 respectively. The bus 144 is also connected as an input to the sub-assembler 69*b* in the external assembler 10. An additional input to the circuits 142 and 143 is applied thereto from the word select register 30 over a bus 147 and a plurality of branch buses 148 and 149. Additionally, the bus 147 is employed as an input to the sub-assembler 69*d* in the external assembler circuit 10. The final inputs to the circuits 142 and 143 originate from the storage data assembler 8 and applied therefrom over the storage data assembler bus out 67 and a plurality of branch buses 150 and 151.

The main data bus 16 acts as input bus for a plurality of additional circuits. The sub-unit accessing and modifier circuit 19 is responsive to the main data bus byte 2, bits 0–7. The status register 136 is responsive to the main data bus byte 0, bits 0–7. The word select register 30 receives input information from the main data bus 16, byte 3, bits 0–7. The section select register 28 is responsive to the main data bus byte 1, bits 0–7. A priority select register 152 is responsive to the main data bus 16, byte 2, bits 0–7.

An interrupt and control register 153 is responsive to the main data bus 16, bytes 0 and 1. Other circuits responsive to the main data bus 16 are a branch control circuit 154 and the active storage bus in (ASBI) circuit 155.

The active storage circuit 17 comprises a second plurality of basic operating modules 156 through 159. The basic operating modules 156 through 159 need not have the same capacity as the previously mentioned modules 54 through 57. Their resemblance resides in the fact that a larger memory system comprises a plurality of smaller similarly constructed basic operating modules.

Each basic operating module includes in addition to the ASBI 155, an X address circuit 160, a Y address circuit 161, a latch set circuit 162, a store gate 163, and an active storage bus out (ASBO) circuit 164. The information to be stored in a basic operating module in applied to the ASBI 155 and it is stored at the addressable location designated by the contents of the circuits 160 and 161. The X address and Y address circuits together select a single storage location into which the contents of the ASBI 155 is to be stored. In those situations when the information is to be interrogated from the basic operating module 156, the contents of the X address and Y address select the location and the contents are read out into the ASBO circuit 164. The latch set circuit 162 operates to enable the write out procedure while the store gate 163 operates to enable the storage procedure.

Each of the basic operating modulus 156 through 159 stores a unit of information. This unit of information need not be the same length as the unit of information held in the basic operating memory 54 through 57. The unit of information stored in a basic operating module such as 156, is eight binary bits or one byte. The address information stored in the circuits 160 and 161 of each basic operating module 156 through 159 is applied to these circuits in parallel from the circuits 142 and 143. This means that one byte of information is addressed in each module simultaneously. One byte of information from each basic operating module is transferred from the ASBI 155 associated with each basic operation module or transferred onto the ASBO 164 and the bus 91.

In reviewing then, when a single address is furnished from the circuits 142 and 143, a full word of information, four bytes, are read out from the respective modules 156 through 159 and placed onto their respective locations in the active storage bus 91. This full word of information is applied to the sub-assemblers 83 through 86 over the plurality branch buses 92 through 95. Corresponding bytes from the BOMs 156 through 159 are applied to sub-assemblies 83 through 86 respectively. The latch set circuits 162 are enabled from a set latch control circuit 165. The store gate circuits 163 are enabled from a plurality of store gate control circuits 166 one of which circuits is associated with each BOM 156 through 159.

The branch control circuit 154, shown in FIGURE 2*n*, is equipped with a plurality of input signals. One previously mentioned set of signals is from the main data bus 16, byte 3 position. The output from the subassembly 131 is applied to the branch control circuit 154 over a bus 167. A high branch circuit 168 and a low branch circuit 169 also furnish input signals to the branch control circuit 154. Output signals from the decode circuit 9a are applied to the branch control circuit 154 over a plurality of buses 170 and 171.

The register 40 comprises three sub-unit registers 125 through 127 as previously mentioned. Each register holds eight binary bits of information, but only the registers 126 and 127 are employed for selecting a single storage location within the basic operating modules 54 through 57. The bit positions in the register 125 are available for expansion of the present capacity exhibited by the basic operating modules 54 through 57. When additional storage is placed into the system, the operation of the register 125 will follow the general format as set down for the remaining registers. The outputs from the registers 126 and 127 are applied to a pair of replacement registers 172 and 173 respectively. During certain branching operations, it is necessary to have a parallel back up system as furnished by the pairs of registers 128 and 129 and 172 and 173. The output from the registers 172 and 173 is applied to the sub-assemblers 69*c* and 69*d* respectively in the external assembler 10 by a pair of branch buses 174 and 175 respectively.

The outputs from the registers 126 and 127 are applied in parallel to the address circuit 46 of each of the basic operating modules 54 through 57 by an additional inverter circuit 176. Associated with the basic operating module 55 and the address circuit 46 associated therewith, the bit position 0 of the register 126 is responsive to a special assembler 176*a*. The storage data assembler 8 comprises a plurality of sub-unit registers 177 through 180. The storage capacity of each of these last mentioned registers is one byte and each register is responsive to selected bytes of information from each of the basic operating modules 54 and 55. Each access to the memory 2 brings out four bytes of information, two bytes from each of the modules 54 and 55. The basic operating modules 56 and 57 are shown connected to the registers 177 through 180 in one additional manner when it is desired to expand the storage capacity of the memory system 2.

The output from the register 127 is applied to a storage control circuit 181 by an AND gate 182. The output from the AND gate 182 is a plurality of enabling signals connected to a test and set circuit 183. Enabling signals from the circuit 183 can be used singly or in combination to effect the well-known test and set operation on the BOM's 54 through 57. A remaining input to the storage control circuit 181 originates from a store under mask circuit 184 which is connected to the register 19 by a bus 185. A further input to the circuit 181 is from the switch assembly circuit, shown in FIGURE 2*a*, over a bus 186.

Figure 3A:
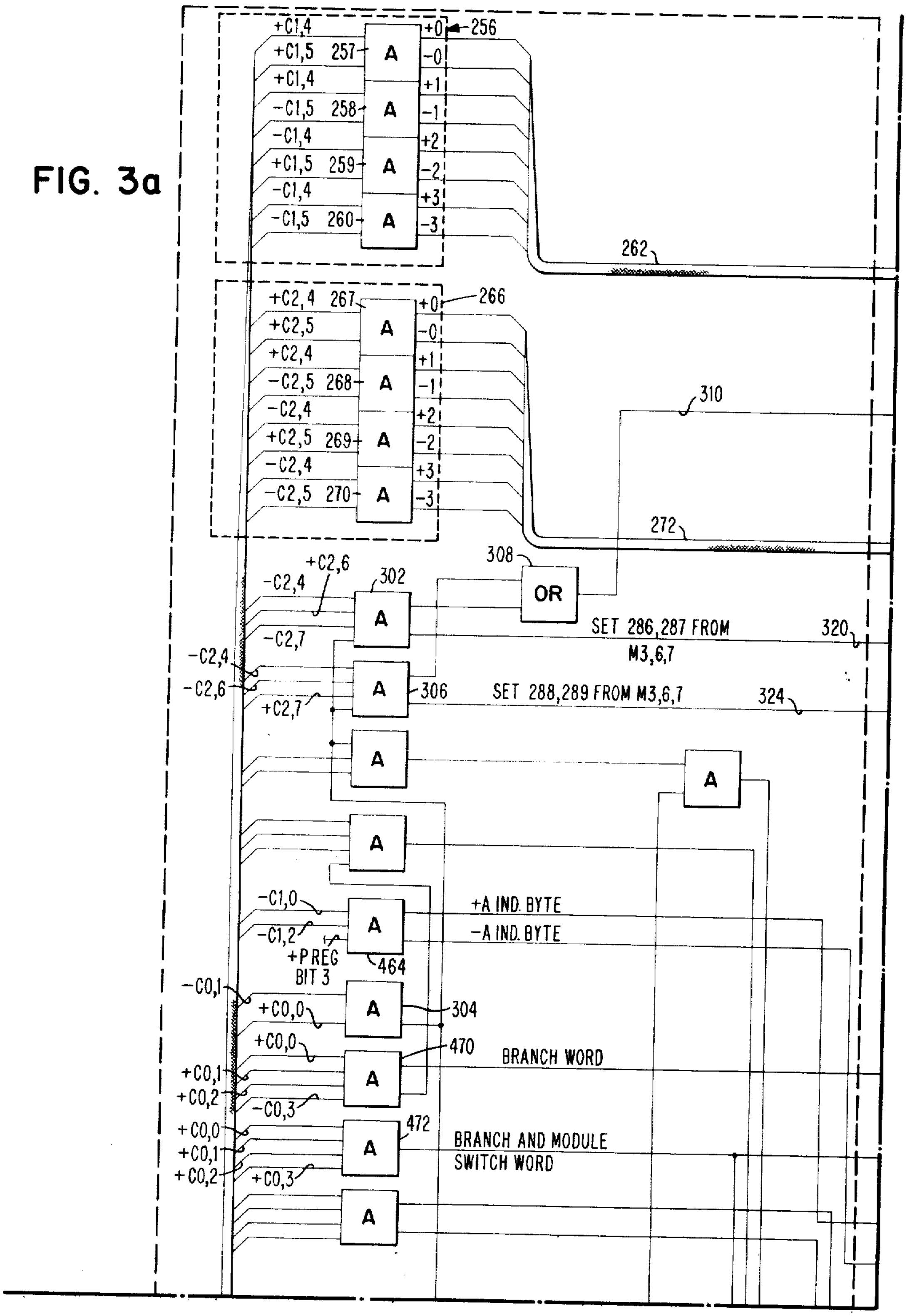
Figure 3B:
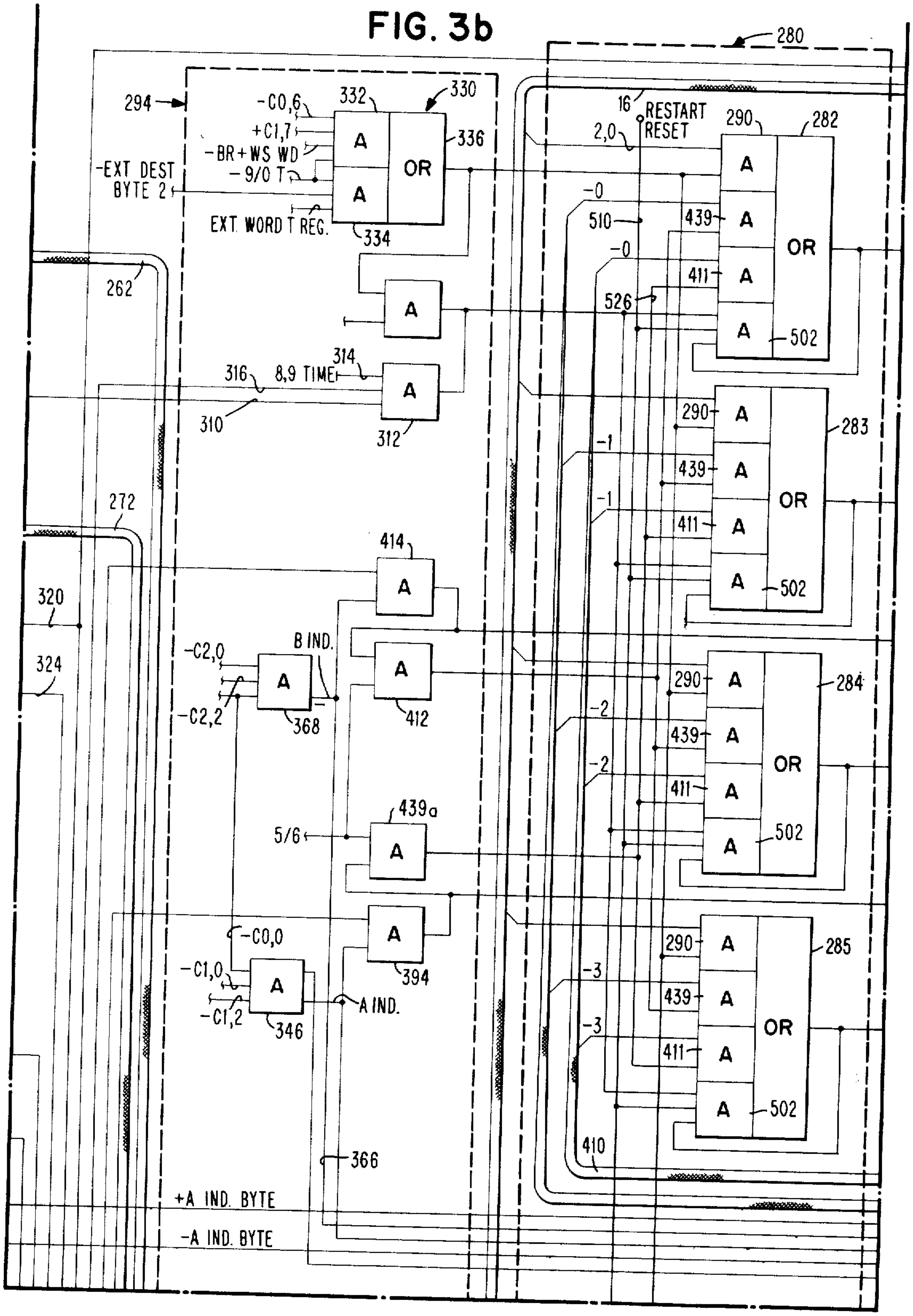
Figure 3C:
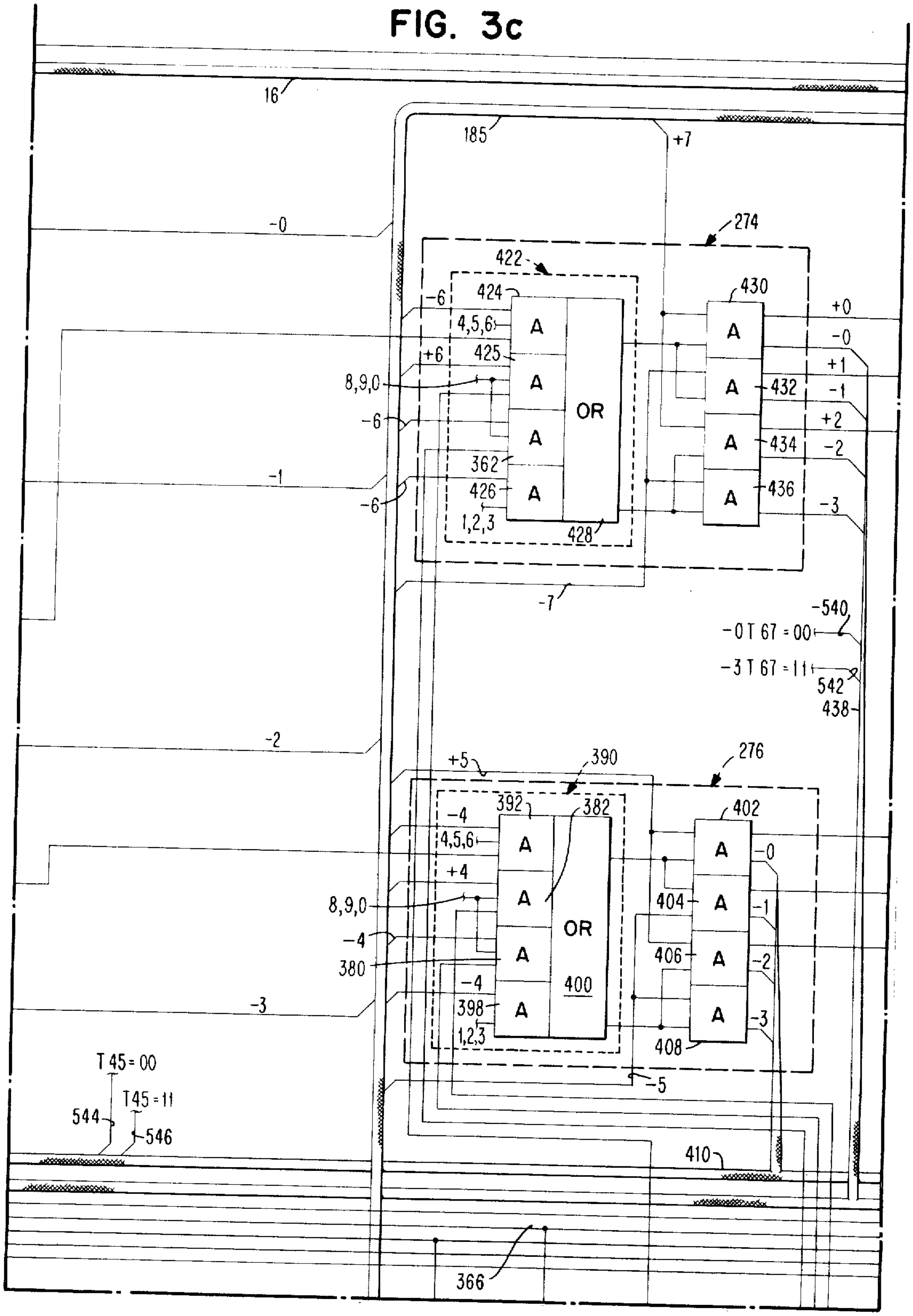
Figure 3D:
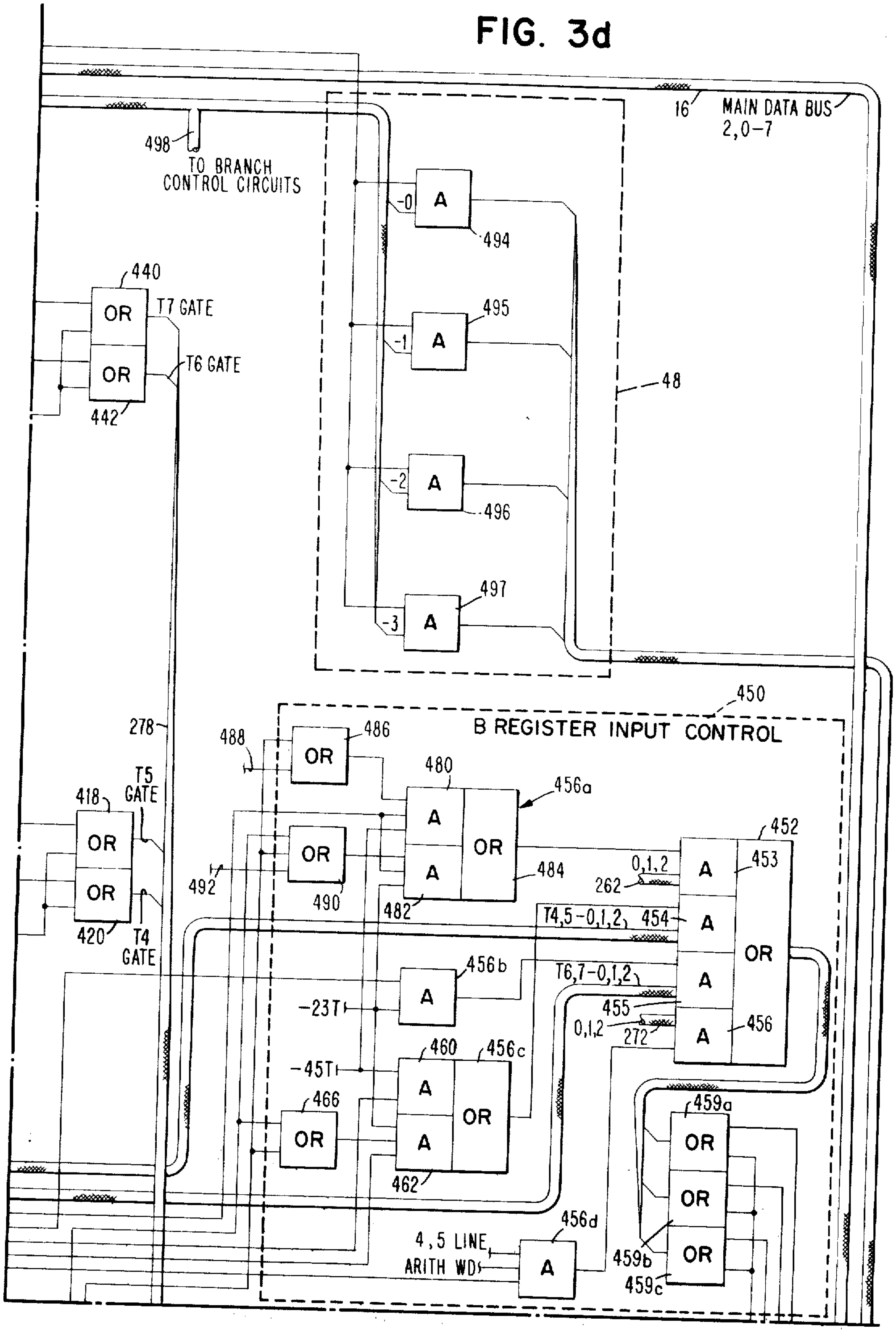
Figure 3E:
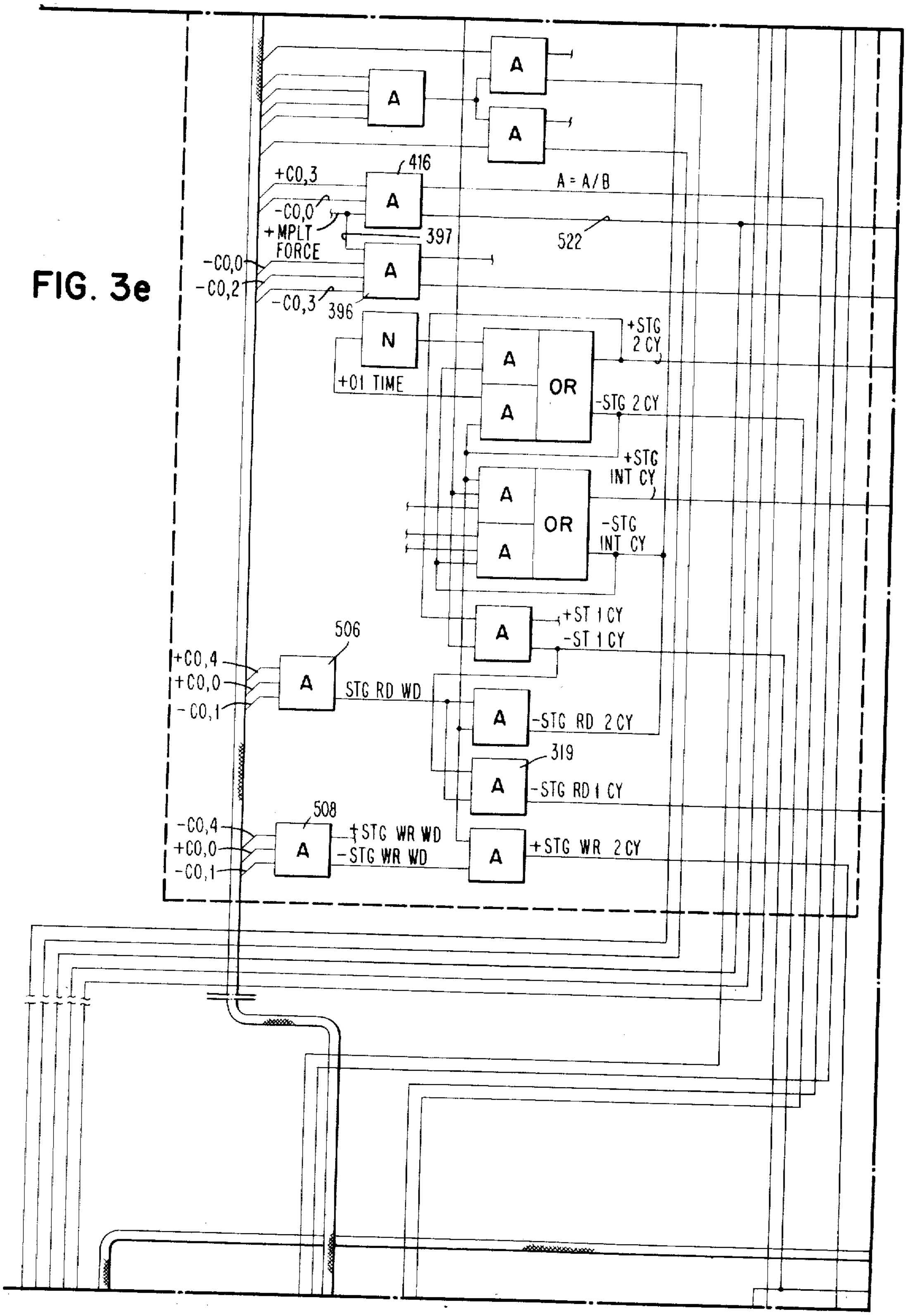
Figure 3F:
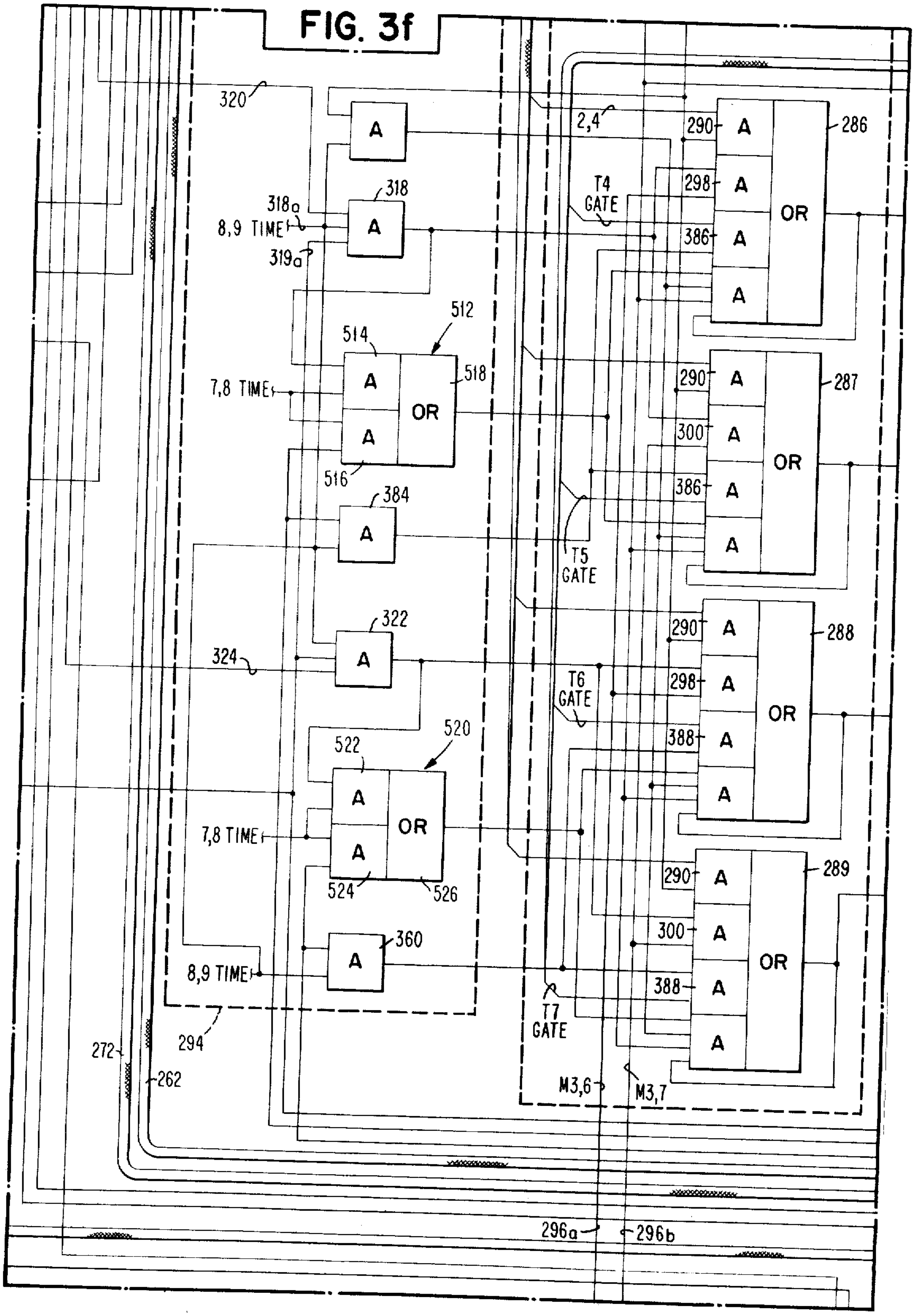
Figure 3G:
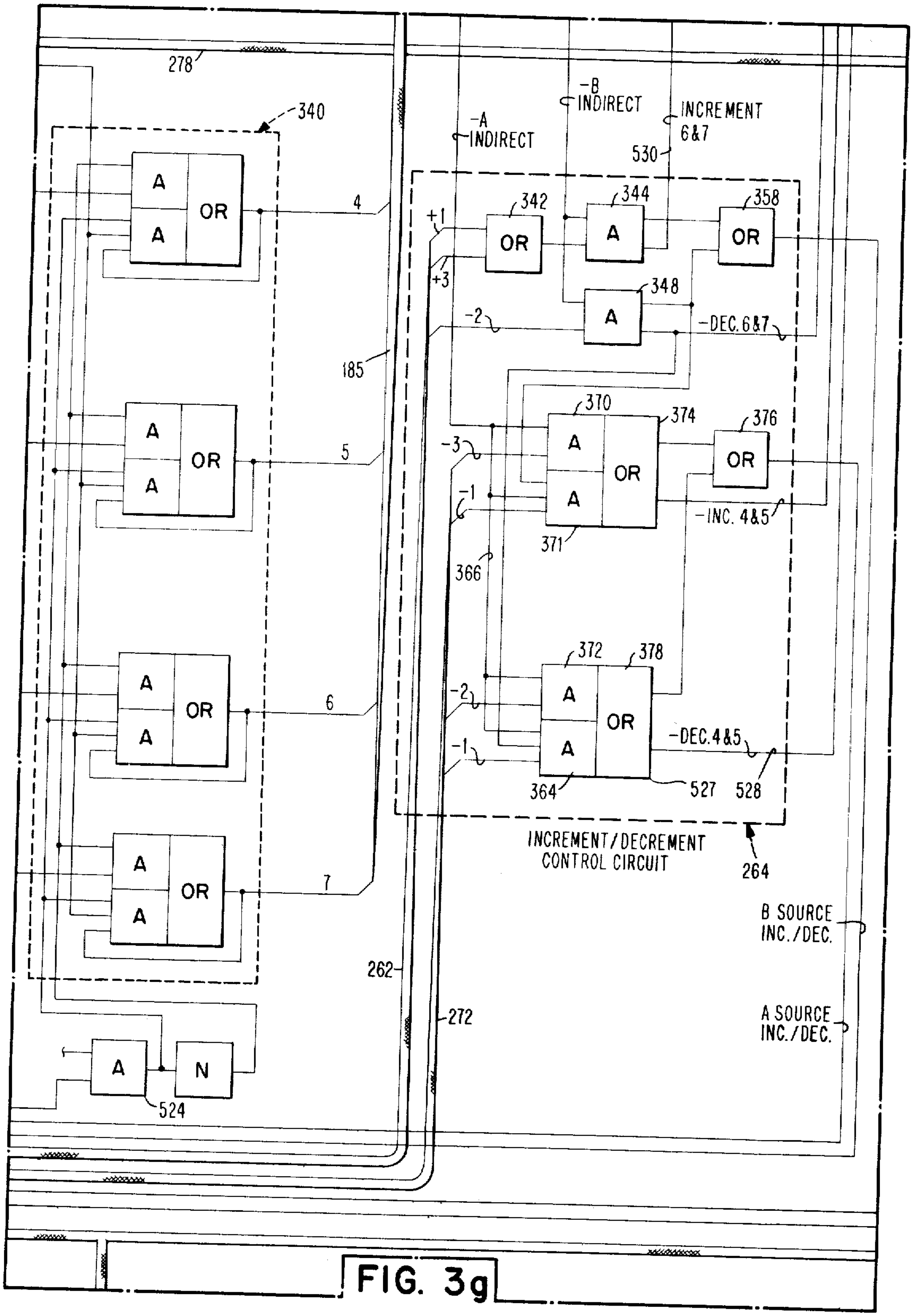
Figure 3H:
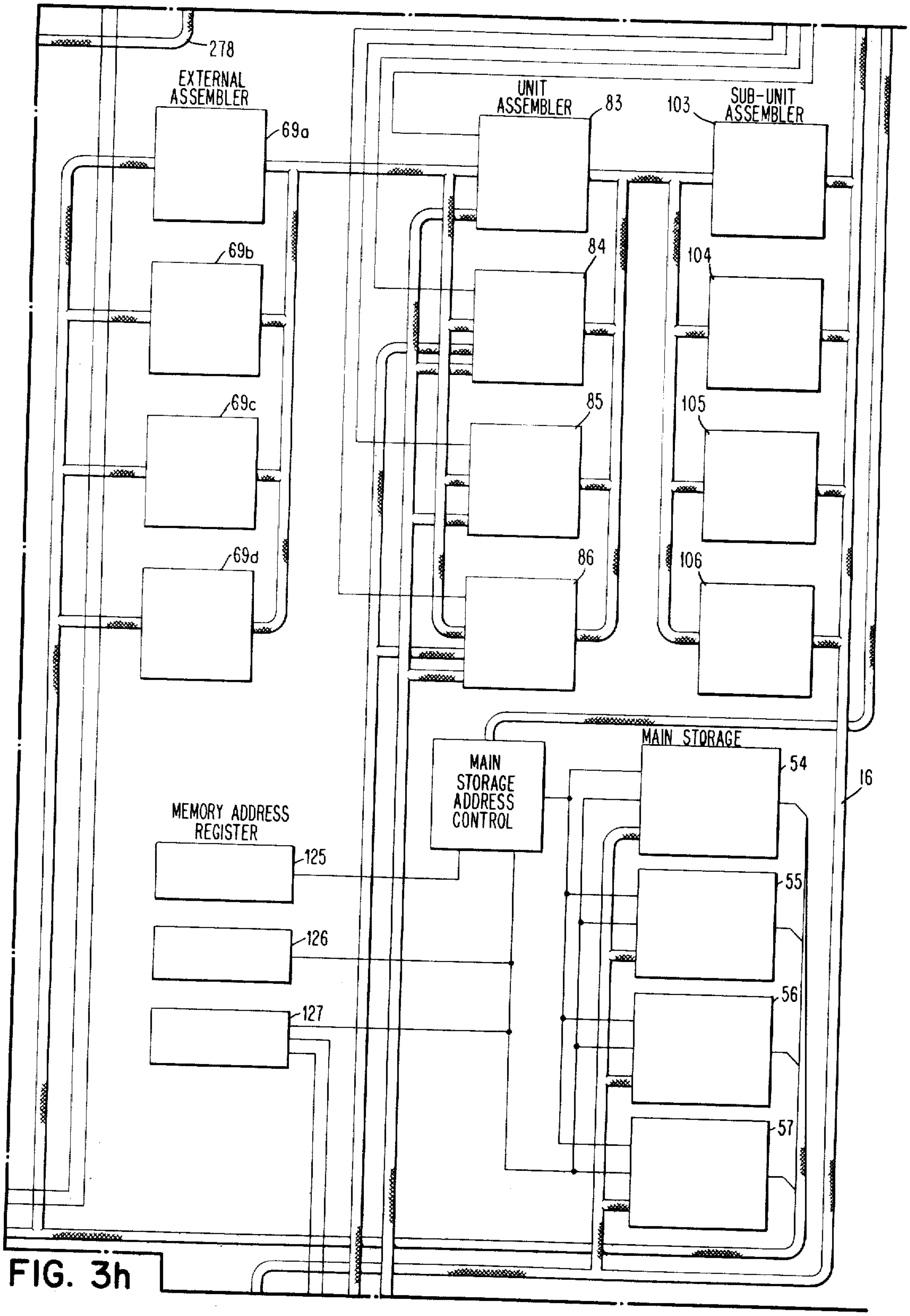
Figure 3I:
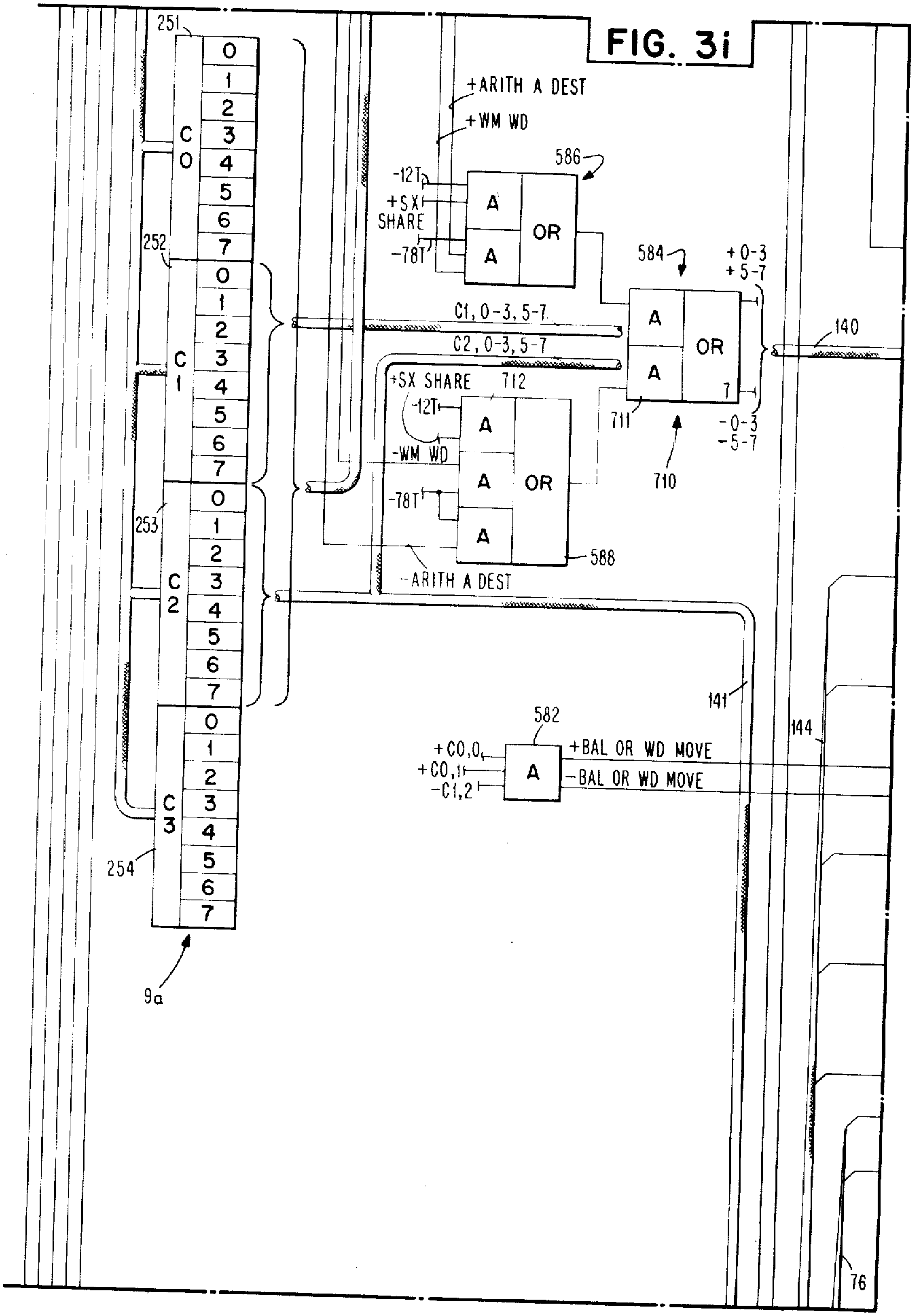
Figure 3J:
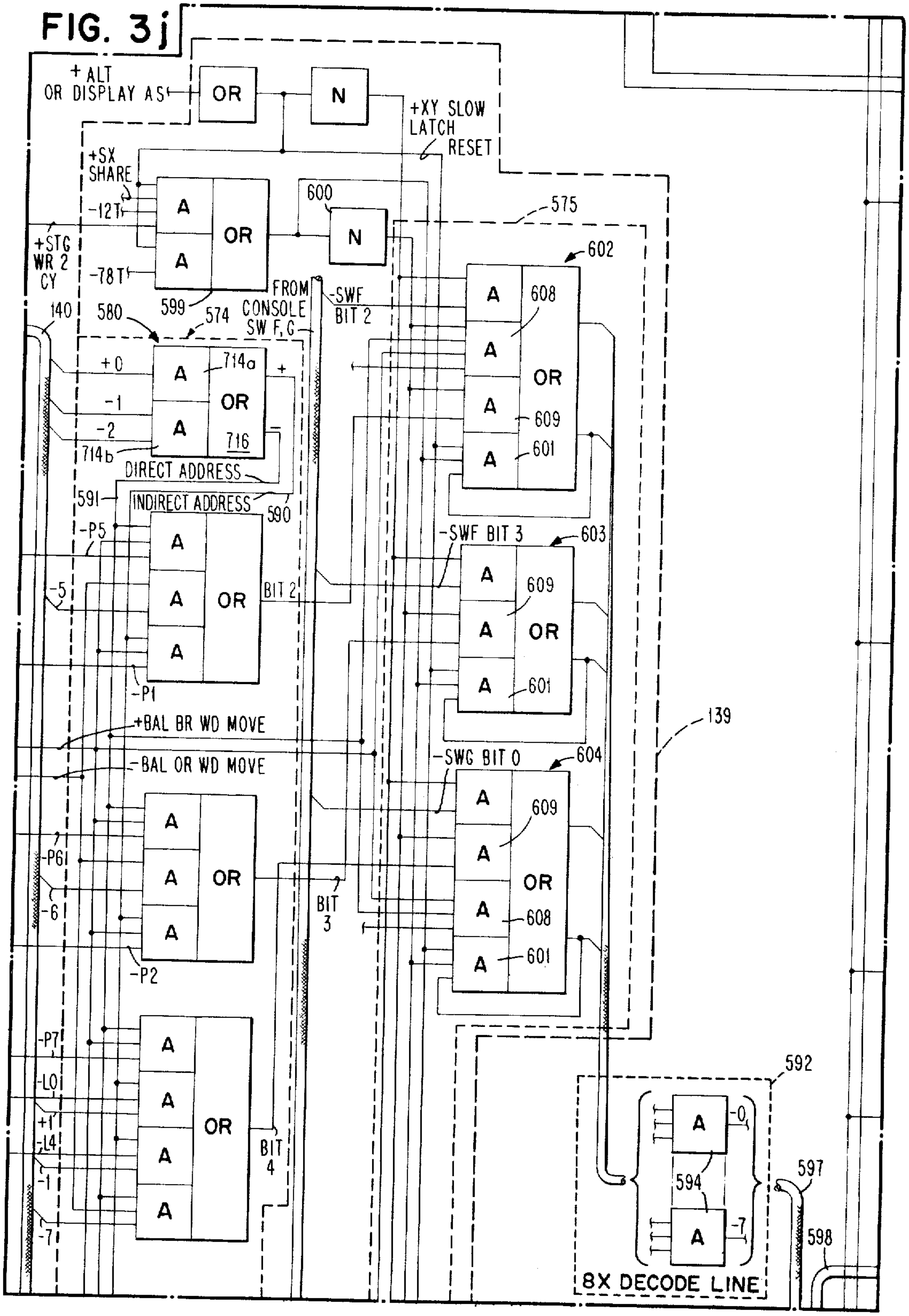
Figure 3K:
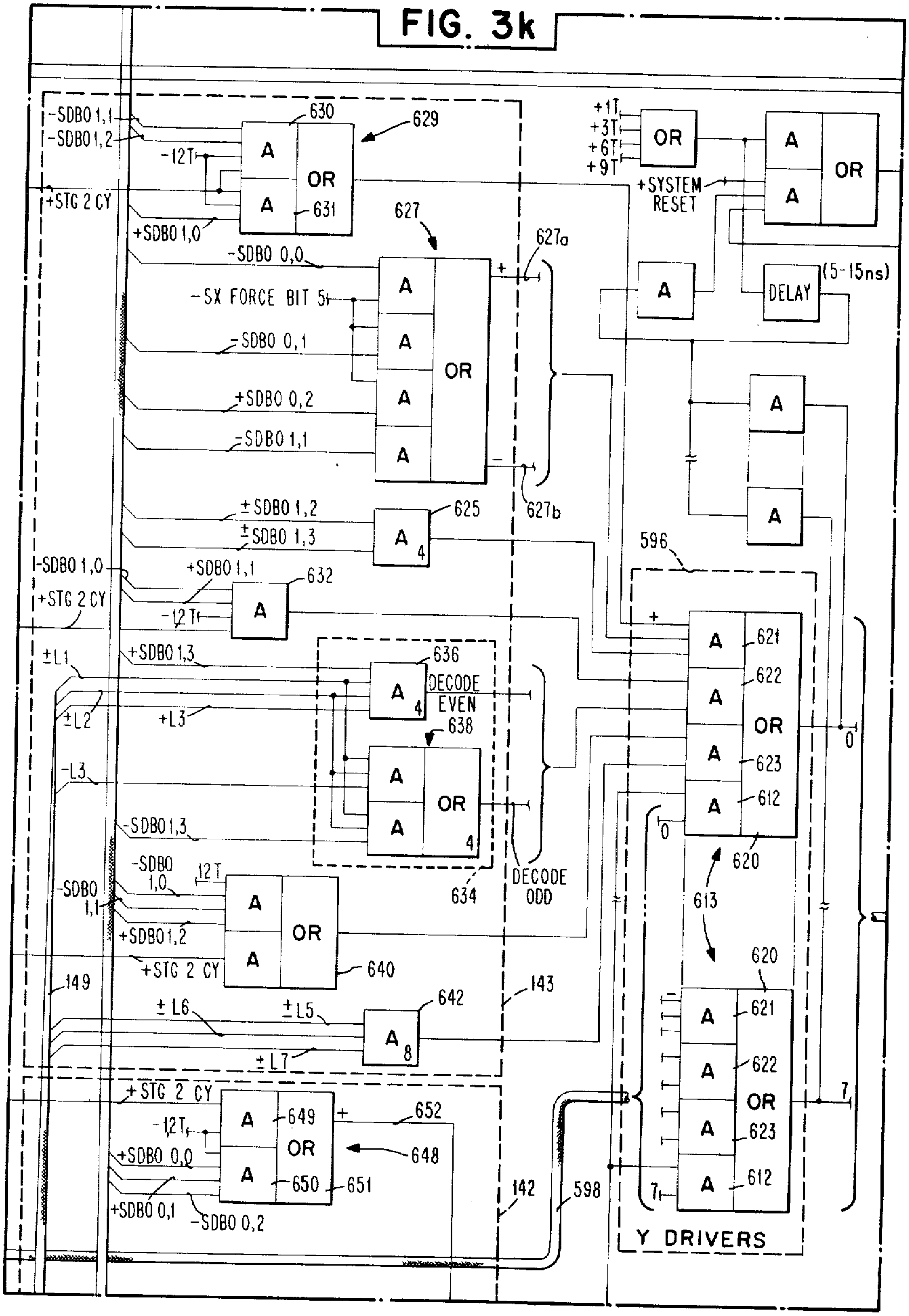
Figure 3M:
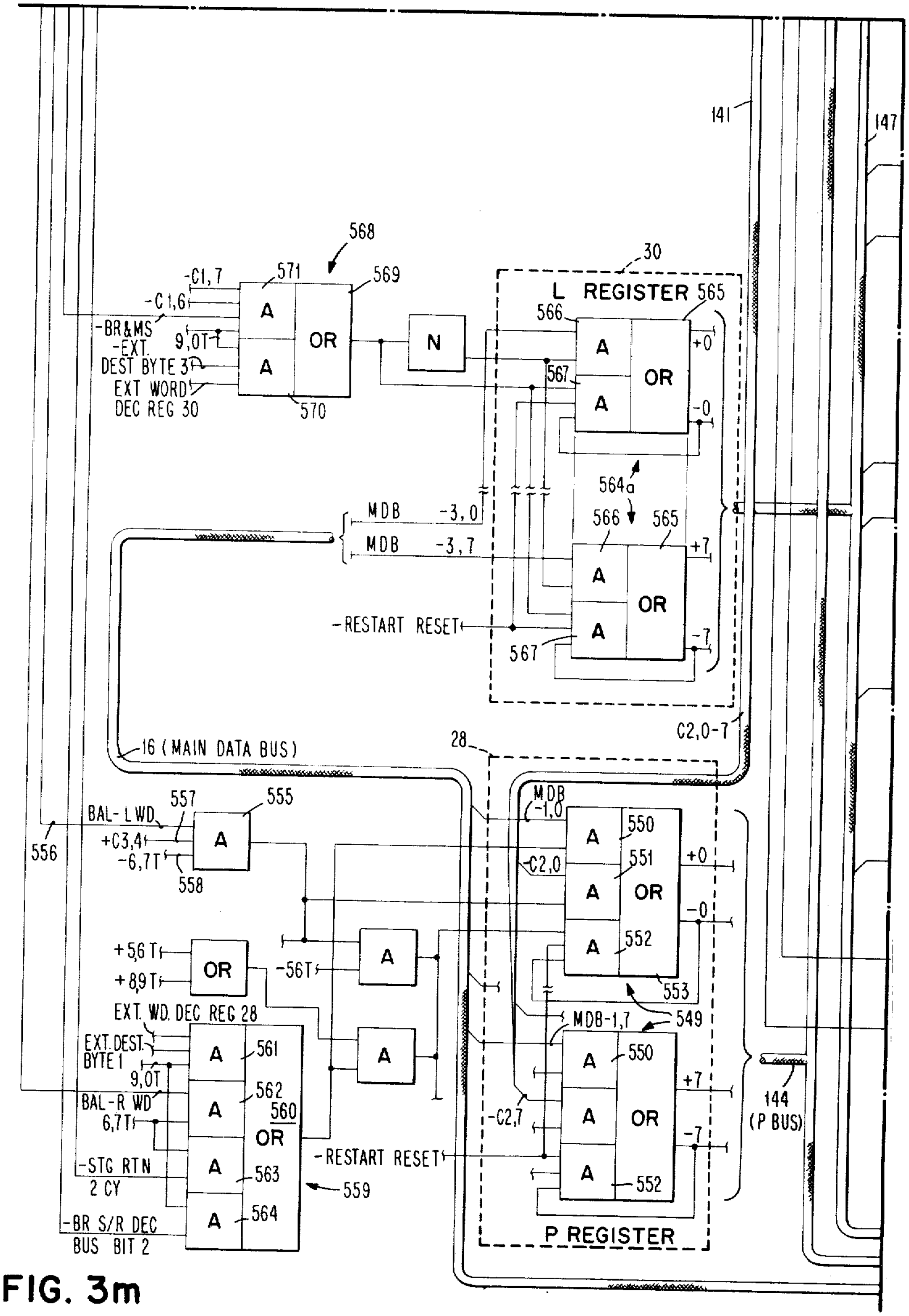
Figure 3N:
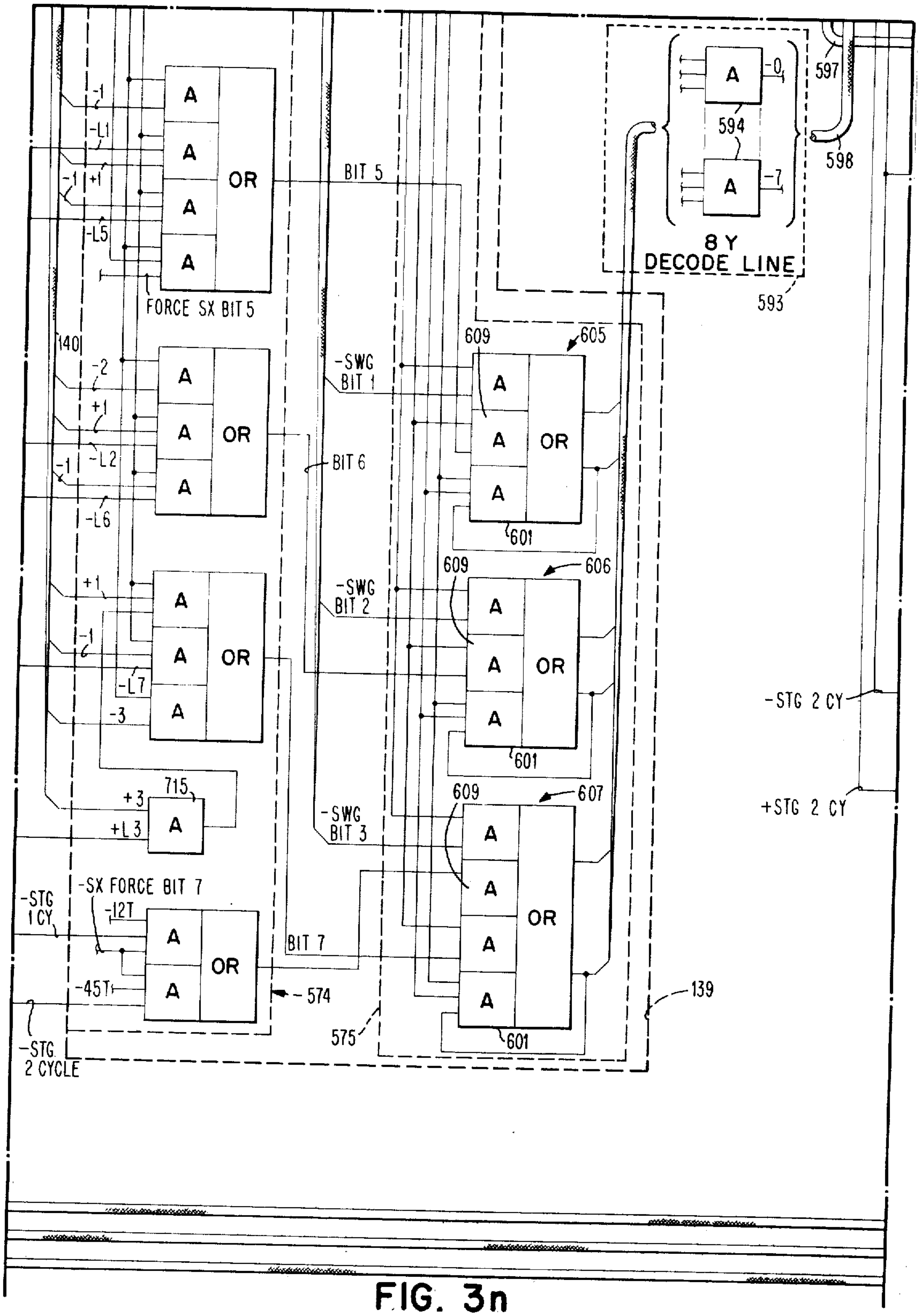
Figure 3O:
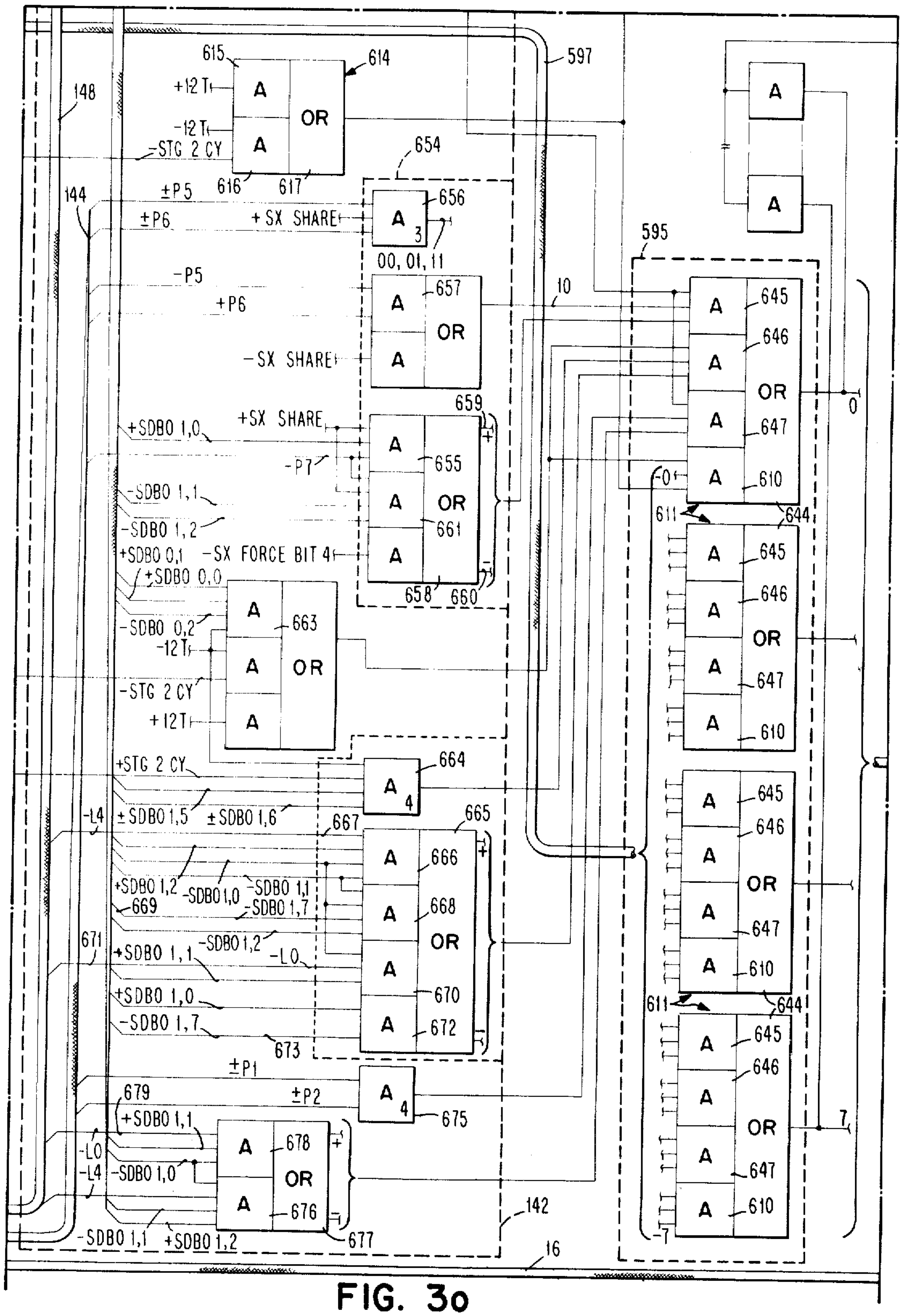
Figures 3, 3P:
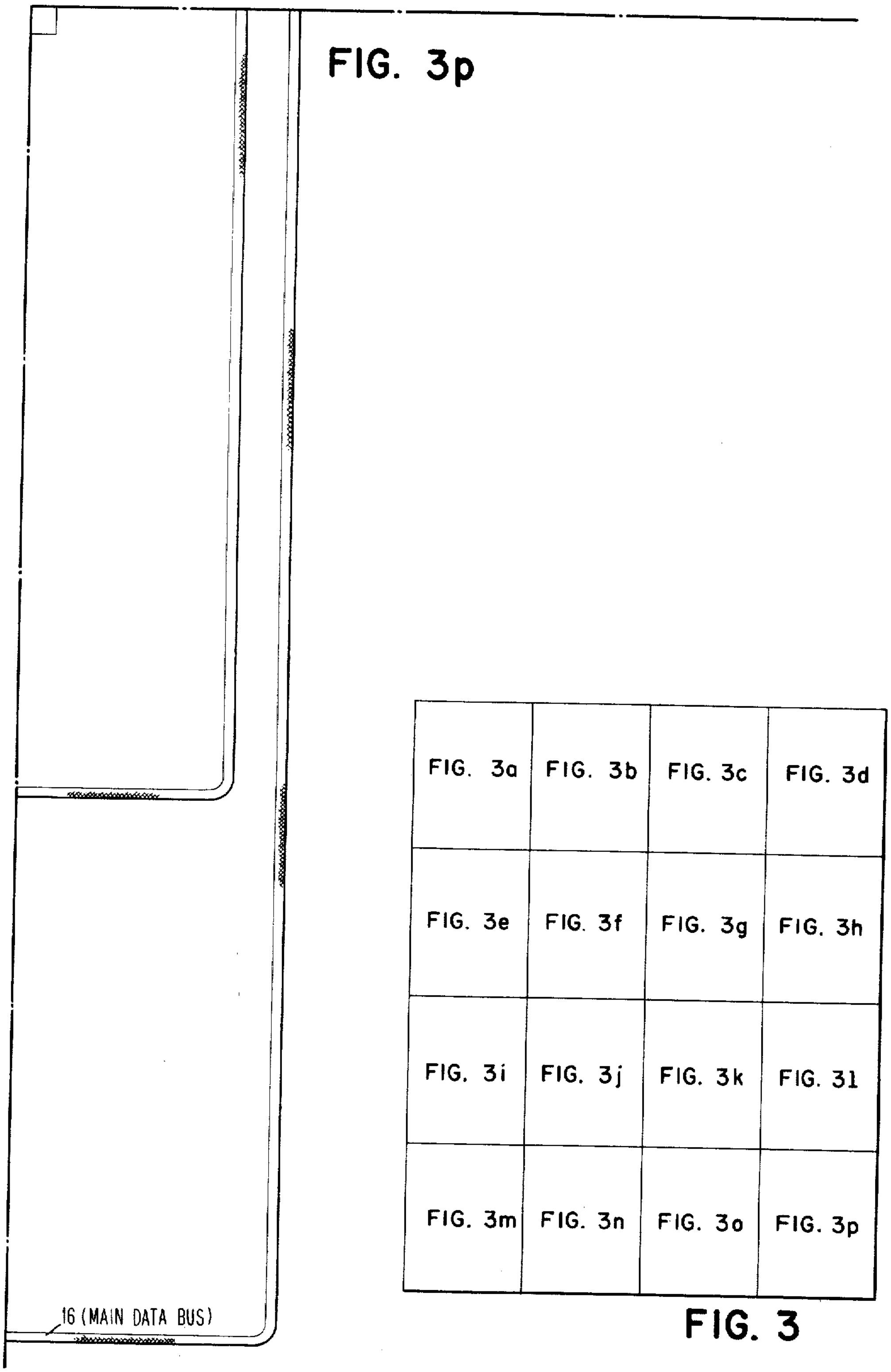

Referring to FIGURES 3*a* through 3*p*, there can be seen in greater detail the circuits associated with the indirect byte addressing feature. The control register 9*a*, shown in FIGURE 3*i*, is shown comprising four byte registers 251 through 254. Each register holds eight binary bits; each bit may be in either a binary 0 or a binary 1 condition. The contents of the registers 251 through 254 are distributed to various locations throughout the remaining circuits shown in FIGURES 3*a* through 3*p*. A shortened method of description is described herein for identifying the source of the bits applied through the remaining circuitry which originate from the control register 9*a*. The contents of the control register are divided into four bytes, described as C0, C1, C2 and C3, corresponding to the registers 251 to 254 respectively. One of the bytes, for example C0, is further sub-divided into eight binary bits labeled 0 through 7. To identify bit 3 in register 251, the line carrying that bit is labeled C0, 3. The remaining bits are similarly described as input signals for the remaining part of the circuitry shown in FIGURES 3*a* through 3*p*.

The decode circuit 9*b* is shown comprising a plurality of AND/OR logic elements. A B SOURCE byte address decode circuit 256 is shown in FIGURE 3*a*, comprising a plurality of AND gates 257 through 260. Each of the AND gates has a pair of input signals and a pair of output signals. When the pair of input signals specified thereby are present, the AND gate gives an enabling output signal. When the two input signals are not there, the AND gate gives a disabling output signal. The circuitry used throughout the drawing are generally known as minus AND and positive OR logic types. The AND gate 257 has a pair of input signals; a plus C1, 4 signal and a plus C1, 5 signal. The output signals comprise a plus 0 and a minus 0 output signal. The AND gate 258 has a pair of input signals, the first of which is the plus C1, 4 input signal and the second of which is the minus C1, 5 input signal. The output signal of the AND gate 258 is the plus 1 and the minus 1 output signals. The AND gate 259 has a pair of input signals, the first of which is the minus C1, 4 input signal, the second of which is the plus C1, 5 input signal. The output from the AND gate 259 comprises the plus 2 output signal and the minus 2 output signal. The AND gate 260 has a pair of input signals, the first of which is the minus C1, 4 input signal and the second of which is the minus C1, 5 input signal. The output from the AND gate 260 comprises a plus 3 and a minus 3 output signal. The output from the circuit 256 is applied to a C1 decode bus 262 for application to an increment/decrement control circuit 264, shown in FIGURE 3*g*, forming part of the sub-unit accessing and modifier circuit 19.

An A SOURCE address byte circuit 266 is shown comprising a plurality of AND gates 267 through 270 respectively. The AND gate 267 has two input signals, the first of which is the plus C2, 4 input signal and the second of which is the plus C2, 5 input signal. The AND gate 267 is equipped with two output signals, the plus 0 and the minus 0 output signals. The AND gate 268 has two input signals; the first of which is the plus C2, 4 input signal and the second of which is a minus C2, 5 input signal. The output signals from the AND gate 268 comprise the plus 1 output signal and the minus 1 output signal. The AND gate 269 is equipped with two input signals, the first of which is the minus C2, 4 input signal and the second of which is the plus C2, 5 input signal. The output signal from the AND gate 269 comprises the plus 2 and the minus 2 output signals. The AND gate 270 is equipped with a pair of input signals, the first of which is the minus C2, 4 input signals and the second of which is the minus C2, 5 input signal. The output from the AND gate 270 comprises the plus 3 output signal and the minus 3 output signal. The A SOURCE decode circuit 266 furnishes a plurality of signals to a C2 byte decode bus 272 for application to the increment/decrement control circuit 264 shown in FIGURE 3*g*.

The decode circuits 256 and 266 are employed for two major functions and each corresponds to an A SOURCE or a B SOURCE respectively. These decode circuits indicate whether the indirect byte addresses should be incremented or decremented and also whether the branch operation presently being used is a first mode branch or a second mode branch operation.

Corresponding to the decode circuits 256 and 266 are a pair of hardware adders 274 and 276 respectively, shown in FIGURE 3*c*. These hardware adders operate as decode hardware adders wherein they decode the contents of the corresponding bit positions of the register 340. Additionally, in response to control signals from the circuit 264, the adders 274 and 276 generate enabling signals for application to a plurality of gates over a bus 278. The storage function within the circuit 19 is performed by a register 280 having a sub-unit storage capacity of eight binary storage positions 282 through 289. These storage positions are respectively known as the T register bit T0 through T7 and are shown in FIGURES 3*b* and 3*f*.

The register 280 can be loaded from a plurality of various other storage positions. For example, corresponding bit lines of byte three of the main data bus 16 are connected respectively to the storage elements 282 through 289 by a separate input AND gate 290 in each of the storage positions. The various storage positions of the register 280 are loaded under direction of a load circuit 294, shown in FIGURES 3*b* and 3*f*, which decodes the various enabling conditions collected from throughout the machine for gating information into the various storage locations 282 through 289. The low four positions, 286–289 of the register 280 are loaded from the register 40, byte 3, bit positions 6 and 7 over an indirect byte address bus 296. This bus comprises two lines **296*a* and 296*b*, connected with bits 6 and 7 of the M3 byte of the register 40. Storage positions 286 and 288 are responsive to M3, 6 by an AND gate 298. Storage positions 287 and 289 are responsive to M3, 7 by an AND gate 300. The selection of a pair of storage positions 286 and 287 or 288 and 289 as a repository for the contents of the M3 byte, bits 6 and 7**, is determined by enabling signals generated by the decoding of various other positions of the control register.

A first AND gate 302 is shown having a plurality of input signals from the C register, the first of which is a minus enabling signal from C2, 4, a second of which is a positive C2, 6, and the third of which is a minus C2, 7 signal. The final input signal is an enabling signal from an AND gate 304. The AND gate 304 has two input signals, the first of which is a minus C0, 1 signal, and the second of which is a plus C0, 0 input signal. The output from the AND gate 304 indicates that the control word presently being decoded is of the storage word type. The output signal from the AND gate 304 controls the remaining functions which occur during a storage type control word. An additional AND gate 306 is equipped with a plurality of input signals applied, the first of which is the minus C2, 4 input signal, the second of which is the minus C2, 6, the third of which is the plus C2, 7 input signal, and the final input signal is the output from the AND gate 304. The plus enabling output signal from the AND gate 306 is applied to an OR gate 308, which gate 308 has as its second input signal, the plus enabling output signal from the AND gate 302.

The output signal from the OR gate 308 operates to reset, by a line 310, an AND gate 312, each of the storage positions 282 through 285 to a binary zero condition. The AND gate 312 is equipped with a plurality of other gating signals on lines 314 and 316, the complete understanding of which is not necessary for the present invention. The enabling signal on the line 314 is the eight/nine timing signal from the clock circuit and the enabling signal on the line 316 is the plus STORAGE INTERLOCK CYCLE. The enabling signal from the AND gate 302 is applied to an AND gate 318, shown in FIGURE 3*f*, over a line 320. The AND gate 318 has a plurality of additional input signals, one of which is the eight/nine timing signal from the clock circuit, on a line **318*a*, and the second of which is the STORAGE READ ONE CYCLE input signal from an AND gate 319 on a line 319*a*. The output from the AND gate 318 is applied as a gating input signal to the AND gates 298 and 300 in the storage positions 286 and 287 respectively. This effectively loads the contents of byte 3, bits 6 and 7 from the register 40 into the positions 286 and 287**.

The output signal from the AND gate 306 is applied to an AND gate 322 over a line 324. The remaining input signals from the AND gate 322 are the eight/nine timing signals from the clock circuit, and the STORAGE READ ONE CYCLE input signal from an AND gate 319 on a line **319*a*. The output from the AND gate 322 is applied to the AND gates 298 and 300 in the storage positions 288 and 289 respectively. This enabling signal from the AND gate 322 effectively stores the contents of the M3 byte, bits 6 and 7 into the storage positions 288 and 289. It can be seen, therefore, that either the storage positions 286 and 287 are loaded with the contents of the M3 byte, bits 6 and 7 when the enabling signal on the line 320 is available or the storage positions 288 and 289 are loaded with the contents of the M3 byte, bits 6 and 7 when the enabling signal on the line 324** is available.

The gating signal to the AND gate 290 in the storage positions 282 through 289 originates from a gating circuit 330. The gating circuit 330 comprises a first AND gate 332, having a plurality of input signals applied thereto, the first of which is the minus C0, 6 input signal, the second of which is the plus C1, 7 input signal, the third of which is the MINUS BRANCH AND MODULE SWITCH word input signal, and the fourth of which is the nine/zero input signal from the clock circuit. A second AND gate 334 has a plurality of input signals applied thereto, the first of which is the nine/zero timing signal from the clock circuit, the second of which is EXTERNAL DESTINATION BYTE TWO control signal, and the third of which is the EXTERNAL WORD T REGISTER control enabling signal. The output signals from the AND gate 332 and 334 are applied to an OR gate 336. The enabling signal from the OR gate 336 is applied as the second input enabling signal to the AND gate 290 associated with each of the storage positions 282 through 289 of the register 280. In this manner, the contents of the main data bus can be gated into the respective locations in the register 280. The output of the register 280 is distributed to various other circuits throughout the machine over the bus 185. Each of the output signals from the positions 282 through 285 is gated directly onto the bus 185, while the output signals from the positions 286 through 289 are gated onto the bus 185 by a buffer circuit 340. The circuit 340 is placed intermediate the output signal of the register 280 and the bus 185 in order to properly gate onto the bus 185. The halves of the register as they are needed. The positions 282 through 285 are used as a loading mask for application to a store under mask circuit 184 while the contents of bit positions 286 through 289 are gated into the hardware adders 274 and 276 to control the indirect byte addressing of the system.

The increment/decrement control circuit 264, shown in FIGURE 3*g*, comprises a plurality of logic circuits. A first OR gate 342 is equipped with a plurality of input signals, the first of which is a plus 1 decode circuit from the decode circuit 256, and the second of which is the plus 3 decode signal from the decode circuit 256. The output signal from the OR gate 342 is applied to an AND gate 344 having as a second input signal the output of an AND gate 368 shown in FIGURE 3*b*. The AND gate 368 also decodes various other bit positions of the register 9*a*, the first of which is the minus C0, 0 input signal, the second of which is the minus C2, 0 input signal, and the third of which is the minus C2, 2 input signal. The output signal from the AND gate 368 is additionally applied as one input signal to an AND gate 348, shown in FIGURE 3*g*, which gate has as a second input signal the minus 2 decode signal from the decode circuit 256. The enabling output signals from the AND gates 344 and 348 are applied to an OR gate 358 which generates the B increment/decrement enabling signal for application to an AND gate 360. The AND gate 360 has as a second input signal, the eight/nine timing signal from the clock circuit. A second enabling output signal from the AND gate 344 is applied as an enabling signal to an AND gate 362 input circuit of the hardware adder 274, shown in FIGURE 3*c*. The AND gate 362 has a plurality of additional input signals, the first of which is the eight/nine/zero timing signal from the clock circuit, and the second of which is the minus 6 input signal from the bus 185. An enabling output signal from the AND gate 348 is applied as a gating signal to an AND gate 364.

The AND gate 364 has an additional plurality of input signals, the first of which is the minus 1 decode signal from the decode circuit 266 and the second of which is the MINUS A SOURCE INDIRECT BYTE enabling output signal from an AND gate 346 shown in FIGURE 3*b*. The AND gate 346 has a plurality of input signals, the first of which is the minus C1, 0 input signal from register 9*a*, the second of which is the minus C1, 2 input signal from the register 9*a*, and the third of which is the minus C0, 0 input signal from the register 9*a*. The output from the AND gate 346 is also applied as an enabling input signal to an additional plurality of AND gates 370, 371 and 372 shown in FIGURE 3*g*. The AND gate 370 has a second input signal from the minus 3 decode line of the decode circuit 266. The AND gate 371 has a plurality of additional input signals, the first of which is an enabling output signal from the AND gate 348, the second of which is the MINUS A SOURCE INDIRECT BYTE enabling signal, and the third of which is the minus 1 output decode signal from the decode circuit 266. The AND gate 372 has an additional input signal from the minus 2 decode signal line from the decode circuit 266. The output signals from the AND gates 370 and 371 are applied to an OR gate 374. One enabling output signal from the OR gate 374 is applied as one input to an OR gate 376. The output signals from the AND gates 372 and 364 are applied as input signals to an OR gate 378. One enabling output signal from the OR gate 378 is applied to the second input to an OR gate 376. A second enabling output signal from the OR gate 374 is the MINUS INCREMENT BIT POSITION T4 and T5 enabling signal which is applied to an AND gate 380 in the hardware adder circuit 276. The minus T4 and T5 decrement signal from the OR gate 378 is applied as an enabling signal to an AND gate 382 of the hardware adder 276. The A SOURCE INCREMENT/DECREMENT signal from the OR gate 376 is applied as an enabling signal to an AND gate 384 shown in FIGURE 3*f*. The AND gate 384 has as a second enabling signal the eight/nine timing signal from the clock circuit. The output from the AND gate 384 is applied to an AND gate 386 in both the storage positions 286 and 287 respectively. The second input signal to the AND gate 386 is from the output bus 278 from the adders 274 and 276. The AND gate 386 in position 286 of the register 280 is responsive to the T4 GATE SIGNAL on the bus 278 while the AND gate 386 in position 287 is responsive to the T5 GATE SIGNAL from the bus 278. The output signal from the AND gate 360, shown in FIGURE 3*f*, is applied to the AND gate 388 in the storage positions 288 and 289 respectively. The AND gate 388 in storage position 288 has as its second input signal the T6 GATE SIGNAL from the bus 278. The AND gate 388 in storage position 288 has as its second input signal the T7 GATE SIGNAL from the bus 278.

One of the functions of the bus 185, as shown in FIGURES 3*c* and 3*g*, is to transfer the contents of the bit positions 4 and 5 of the register 280 to the hardware adder 276 and the bit positions 6 and 7 of the register 280 to the hardware adder 274. A first section 390 of the hardware adder 276 operates as a decode circuit of the 286 and 287 bit positions of the register 280. A first AND gate 392 receives a plurality of input signals, the first of which is the minus bit 4 position of the register 280, the second of which is the four/five/six timing signal from the clock, and the third of which is the DECREMENT enabling signal from an AND gate 394. The AND gate 394 has a plurality of input signals, the first of which is the A SOURCE INDIRECT BYTE enabling signal from the AND gate 346 and the second of which is the output signal from a decode circuit 396, shown in FIGURE 3*e*. The decode circuit 396 again is responsive to the control register 9*a*. More specifically, the circuit 396 has as its first input signal the minus C0, 0 signal, a second input signal of minus C0, 2, a third input signal of minus C0, 3 and the not MULTIPLEX FORCE signal on a line 397.

The AND gate 382, shown in FIGURE 3*c*, is equipped with a plurality of input signals, the first of which is the plus 4 input signal from the bus 185, the second of which is the eight/nine/zero timing signal from the clock, and the third of which is the enabling output signal from the OR gate 378. The AND gate 380 is also equipped with a plurality of input signals, the first of which is a minus 4 input signal from the bus 185, the second of which is the eight/nine/zero timing signal from the clock circuit, and the third of which is the negative increment T4, T5 signal from the OR gate 374. An AND gate 398 is equipped with a plurality of input signals, the first of which is the minus 4 input signal from the bus 185 and the second of which is the one/two/three timing signal from the clock circuit. The output from the AND gates 380, 382, 392, and 398 are applied to an OR gate 400.

The OR gate 400 generates a first enabling output signal for application to a plurality of AND gates 402 and 404, and a second enabling output signal for application to a plurality of AND gates 406 and 408. The AND gate 402 is equipped with an additional input signal which is the plus 5 input signal from the bus 185. The AND gate 404 is equipped with an additional input signal which is the minus 5 input signal from the bus 185. The AND gate 406 is equipped with an additional input signal which is a plus 5 input signal from the bus 185, and the AND gate 408 is equipped with an additional input signal which is the minus 5 input signal from the bus 185. The AND gates 402 through 408 are equipped with a first enabling output signal and a second enabling output signal. The second enabling output signal from each of the AND gates 402 through 408 is applied to a bus 410 for insertion into their positions 282 through 285 of the register 280 by an AND gate 411 respectively. The AND gate 411 receives a second enabling input signal from an AND gate 439*a*. The AND gate 439*a* is equipped with a plurality of input signals, the first of which is the five/six timing signal from the clock, and the second of which is the output signal from an AND gate 394. The AND gate 394 is equipped with a plurality of input signals, the first of which is the output of the AND gate 346, and the second of which is the output signal of a decode AND circuit 396, shown in FIGURE 3*e*. The first enabling output signal from the AND gate 402 is applied to an OR gate 418, shown in FIGURE 3*d*, and the first enabling output signal from the AND gate 404 is applied to an OR gate 420. The first enabling output signal from the AND gate 406 is applied as a gating signal to both the OR gates 418 and 420. The output signals from the OR gates 418 and 420 are applied to the bus 278 for re-insertion into their respective positions 286 and 287 of the register 280.

The hardware adder 274 is additionally equipped with a decode circuit 422 which operates in a manner similar to the decode circuit 390 but having different input signal from the bus 185. The decode circuit 422 is equipped with a plurality of AND gates 424, 425, 426 and the AND gate 362. The AND gate 424 is equipped with a plurality of input signals, the first of which is the minus 6 input signal from the bus 185, the second of which is the four/five/six timing signal from the clock, and the third of which is an enabling input signal from the AND gate 414. The AND gate 425 is equipped with a plurality of input signals, the first of which is the plus 6 input signal from the bus 185, the second of which is the eight/nine/zero timing signal from the clock, and the third of which is the minus DECREMENT T6, T7 enabling signal from the AND gate 348, shown in FIGURE 3*g*. The AND gate 362 is also equipped with a plurality of input signals, the first of which is a minus 6 signal from the bus 185, the second of which is the eight/nine/zero timing signal from the clock, and the third of which is an enabling output signal from the AND gate 344. The AND gate 426 is equipped with a plurality of input signals, the first of which is a minus 6 input signal from the bus 185, and the second of which is the one/two/three timing signal from the clock.

The appropriate output signals from the AND gates 424, 425, 426, and 362 are applied to an OR gate circuit 428 which generates a first enabling output signal for application to a pair of AND gates 430 and 432 and which generates a second enabling output signal for application to a pair of AND gates 434 and 436. The AND gate 430 is furnished an additional input signal from the plus 7 line of the bus 185 and the AND gate 432 is furnished the minus 7 input signal from the bus 185. The AND gate 434 is furnished the plus 7 input signal from the bus 185. The AND gate 436 is furnished the minus 7 input signal from the bus 185. AND gates 430 through 436 are employed to generate a first enabling output signal and a second enabling output signal for each stage. The second enabling output signal for each stage is applied to a feedback bus 438 for application to the respective stages 282 through 285 of the register 280 by an AND gate 439. The AND gates 439 each receive a second enabling signal from an AND gate 412. The AND gate 412 receives a pair of input signals, the first of which is the five/six timing signal from the clock, and the second of which is the output of the AND gate 414. The AND gate 414 is equipped with a plurality of input signals, the first of which is the output of the AND gate 368, and the second of which is the output signal of a decode AND circuit 416 shown in FIGURE 3*e*. The AND gate 416 is equipped with a plurality of input signals, the first of which is the plus C0, 3 signal, the second of which is the minus C0, 0 input signal, and the third of which is a not MULTIPLEX FORCE input signal. The first enabling output signal of the AND gate 430 is applied to an OR gate 440 and the first enabling output signal of the AND gate 432 is applied to an OR gate 442. The first enabling output signal of the AND gate 434 is applied to both the OR gate 440 and the OR gate 442. The output signals from the OR gates 440 and 442 are applied to appropriate portions of the bus 278. The signals on the bus 278 are employed for re-insertion into their respective positions 288 and 289 of the register 280.

A B register input control circuit 450, shown in FIGURE 3*d*, is equipped with a plurality of logic circuits, one of which is shown at 452 comprising a plurality of AND gates 453 through 456. Actually, the circuit 452 comprises a total of three copies of the circuits shown in the figure. The input bus 262 to the AND gates 453 applies the minus 0, 1, and 2 signal thereto from the decode circuit 256. The gating signal for these signals is generated by an enabling circuit 456*a*. The input bus to the AND gate 455 is shown carrying the minus 0, minus 1, and minus 2 input signals from the AND gates 430, 432, and 434. Each one of the signals from these last-mentioned AND gates is applied to a separate AND gate 455. The separate AND gate is then gated with an enabling signal from an AND gate 456*b*. Similarly, the AND gate 454 is actually three AND gates, each of which receives a separate input signal from the AND gates 402, 404, and 406 respectively. Each of the AND gates is then gated with an enabling signal from an OR gate 456*c*. The AND gates 456 receive their input signals over the bus 272. The minus 0, 1, and 2 signals from the decode circuit 266 are applied to individual AND gates 456. An enabling signal is applied thereto by an AND gate 456*d*. It can be seen, therefore, that the output signals 0, 1, and 2 from the adders 274 and 276 and the decode circuits 256 and 266 are gated to a plurality of OR gates 459*a*, 459*b*, and 459*c*. The outputs from these various sources are gated into the OR gates 459*a* through 459*c* by a variety of input gating signals. These gating signals include the output from the OR gates 456*a* through 456*c*. The AND gate 456*b* is equipped with a pair of input signals, the first of which is MINUS B INDIRECT enabling signal from the AND gate 368, and the second of which is the 2/3 timing signal from the clock. The OR gate 456*c* is equipped with a pair of input signals from a pair of AND gates 460 and 462. The AND gate 460 is equipped with a plurality of input signals, the first of which is a 4/5 timing signal from the clock, and the second of which is the A SOURCE INDIRECT BYTE addressing enabling signal from the AND gate 346. The AND gate 462 is equipped with a plurality of input signals, the first of which is an A SOURCE INDIRECT BYTE signal from an AND gate 464, shown in FIGURE 3*a*. The second input signal is the output of an OR gate 466, and the third of which is the 2/3 timing signals from the clock. The OR gate 466 is equipped with a plurality of input signals, the first of which is an output signal of an AND gate 472, shown in FIGURE 3*a*, and the second of which is a branch word decode signal from an AND gate 470. The AND gate 470 is equipped with a plurality of input signals from the control register. The first enabling signal is a plus C0, bit 0, a plus C0, bit 1, a plus C0, bit 2, and a minus C0, bit 3. The AND gate 472 has a plurality of input signals applied thereto from the control register, the first of which is the plus C0, bit 0, the second of which is the plus C0, bit 1, the third of which is the plus C0, bit 2, and the fourth of which is the plus C0, bit 3.

The enabling circuit 456*a* as shown in FIGURE 3*d* comprises a pair of AND gates 480 and 482 applying output signals to an OR gate 484. The AND gate 480 is equipped with a plurality of input signals, the first of which is the output of an OR gate 486, the second of which is the plus A INDIRECT BYTE enabling signal from the circuit 464, shown in FIGURE 3*a*, and the third of which is the 4/5 timing signal from the clock. The OR gate 486 is equipped with a pair of input signals, the first of which is from the circuit 472 shown in FIGURE 3*a*, and the second of which is the Branch S/R Dec 0 enabling signal on a line 488.

The AND gate 482 is equipped with a plurality of input signals, the first of which is the output of an OR gate 490, the second of which is the plus A INDIRECT BYTE enabling signal from the circuit 464, shown in FIGURE 3*a*, and the third of which is the 2/3 timing signal from the clock. The OR gate 490 is equipped with a plurality of input signals, the first of which is the output of the circuit 470, shown in FIGURE 3*a*, the second of which is the output of the circuit 472, shown in FIGURE 3*a*, and the third of which is the plus ARITHMETIC NOT AK WORD enabling signal on a line 492.

The AND gate 456*d* is equipped with a plurality of input signals, the first of which is the 4/5 timing signal, the second of which in the ARITH WD enabling signal from the circuit 416, shown in FIGURE 3*e*, and the third of which is the plus A INDIRECT enabling signal from the AND gate 346.

When one of the enabling circuits 456*a* through 456*d* is active, a mask is gated into the OR gates 459*a* through 459*c* in such a way as to gate any of the sub-assemblies 83 through 86 to the sub-assembly 106 of the sub-assembler 14. The sub-assembly 106 forms the input of the B register 23 shown in FIGURE 1.

The bus 185 is also connected to a store control circuit 48 whereby the contents of the positions 282 through 285 are gated by an enabling signal from the AND gate 302 for transfer to the main memory storage controls 50 whereby only the bytes specified by the storage mask are returned to the main memory storage location 2.

The current 48 comprises a plurality of AND gates 494 through 497 responsive to the positions 282 through 285 respectively of the register 280. Each of the gates 494 through 497 receives its enabling signal from the AND gate 302.

The operation of the circuit 19 is given in greater detail with respect to FIGURES 6*a* and 6*b* and 3*a* through 3*h*. The storage function of the circuit 19 is performed by the register 280 comprising the positions 282 through 289. The high order four positions, 282 through 285, perform a storage mask function. More specifically, this means that prior to operating upon data withdrawn from main memory, for example an arithmetic operation, the upper four positions 282 through 285 are reset to a binary 0 condition. Thereafter, when any sub-unit or byte of information is processed, its byte position is clearly identified by the setting of a binary 1 into the corresponding bit positions 282 through 285. In this manner, only those bytes of information which have been processed are rewritten into main memory. When a message ends or begins on other than a word boundary, it is necessary that the remaining message within the same word is not disturbed in main storage. The masking operation of the positions 282 through 285 accomplishes this result.

The positions 286 and 287 are functionally joined together to contain the address of the individual byte of a first operand of an arithmetic operation. The positions 288 and 289 are functionally joined together to represent the byte address of the second operand of an arithmetic operation. Obviously, if a unit or word of information contained more than four bytes, the positions required to identify and address the bytes would be expanded to cover the required number of positions. The output from the positions 286 and 287 are applied to a two-bit adder 276. An output from a selected one, the adders 274 and 276, is directly applied to the storage positions 282 through 285 by a selected one of the AND gates 411 and 439 in each position in such a manner as to indicate the byte address which is presently undergoing an arithmetic operation. At a later time in the same cycle, the output of the positions 286 and 287 are combined with the control information from the increment/decrement control circuit 264 in order to either increment or decrement the address contained in the positions 286 and 287. The altered address information is conveyed by the bus 278 back to the positions 286 and 287 by the AND gate 386. The increment/decrement control signals are a combination of the output from the decode circuits 256 and 266 and the AND gates 346 and 368. The increment/decrement circuit 274 operates in a similar manner with the contents of the positions 288 and 289. The outputs of the OR gates 452, of which there are three such OR gates, select the byte which is gated into the B register. This information can come selectively from the positions 286 and 287, or the pair of positions 288 and 289, or the output of the decode circuit 256, or the output of the decode circuit 260.

Figure 6A:
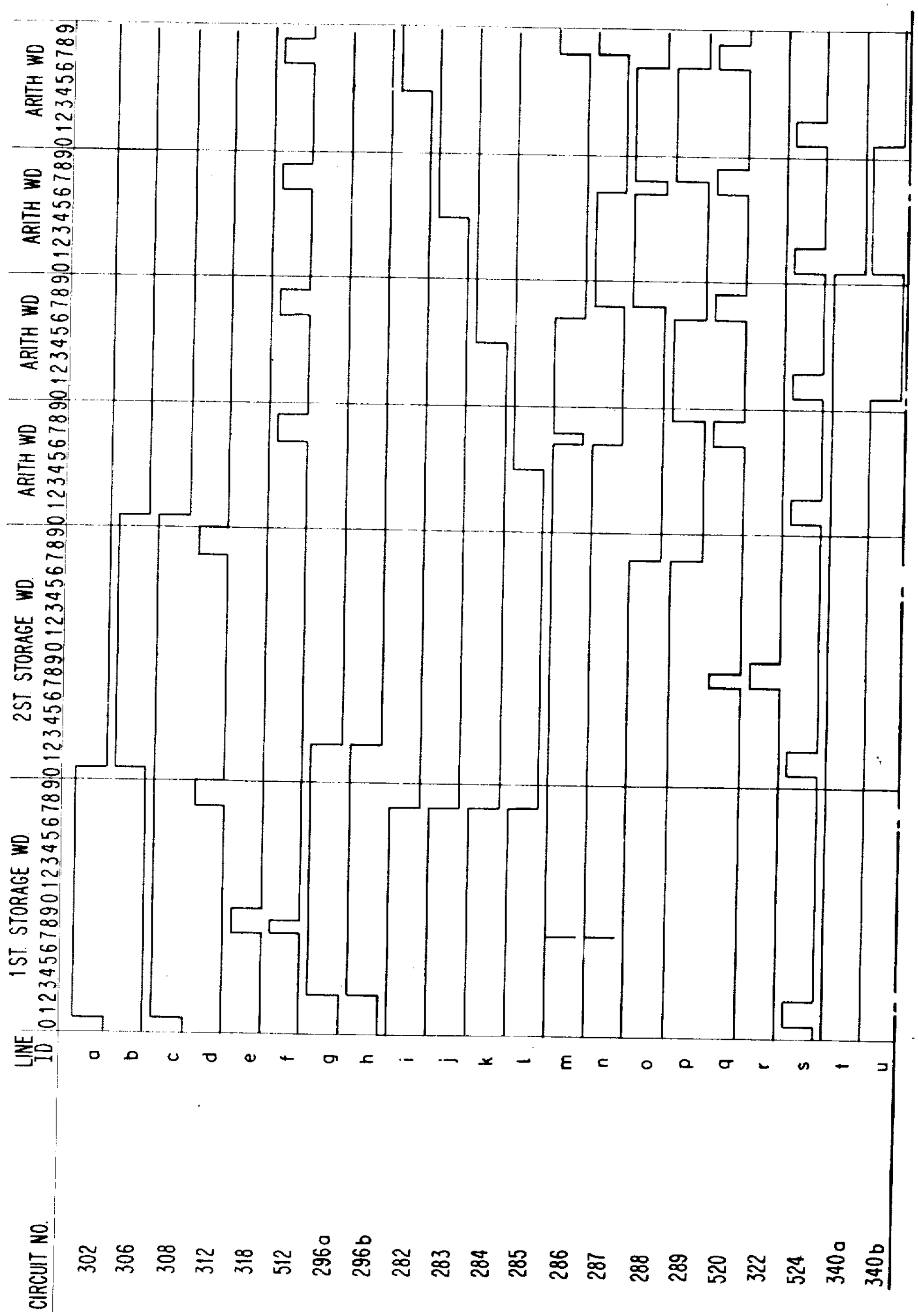
FIGURES 6*a* and 6*b* show various timing signals showing the sequence of operation of certain elements in the circuit 19.
Figure 6B:
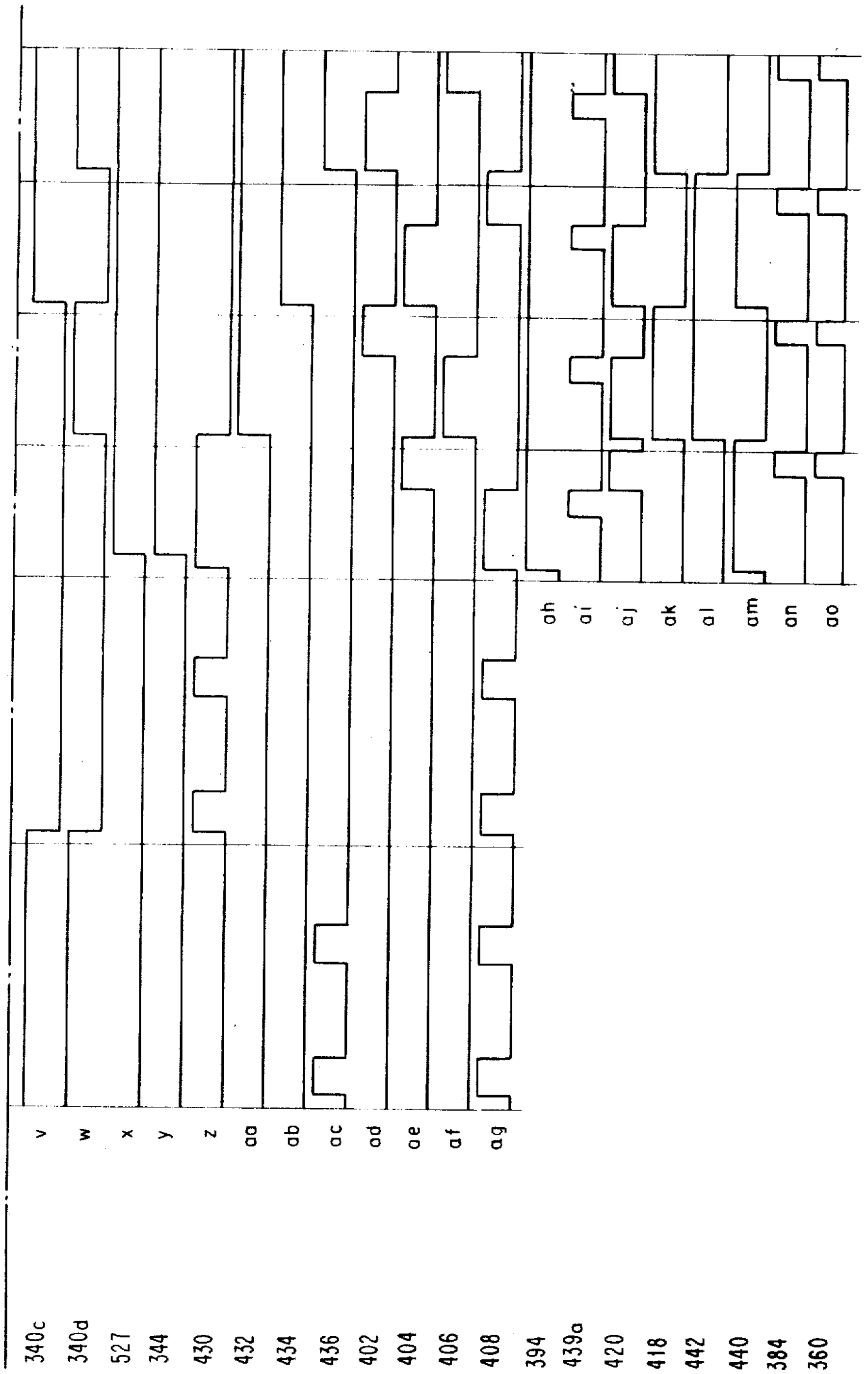

The operation of the circuit 19 will now be more specifically described with reference to the timing diagrams shown in FIGURES 6*a* and 6*b* in combination with FIGURES 3*a* through 3*h*. FIGURES 6*a* and 6*b* represent the operating characteristic of the circuits identified in the circuits column. Additionally, each of the circuit columns is further identified as a line A through line AP. The timing diagram is not an operational timing diagram, but it is for illustration and descriptive purposes only.

The operation of the circuit 19 is described basically in relationship with two types of words, namely: a storage word and an arithmetic word. For a complete explanation of the storage addressing modes, reference made to a co-pending W. P. Hanf et al. U.S. patent application entitled, "Storage Addressing Mechanism Having Plural Address Generating Paths" and assigned to the assignee of the present invention. Just sufficient information is included herein for tying the storage word operation into the operation of the circuit 19. The first control word to be executed will be a storage word. This word contains identification indicia therein for activating the AND gate 304 and either of the AND gates 302 or 306. The storage read operation is further identified by the enabling of a pair of AND gates 506 and 508 shown in FIGURES 3*e* The function of the first control word is to reset the positions 282 through 284 to a clear condition represented by binary 0's in each position. This function is performed in the following manner. The output of the AND gate 302, line A, FIGURE 6*a*, is applied to the AND gate 312, line D, by the OR gate 308, line C, and the line 310. The remaining inputs to the the AND gate 312 are satisfied, thereby applying an enabling output signal to the AND gate 502 in each of the positions 282 through 285. The restart and reset signal is available on a line 510. The next function of the present control word is to reset a pair of positions in the low order half of the register 280. The selected pair comprises positions 286 and 287. The output of the AND gate 302 is applied over a line 320 to an AND gate 318, line E. The output of the AND gate 318 activates a reset circuit 512, line F. The reset circuit 512 comprises a pair of AND gates 514 and 516. The output of the AND gates 514 and 516 is applied to an OR gate 518. The AND gate 514 has a second input signal other than the AND gate 318 comprising the 7/8 time timing signal. The AND gate 516 is equipped with a plurality of input signals, the first of which is the 7/8 time timing signal and the second of which is the output of the OR gate 376. It can be seen with reference to the output of lines F and E that the output from the AND gate 318 continues for a time after the output from the circuit 512 drops. More specifically, this means that the output from the circuit 512 resets positions 286 and 287 to a binary 0 condition or a clear state. The output from the AND gate 318 gates the contents of the lines 296*a* and 296*b* into the positions 286 and 287 respectively. The contents of the lines 296*a* and 296*b*, lines G and H, comprise byte or address indicia from the register 40 shown in FIGURE 1. The positions 286 and 287 hold address indicia to select a byte of the first operand. For the purpose of this description, it will be assumed that the line 296*a* and 296*b* both contain a binary 1 at this time. Accordingly, a binary 11 is loaded into positions 286 and 287 respectively of the register 280. This completes the functioning of the first control word.

The second control word operates similarly to the first control word. The function is to reset to zero the positions 282 through 285 of the register 280 and to load byte address indicia of the second operand into positions 288 and 289. The contents of the lines 296*a* and 296*b* are changed by other machine operations intermediate to the loading of the positions 286 and 287 and the present operation to load the positions 288 and 289. The enabling signals are now generated by the AND gate 306 shown in line B of FIGURE 6*a*. The output from AND gate 306 is applied to an AND gate 322, line R, over the line 324. The output of the AND gate 322 is applied to a circuit 520, line G, which operates to reset the positions 288 and 289. The circuit 520 comprises a pair of AND gates 522 and 524. The output of these AND gates are applied to an OR gate 526. The input signals to the AND gate 522 is the output of the AND gate 322 and the 7/8 time signal. The input signal to the AND gate 524 comprise the 7/8 time signal from the clock and the output of the OR gate 358.

It can be seen that the output from the AND gate 322 persists longer than the output of the circuit 520. Accordingly, the operation of these circuits is as follows. The output from the circuit 520 resets the positions 288 and 289 and the output from the AND gate 322 loads the contents of the lines 296*a* and 296*b* into the positions 288 and 289 respectively. For the purpose of this description, we assume that a binary 0 is present on both lines 296*a* and 296*b*. Accordingly, binary 0's are loaded into positions 288 and 289. This ends the second storage control word function.

The next significant control word to be executed by the circuit 19 is identified as an arithmetic word. This word has a C1 field containing a hexadecimal value of E4 and a C2 field containing a value of F8. The C0 field in its bit positions 2 and 3 contains a binary 1 and 0 respectively. The identified arithmetic control word operates to generate a plurality of enabling signals. Alternatively, the output of the AND gate 416 or the AND gate 396, shown in FIGURE 3*e*, is generated. It is the functioning of the output of these AND gates to determine whether the processed information or result will be placed either in the first operand or second operand location. Accordingly, the storage mask is generated by the two-bit adder 276 or 274 respectively. In the example being described, the output signal from the AND gate 416 is applied by a line 522 to the AND gate 414, shown in FIGURE 3*b*. The output of the AND gate 416 indicates that the ARITHMETIC word is an $A=A/B$. This means that the result of the A SOURCE and the B SOURCE arithmetic operation is returned to the A SOURCE storage position. The output of the AND gate 414 is applied to the AND gate 412. The output from the AND gate 412 is applied to the input AND gate 411 to each position 282 through 285. In this manner the contents of the bus 410, which is described hereinafter, is gated into the positions 282 through 285. The $B=A/B$ signal from the AND gate 396 selects the B source as the destination. Accordingly, the storage mask is generated by the adder 274.

The many operating modes of the adder 274 is now described. Generally, the logic employed herein is known as negative AND logic. Whenever one of the AND gates 424, 425, 362, or 426 is furnished all enabling input signals, the OR gate 428 develops a minus enabling signal at its lower output line and a disabling output signal at its upper output line. Whenever none of the AND gates 424, 425, 362, or 426 is furnished all enabling input signals, the OR gate 400 develops a minus enabling signal at its upper output line and a disabling output signal at its lower output line. Each of the AND gates 430, 432, 434, and 436 generates two enabling signals whenever its input requirements are satisfied.

The special branching signals T67=00 and T67=11 will now be described. A T67=11 condition is characterized by the output from the bus 185 of the minus 6 and minus 7 output signals. At 1/2/3 time, the AND gate 426 is supplied two enabling input signals, namely, minus 6 enabling singal from the bus 185, and the timing signal. Accordingly, the output from the OR gate 428 is an enabling signal from the lower output signal for application to the AND gates 434 and 436. The minus 7 enabling signal from the bus 185 is applied to the AND gate 436. The output from the AND gate 436 is the T67=11 signal on a line 540.

The T67=00 is characterized by the plus 6 and plus 7 signals from the bus 185. The AND gate 426 is the only AND gate furnished the 1/2/3 time signal. Accordingly, at this time the OR gate 428 generates an enabling signal from its upper output line indicating that none of its input AND gates are supplied with all enabling input signals. The enabling output signal from the OR gate 428 is applied to the AND gates 430 and 432. The plus 7 enabling signal from the bus 185 is applied to the AND gate 430. Accordingly, the AND gate 430 is equipped with two enabling signals and the output from this AND gate indicates that T67=00 on a line 542.

At 4/5/6 time it is the function of the adder 274 to generate the storage mask for loading into the upper four positions 282 through 285 of the register 280. At 4/5/6 time, the AND gate 424 is tested to determine if the adder 274 is to be the source of the storage mask. This test is controlled by the output from the AND gate 414. Since the output from the AND gate 414 is a disenabling signal, the AND gate 424 does not provide an output signal. Additionally, the AND gate 412 does not provide an enabling signal to gate the contents of the bus 438 into the positions 282 through 285 by and AND gate 439.

At 8/9/0 time it is the function of the adder 274 to selectively decrement or increment the contents of the positions 288 and 289. This is accomplished in the following manner. The circuit 520 clears the contents of the positions 288 and 289 by resetting these to a zero condition as shown in line Q of FIGURE 6*a*. Thereafter, the proper input signals to set these positions to their new value are applied by the T6 or T7 gate over the bus 278. More specifically, the circuit 344, shown in line Y, respond to the output from the decoded circuit 256 and the output from the AND gate 368 to indicate a condition where the contents of the positions 288 and 289 are to be incremented. A first enabling output signal from either the AND gate 344 or the AND gate 348 is applied to the OR gate 358 for furnishing an input signal to the AND gate 524 which input signal in conjunction with a 7/8 time timing signal resets the contents of the positions 288 and 289 to zero, line Q. A second enabling output signal on a line 530 is applied to the AND gate 362. At this time and under the assumed conditions that positions 288 and 289 contain a 00, the minus 6 signal is disabled. Accordingly, the OR gate 428 generates an enabling signal on its upper output line for application to the AND gates 430 and 432. Since the plus 7 input signal from the bus 185 is available, the AND gate 430 provides an output signal to the OR gate 440. The contents of the OR gate 440 is applied by the bus 278 to the AND gate 388 in position 289. The AND gate 388 is additionally enabled by the output from the AND gate 360. Accordingly, the T7 gating signal sets a binary 1 into the position 289. The contents of the positions 288 and 289 are a binary 01 or a binary 1. The contents of the positions 288 and 289 are therefore incremented from a binary 0 to a binary 1. This ends the functioning of the adder 274.

The adder 276 is identical with the adder 274. However, as previously mentioned, either the adder 274 or the adder 276 is selected as the source of the storage mask. This storage mask was not generated in the functioning of the adder 274 because of the absence of the enabling signal from the AND gate 414. The adder 276 operates to perform the same functions as the adder 274. During 1/2/3 time it operates to indicate whether the contents of positions 286 and 287 are either 00 or 11 over a pair of lines 544 and 546 respectively. During 4/5/6 time the adder 276 operates as a source of a storage mask and at 8/9/0 time the adder 276 operates to decrement the contents of the positions 286 and 287. The use of the adder 276 is simultaneous with the use of the adder 274. Additionally, each adder can increment its input signal by 1 or can decrement its input signal by 1.

The contents of the positions 286 and 287 have been stated to be a binary 11. Accordingly, at 1/2/3 time the AND gate 398 provides an output signal to the OR gate 400. Accordingly, a minus enabling signal is available on the lower output line of the OR gate 400. This provides an enabling input signal to the AND gates 406 and 408. The minus 5 input signal from the bus 185 is a second enabling signal for the AND gate 408. In this manner the T45=11 enabling signal on the line 546 is generated by the AND gate 408.

At 4/5/6 time the AND gate 392 is furnished all of its input signals. One input from the AND gate 394, shown on line AH in FIGURE 2*b*, selects the adder 276 to furnish the storage mask. Therefore, the OR gate 400 generates an enabling signal on its lower output line for application to the AND gates 406 and 408. The minus 5 signal is avilable to the AND gate 408 which generates a signal for application to the AND gate 411 in position 285.

At 8/9/0 time the adder 276 operates to selectively decrement or increment the contents of the positions 286 and 287. This is accomplished in the following manner. The circuit 512 clears the contents of the positions 286 and 287 by resetting these to a zero condition as shown in line F of FIGURE 6*a*. Thereafter, the proper input signals to set these positions to their new value are applied by the T4 and/or T5 gate over the bus 278.

More specifically, the circuit 527, shown on line X responds to the output for the decode circuit 266 and the output from the AND gate 346 to indicate a condition where the contents of the positions 286 and 287 are to be decremented. A first enabling output signal from the OR gate 378 is applied to the OR gate 376 for furnishing an input signal to the AND gate 516 which input signal in conjunction with a 7/8 timing signal resets the contents of the positions 286 and 287 to zero, line F. A second enabling signal on the line 528 is applied to the AND gate 382. At this time and under the assumed conditions that positions 286 and 287 contain a 11, the plus 4 signal is disabled. Accordingly, the OR gate 400 generates an enabling signal on its upper output line for application to the AND gates 402 and 404. Since the minus 5 signal from the bus 185 is available, the AND gate 404 provides an output signal to the OR gate 420. The resulting signal to the OR gate 420 is applied by the bus 278 to the AND gate 386 in position 286. The AND gate 386 is additionally enabled by the output from the AND gate 384. Accordingly, the T7 gating signal sets a binary 1 into positions 286. The contents of positions 286 and 287 is a binary 10 or a binary 2. The contents of the positions 286 and 287 are therefore decremented from a binary 3 to a binary 2. This ends the functioning of the adder 276.

Referring to lines F and Q of FIGURE 6*a*, it can be seen how the contents of the positions 286 through 289 are reset during each arithmetic operation and the incremented or decremented signals are set into the respective positions 286 through 289 as shown on the lines AJ through AM. The signals shown on these lines are indicative of the incrementing of the contents of 288 and 289 from the 00 condition to the 11 condition at the simultaneous decrementing of the contents of the positions 286 and 287 from the 11 condition to a 00 condition. The exact operation is not described in detail since it is well within the skill of the art to continue the operation after an example of incrementing and decrementing has been given.

Referring to FIGURE 3*m*, there can be seen a detailed diagram of the section select register 28 and the word select register 30. The register 28 furnishes partial address indicia to the address slow path circuit 139 and the fast path circuits 142 and 143.

Input to an individual storage position 549 of the register 28 is obtained by way of a plurality of input AND gates 550, 551, and 552. The storage element of a storage position 549 is a latch-back OR circuit 553. There are as many storage positions 549 in the register 28 as there are bits on the input buses to the register 28. There are eight identical positions 549 in the register 28. Byte 1, bits 0–7 of the main data bus 16 and byte 2, bits 0–7 on the bus 141 of the decode circuit 9*a* are applied to the AND gates 550 and 551, respectively, in each of the positions 549. The remaining AND gates 552 provide entry of a restart-reset signal whenever it is desired to zero out or clear the contents of the register 28. Each of the AND gates 550, 551, and 552 is provided with its own enabling input signal. The AND gate 551 is supplied with an enabling signal from an AND gate 555. The AND gate 555 is provided with a plurality of input signals, the first of which is applied thereto on the line 556 and comprises the decode of a BRANCH AND LINK-LINK enabling signal, the second of which is applied on a line 557 and is the plus C3, 4 output signal from the decode circuit 9*b*, and the third of which is a 6/7 time timing signal from the clock circuit on a line 558. The enabling signal for the AND gate 550 is generated by a gating circuit 559. Gating circuit 559 comprises a single OR gate 560 and a plurality of input AND gates 561 through 564. The AND gate 561 is equipped with a plurality of input signals, the first one of which is an EXTERNAL WORD SELECT REGISTER 28 decode enabling signal, the second one of which is the EXTERNAL DESTINATION BYTE 1, and the third of which is the 9/0 time timing signal from the clock circuit. The AND gate 562 is equipped with a plurality of input signals, the first one of which is the BRANCH AND LINK-RETURN enabling signal, and the second one of which is the 6/7 time timing signal from the clock circuit. The AND gate 563 is equipped with a plurality of input signals, the first one of which is the 6/7 time timing signal, and the second one of which is the STORAGE RETURN SECOND CYCLE enabling signal. The AND gate 564 is equipped with a plurality of input signals, the first one of which is a 9/0 time timing signal, and the second one of which is the BRANCH enabling signal. Whenever it is desired to load the register 28 from the C2 byte of the decode circuit 9*b*, one of the input configurations to the AND gates 561–564 is satisfied. The contents of the bus 141 is gated into section select address register 28.

The register 30 is similarly constructed to the register 28. Each of the storage positions 564*a* of the register 30 comprise a latch-back OR circuit 565 and a plurality of input AND gates 566 and 567. The register 30 is responsive to the contents of byte 3 of the main data bus 16 through the AND gate 566. The AND gate 567 provides a RESTART-RESET capability to the register 30. The enabling signal for the AND gate 566 is generated by a decode circuit 568. The gating circuit 568 comprises an OR gate 569 and a plurality of input AND gates 570 and 571. The AND gate 571 is equipped with a plurality of input signals, the first of which is the minus C1, 7 signal, the second of which is the minus C1, 6 signal, the third of which is the BRANCH AND MODULE SWITCH enabling signal, and the fourth of which is the 9/0 timing signal. The AND gate 570 is equipped with a plurality of input signals, the first of which is the 9/0 timing signal from the clock circuit, the second of which is the EXTERNAL DESTINATION BYTE 3 enabling signal, and the third of which is the EXTERNAL WORD SELECT REG. 30 enabling signal. When the enumerated conditions for either of the AND gates 570 and 571 are satisfied, the output signal from the OR gate 569 causes the contents of the main data bus byte 3 to be loaded into the register 30.

circuit 580 is applied thereto by an assembler circuit 584. The assembler circuit 584 is equipped with a first series of input signals from the C1 byte, bits 0–3, and 5–7 of the register 252 as gated by an enabling circuit 586. A second series of input signals are applied to the enabling circuit 584 from the C2 byte, bits 0–3 and 5–7 from register 253 as gated by the signal from an enabling circuit 588. The bits 0, 1, and 2 input signals from the output of assembler 584 are applied as the input to the enabling circuit 580. The Zero signal is gated directly through and corresponds to the INDIRECT ADDRESS enabling signal on a line 590. The 1 and 2 signals are "anded" together to indicate the DIRECT ADDRESS enabling signals on a line 591.

TABLE A

| | Mode Identification Signals Byte C1 or C2 | | | | | Defines | Local Storage Address | | | | | | | | Minor S.D. Byte | |
|---|---|---|---|---|---|---|---|---|---|---|---|---|---|---|---|---|
| | | | | | | | 1 sector | | | | 1 Major S.D. | | | | | |
| | | | | | | | Exp. | | | | | | | | | |
| | 0 | 1 | 2 | 3 | P3 | Bits | 0 | 1 | 2 | 3 | 4 | 5 | 6 | 7 | 0 | 1 |
| Forms: | | | | | | | | | | | | | | | | |
| | | | | | | | | | | | | C1 or C2 | | | C1 or C2 | |
| A | 0 | X | X | X | X | Direct local stg. word address | 0 | P4 | P5 | P6 | P7 | 1 | 2 | 3 | 4 | 5 |
| | | | | | | | | | | | | | | C1 or C2 | C1 or C2 | |
| B | 1 | 0 | 0 | X | 0 | Indirect local stg. word address | 0 | P0 | P2 | P2 | L0 | L1 | L2 | 3Ω L3 | 4 | 5 |
| | | | | | | | | | | | | | | C1 or C2 | T4 | T5 |
| C | 1 | 0 | 1 | X | 0 | Indirect word—Indirect byte | 0 | P0 | P1 | P2 | L0 | L1 | L2 | 3Ω L3 | T6 | 7 |
| | | | | | | | | | | | | | | | C1 or C2 | |
| D | 1 | 1 | 0 | 0 | X | Special External Register Set S, P, T, L | | | | | | | | | 4 | 5 |
| | | | | | | | | | | | | | | | C1 or C2 | |
| E | 1 | 1 | 0 | 1 | 0 | Indirect local stg. Word Address | 0 | P0 | P1 | P2 | L4 | L5 | L6 | L7 | 4 | 5 |
| | | | | | | | | | | | | C1 or C2 | | | T4 or | T5 |
| F | 1 | 1 | 1 | 0 | 0 | Direct word 1—Indirect byte | 0 | P4 | P5 | P6 | P7 | 1 | 2 | 3 | T6 | T7 |
| | | | | | | | | | | | | C1 or C2 | | | T4 or | T5 |
| G | 1 | 1 | 1 | 1 | 0 | Direct word 2—Indirect byte | 0 | P4 | P5 | P6 | P7 | 1 | 2 | 3 | T6 | T7 |
| | | | | | | | | | | | | C1 or C2 | | | C1 or C2 | |
| H | 1 | X | X | X | 1 | External 8 groups of 7 words | | | P0 | P1 | P2 | 1 | 2 | 3 | 4 | 5 |
| Frame | a | b | c | d | e | | f | g | h | i | j | k | l | m | n | o |

A representative loading mechanism for the registers 28 and 30 uses the AND gates 561 and 570 to load data into these registers. This occurs during an EXTERNAL DESTINATION mode of operation completely described in a co-pending application of K. A. Bell et al., entitled "Data Handling Apparatus Employing an Active Storage Device with Plural Selective Read and Write Paths," Ser. No. 670,919, filed Sept. 27, 1967, and assigned to the assignee of the present invention. In each of these conditions, the external destination enabling signal identifies either the register 28 and/or 30 and the external destination byte control signal selects which byte from the main data bus is to be gated into the registers 28 and 30.

The output from the register 28 is conveyed by the bus 144 for transfer to the slow path circuit 139 and fast path circuits 142 and 143. The output of the register 30 is conveyed by the buses 147, 148, and 149 to the circuits 139, 142, and 143 respectively. The slow path circuit 139 comprises a first stage 574 and a second stage 575. The enabling signals for gating the address indicia from the bus 144 associated with the register 28, the bus 147 associated with the register 30, and the bus 140 associated with the register *9a*, into the first stage 574 originate in a first enabling circuit 580, shown in FIGURE 3*j*, and a second enabling circuit 582, shown in FIGURE 3*i*. The control register indicia input signal to the enabling By referring to Table A, indirect address forms B, C, and E are identified by the presence of an enabling signal on the line 590. Direct address forms A, F, and G are identified by the presence of the enabling signal on the DIRECT ADDRESS line 591.

Figure 31:
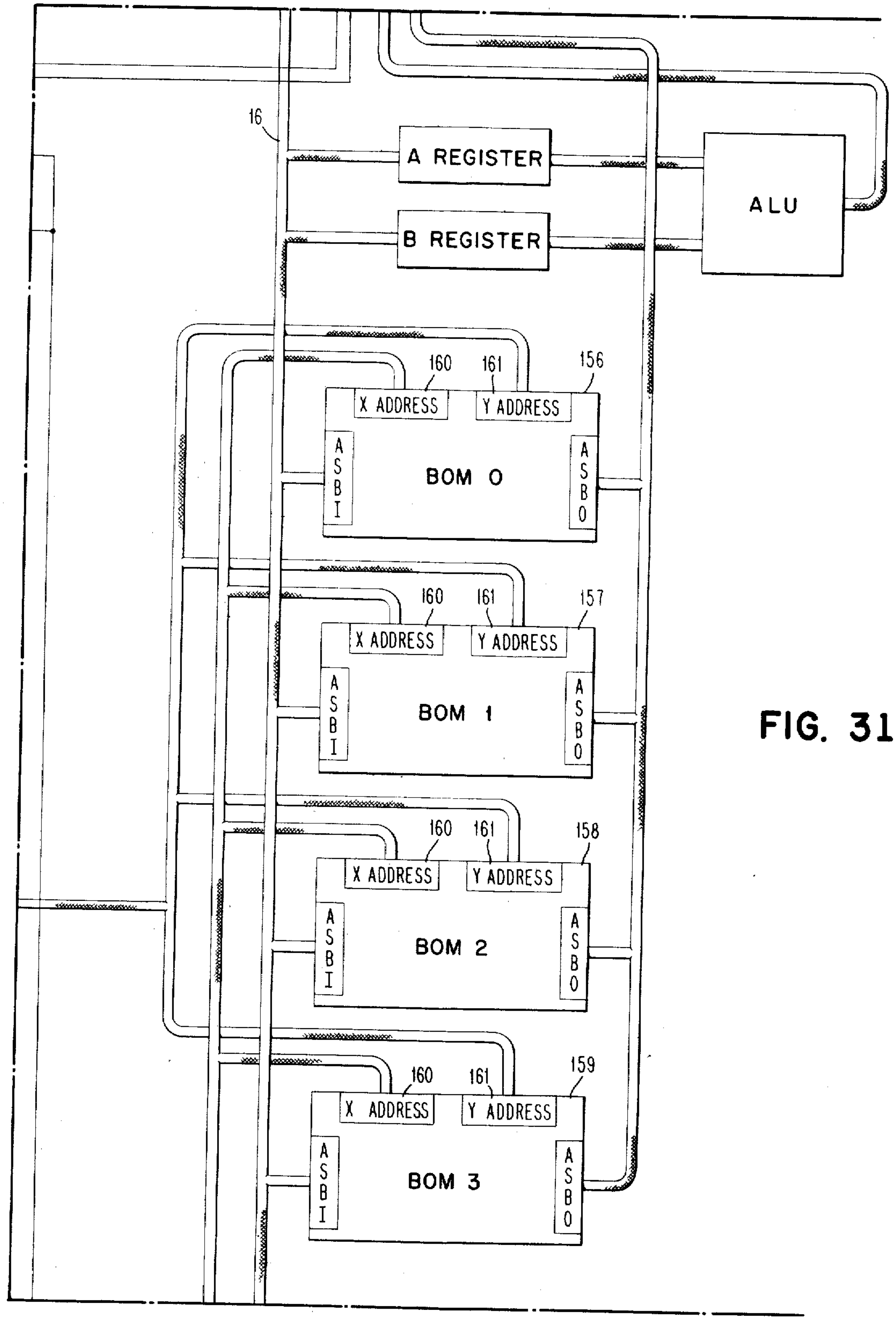

The first stage 574 of the circuit 139 comprises a plurality of OR gates and each OR gate is equipped with a plurality of AND gates. The enabling signals f.om the enabling circuits 580 and 582 gate the various combinations of input signals from the input buses 144, 147, and 140 into the second stage 575 of the circuit 139. The second stage 575 is similar to the first stage and comprises a plurality of OR gates and a plurality of AND gates feeding each of the OR gates. In this manner, more address indicia can be assembled into a final output bus for application to an X address decode circuit 592 and a Y address decode circuit 593. Each of decode circuits 592 and 593 comprises a plurality of each individual AND gates 594. The AND gates in the circuit 592 generate a first co-ordinate address selection signal. The AND gates in the circuit 593 generate a second co-ordinate address selection signal. These half-select enabling signals are applied to an X driver circuit 595 and Y driver circuit 596 by the buses 597 and 598 respectively. The output of the X drivers 595 and Y drivers 596 are applied to the X address circuit 160 and Y address circuit 161 shown in FIGURE 31.

The enabling signal for gating the information through the second stage 575 of the circuit 139 originates in an enabling circuit 599, shown in FIGURE 3*j*. A disabling signal is generated by the circuit 599 whenever the enumerated input conditions are not available. Generally, this occurs at 1–2 time of the second half of each access to active store 17. The general signal generated at 1–2 time is applied to an INVERTER circuit 600 and to an AND gate 601 in a plurality of sub-assemblers 602 through 607. The inverter 600 generates an enabling signal for application to an AND gate 608 in sub-assemblers 602 and 603 and an AND gate 609 in sub-assemblers 602 through 607. The AND gate 609 gates the address indicia from the stages 574 into the decode circuits 592 and 593. The X decode signals from the circuit 592 are applied to an AND gate 610 in each of the plurality of driver stages 611 of the Xdriver circuit 595. The Y decode signals from the circuit 593 are applied to an AND gate 612 in each of the plurality of driver stages 613 of the Y driver circuit 596.

The enabling signal to gate the contents of the buses 597 and 598 through the sub-assmbler 611 and 613 originates in a circuit 614, shown in FIGURE 3*o*. The circuit 614 comprises a pair of input AND gates 615 and 616 and an output OR gate 617. The not 1–2 timing signal is applied to the AND gate 615. The enabling 1–2 timing signal and STG 2 cy enabling signal are applied to the AND gate 616. Accordingly, at 1–2 time of the second half of a storage cycle, the circuit 614 generates an enabling signal to gate address drive signals through the AND gates 610 and 612 to each of the address circuits 160 and 161.

The driver circuit 596 comprises a plurality of driver stages 613. Each of these stages comprise a plurality of input and gates and a single output OR gate 620. The plurality of AND gates include the AND gate 612 and an additional plurality of AND gates 621 through 623 in each stage 613. Each of the AND gates 621 through 623 is the means for selecting a byte address signal for the Y address circuit 161 in each BOM 156 through 159. More specifically, the contents of the drivers 595 and 596 select an identically identified location in each of the BOM's 156 through 159.

The AND gate 621 in each of eight stages 613 is responsive to one of the possible combinations originating from a pair of decode circuits 625 and 627. There are actually four AND gates 625, each decoding one possible combination of the input signals applied thereto. The input signals applied to the AND gates 625 comprise the plus SDBO byte one bit two signal, the minus SDBO byte one bit two signal, the plus SDBO byte one bit three signal, and the minus SDBO byte one bit three signal. These signals are decoded by four AND gates 625. The output of the AND gates 625 are ANDED with the upper output, on a line 627*a*, of the circuit 627 in four AND gates 621. The output of the four AND gates 625 are ANDED with the lower output, on a line 627*b*, of the circuit 627 in the four remaining AND gates 621. The gating signal for the AND gates 621 is developed in a gating circuit 629. The gating circuit 629 identifies direct address forms F and G by a decode AND gate 630. The circuit 629 identifies direct form A by a decode AND gate 631. The AND gate 622 receives its gating signal from a gating circuit 632. The output from the circuit 632 identifies a B address form as shown in Table A. The address indicia associated with the AND gate 622 is furnished by a decode circuit 634. Four AND gates 636 decode the plus SDBO byte one, bit three signal and the plus bit three of register 30 with the four possible combinations of ±L1 and ±L2, bits 1 and 2 of register 30 respectively. Four circuits 638 provide four additional decodes of the applied input signals. Each possible combination from the eight combinations from the circuit 634 is applied to a separate AND gate 622 and is gated there by the enabling signal from the circuit 632.

The AND gate 623 receives its enabling signal from a gating circuit 640. The enabling circuit 640 identifies an E address form, as shown in Table A. The input address indicia is provided by eight AND gates 642 which decode the eight possible combinations of the input signals.

The driver circuit 595 comprises a plurality of driver stages 611. Each of the stages comprises a plurality of input AND gates and an output OR gate 644. The plurality of input AND gates include the AND gate 610 and an additional plurality of AND gates 645, 646, and 647.

While the driver circuit 596 is responsive to the address indicia as listed under the MAJOR SUBDIVISION portion of Table A, the driver circuit 595 is responsive to the address indicia as listed under the SECTOR portion of Table A.

An enabling circuit 648, shown in FIGURE 3*k*, provides a gating signal to both the AND gate 645 and the AND gate 647. The circuit 648 comprises a pair of input AND gates 649 and 650 feeding an output OR gate 651. Although the OR gate 651 generates a two-phase output signal, the plus enabling signal on a line 652 is the only signal required for the hereinafter described gating function. The AND gate 649 is furnished a plurality of input signals, the first of which is the 1–2 timing signal and the second of which is the not STORAGE 2 CYCLE enabling signal. The AND gate 650 is furnished a plurality of input signals, the first of which is the 1–2 timing signal, the second of which is the plus SDBO byte 0, bit 0 input signal, the third of which is the plus SDBO byte 0, bit 1 input signal, and the fourth of which is the minus SDBO byte 0, bit 2 input signal. The SDBO signals identify a BRANCH and LINK type control word or a WORD MOVE type control word. When the input conditions to both of the AND gates are satisfied, an enabling signal on the lower (not shown) output line of the OR gate 651 is available. When either of the input conditions to the AND gates is not satisfied, an enabling signal is available on the line 652.

The AND gate 645 receives both its address indicia and form enabling signals from a circuit 654. An AND gate 655 identifies a form A type of indirect addressing by a decode of the plus SDBO byte 1, bit 0 signal. An inspection of form A in Table A indicates that the address indicia originates from the P5, P6, or P7 storage positions of the register 28. A plurality of AND gates 656, only one of which is shown, provides three decodes of the P5 and P6 position. An AND gate 657 provides the remaining possible decode of these positions.

The AND gate 655 applies its output to an OR circuit 658 which generates two output signals, one of which is generated on an upper output line 659 and the second of which is generated on a lower output line 660. When the P7 bit is a one, an enabling signal is available on the lower output line 660. The line 660 is connected to four of the eight available AND gates 645. One of the output signals available from the AND gates 656 and 657 is applied to a different one of the same four AND gates. The four remaining AND gates 645 gate the four output signals from the AND gates 656 and 657 with the upper output signal from the OR gate 658 on the line 659.

An AND gate 661 identifies form F and G type indirect address forms by decoding the minus SDBO byte 1, bit 1 input signal and the minus SDBO byte 1, bit 2 input signal. The not selector share signal is an enabling signal indicating that a memory cycle is not being given to the selector channel.

The enabling signals from the OR gate 658 are combined with the decode of the P5 and P6 signals from the AND gates 656 and 657 to provide the SECTOR address indicia. Frames *h*, *i*, and *j* in Table A show the sources of the SECTOR address indicia. Frames *f* and *g* are available for expansion.

The AND gate 646 is used to enter sector address indicia during a WORD move operation or a BRANCH AND LINK operation. An AND gate 663 identifies these modes of operation as well as form A of the direct address forms. An AND gate 664 provides a portion of the sector address indicia from the SDBO byte 1, plus and minus bits 5 and 6. There are four AND gates 664. The remaining third sector address bit indicia is combined with its form enabling signal to generate either of the two phase output signals from an OR gate 665. Each output from the OR gate 665 is gated with the four outputs from the AND gates 664 to give the eight address bits.

An AND gate 666 identifies form E and also gates the L4 signal on a line 667. An AND gate 668 identifies forms F and G and gates the SDBO byte 1, bit 7 signal on a line 669. An AND gate 670 identifies the forms B and C and gates the L0 bit on a line 671. An AND gate 672 identifies form A and gates the SDBO byte 1, bit 7 signal on a line 673.

The AND gate 647 is the entry means for forms B, C, and E of the indirect address forms. A first enabling signal is generated by the circuit 648. The address indicia is principally furnished by four AND gates 675 which generate a decode of the plus and minus P1 and P2 bits. An AND gate 676 identifies form E and gates the L4 signal to an OR gate 677. Again, this OR gate 677 generates a pair of output enabling signals, each of which is gated with the four output signals from the AND gates 675. An AND gate 678 identifies forms B and C and gates the L0 signal, on a line 679, to the OR gate 677.

Figure 4:
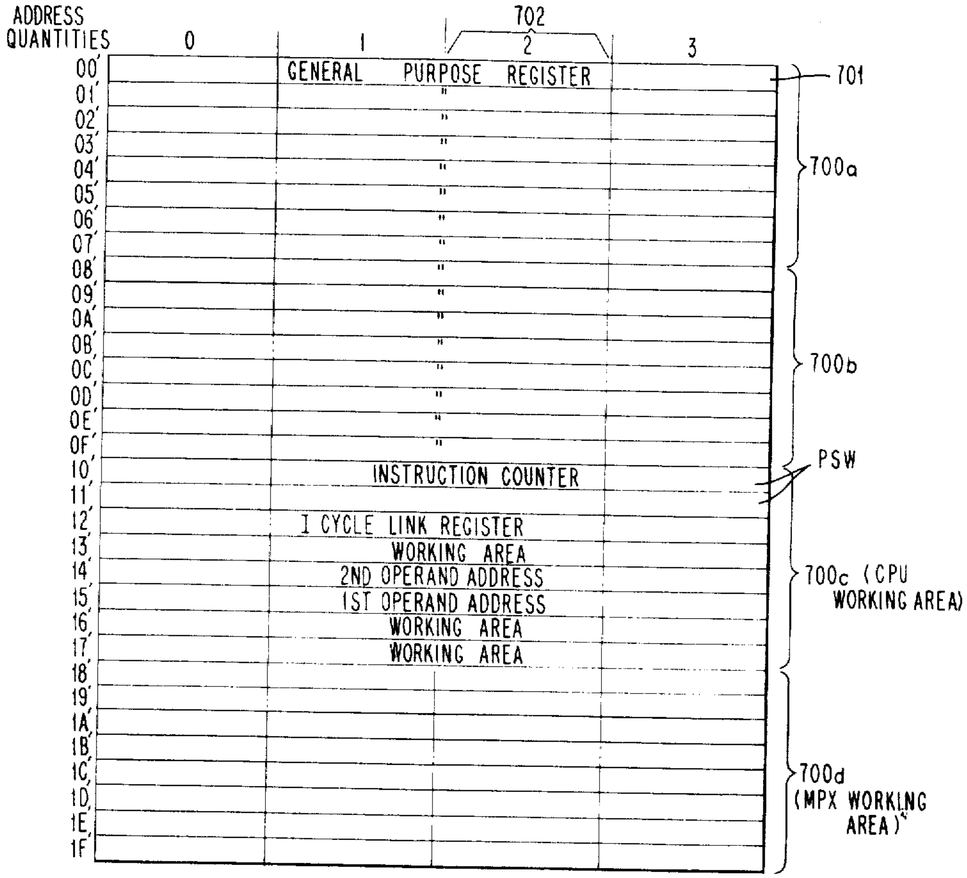
FIGURE 4 shows operation assignments of the registers in the active storage circuit shown in FIGURE 1.

The indirect byte operating mode begins under a plurality of assumed conditions. The first such condition is that the machine has completed instruction cycles during which the instruction address has been updated and placed into its corresponding instruction register at address location 10′ in the active storage circuit 17. A storage map of the active storage circuit 17 is shown in FIGURE 4. Address locations in the active storage area 17 are identified by numbers raised to the prime to prevent confusion with similarly numbered circuits. The first operand address and the second operand address have been similarly constructed and placed into their respective locations 15′ and 14′ in local storage. Obviously, this is an op code which uses a first and a second operand. For purposes of this discussion, it is assumed that the present op code is an EXCLUSIVE OR op code and that the results are placed into the B SOURCE or first operand working area 16′.

Referring again to FIGURE 4, there is shown a layout of the active storage circuit 17. Each of the addressable locations is given a permanently assigned storage function. This function may be absolutely permanent as to the information stored therein. For example, addressable location 14′ always contains address information. In other locations such as 13′, 16′, or 17′, the function may be permanent insofar as these locations are used as working areas, yet the information held therein is constantly changing as to format and appearance.

In response to the decoding of each op code and more specifically the decoding of the EXCLUSIVE OR op code, an address quantity is loaded into the register 28 by a control word over a bus 141 or by the MDB 16, as shown in FIGURE 3*m*. This address quantity can in fact be divided into portions and each portion identifies a separate sector 700 of the active storage unit 17. The active storage unit employed in the instant invention comprises sixty-four major sub-divisions or words 701 and each major sub-division comprises four minor sub-divisions or bytes 702. The major sub-divisions are joined together to form a plurality of sectors, only four of which are shown, 700*a* through 700*d*, and it is this sector identifying indicia which is loaded into portions of the register 28.

The second register 30 is also loaded with address quantities by the MDB 16 which identify major sub-divisions within a sector. Minor sub-division address indicia is available from the immediate control word or from sutable portons of the crcuit 19. A selection mechanism, 142 and 143, shown in FIGURES 3*k* and 3*o*, responsive to the immediate control word, operates to select among the various sources of address indicia. A further variable which selects between available address indicia is the timing signals which identify the A SOURCE address indicia and the B SOURCE address indicia. More specifically, the further selection by the timing signals is directed to the simultaneous availability of distinct groups of address signals and the selection among the groups by a timing signal. Table A is a concise representation of the various address forms which address the active storage circuit 17.

Returning to a first mode of operation of the instant invention, the first task is to load address information into the registers 28 and 30. These registers are shown divided into equal portions, but this is not a limitation on the operation of the invention. Any other manner of division can be assigned. Although the immediate following example only employs the register 28, the loading paths for both registers is described.

Referring to line A of Table A, there is shown the first address form. The register 28 comprises eight binary bit positions and each position is identified as P0 through P7 respectively. Positions P4 through P7 are loaded with address indicia equal to a hexadecimal two 0010 to point to the sector 700*c* of addresses 1–0 through 1–7. Simultaneously, the high order portion of the register 28 can be loaded to hold separate address information. Referring to line B of Table A, positions P0 through P2 can be loaded with a binary zero (000) to point to the sectors 700*a* and 700*b* having addresses 0–0 through 0–7 and 0–8 through 0–F respectively. In those situations where less than a full hexadecimal address is generated, the high order portion is reset to a zero because of the set/reset of the address register stages occurring just prior to the addressing of active storage 17. The P3 bit is used as an enabling signal which identifies, along with portions of the registers 252 and 253 which mode of indirect addressing is to be executed.

Referring to lines C and E of Table A, the use of the register 30 is demonstrated. The register 30 comprises eight binary bit positions identified as L0 to L7. The use of the high order three P bits to select two contiguous sectors has been explained. The L bits are employed to identify a major sub-division within the selected sector. Again the register 30 is loaded with a pair of hexadecimal digits, a first digit including L0, L1, L2, and L3 identify a first major sub-division while a second digit including L4, L5, L6, and L7 identify a second major sub-division. A further variation can be seen in lines B and C wherein the L3 bit is further modified by "ORing" or combining it with a further bit from the decode register 9*a*.

The register 19 comprises eight binary bit positions identified as T0 through T7. Only a portion of this register participates in the addressing modes. More specifically, bits T4 and T5 together are used in one type of addressing and this type is further identified as concerned with A SOURCE addressing. Bits T6 and T7 together are used in a second type of addressing and this type is further identified as concerned with B SOURCE addressing. A complete description of the addressing capabilities of the register 19 is given by K. A. Bell et al. in their previously mentioned U.S. patent application.

Figure 5A:
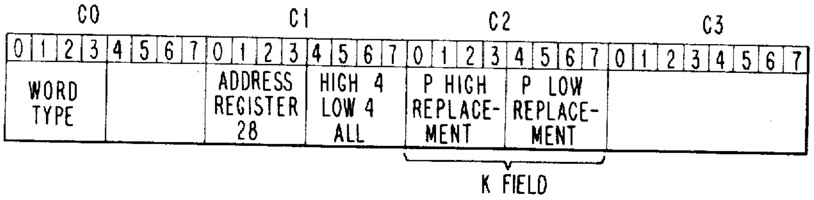
FIGURES 5*a* through 5*c* show the formats of various control words used herein.

The register 28 is loaded by the constant (K) field of a CONTROL WORD appearing on the bus 141. More specifically, this CONTROL WORD is of the type known as a BRANCH AND LINK word and the format of this word is shown in FIGURE 5*a*. The contents of this K field are loaded one bit per AND gate 551, shown in FIGURE 3*m*, into the latched OR circuits 553 by an enabling signal originating in a gating circuit 555. The register 30 is loaded from the MDB 16, byte three, bits 0–7, through the AND gates 566 and the enabling signal originating from a gating circuit 568. The actual input signals to the circuits 555 and 568 are not a limitation on the present invention since they, as well as most other identification signals, would differ and be dictated by the design of the system. It should be sufficient, that in response to the decoding of an op code by the decode circuit 9*b*, a predetermined storage word is read from the control storage portion 4 of main memory 2 from which a K field portion is loaded into the registers 28 and 30 as the op code requires. Normally, separate control words load the registers 28 and 30 because the K field is only eight bits in capacity, equalling the storage capacity of one of the registers 28 or 30.

Figure 5B:
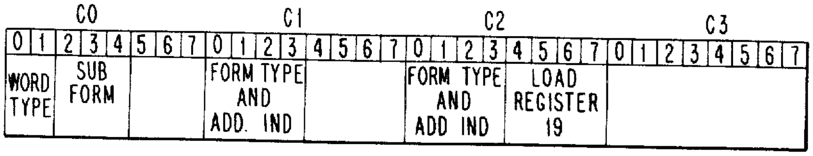

The contents of location 14′ in the active storage circuit 17 are transferred to the register 40 over the following path shown in FIGURE 2. The ASBO 164 provides the exit from active storage 17. The address then proceeds over the bus 91, through the assemblers 12 and 14 onto the MDB 16. The MDB 16 is an input to the subassemblers 130 and 131 which in turn form an input to the register 40. A suitable storage control word is shown in FIGURE 5*b* for controlling this operation. This storage word is identified by the bit 0 and 1 positions of the C0 byte. The sub-form of the word is identified by the bits 2, 3, and 4 of the same byte. The next significant data is located in the C1 byte bit positions 0 through 3. By inspection of Table A, form A, frame *a*, the bit located therein must be a zero to gate the address of frames *f* through *o* to their respective circuits. The gating is performed by the AND gates 631 and 655 in the fast path assemblers 142 and 143 shown in FIGURES 3*k* and 3*o*. These AND gates gate the P5, P6, P7 bits and the C1 byte, bits 1, 2, and 3 to the driver circuits 595 and 596 respectively.

During the first portion of a Storage Word Cycle, two important functions are performed. Means are provided for immediately decoding by the fast path circuits 142 and 143 the control word read from the control storage circuit 4. This is accomplished by decoding from the output of the assembler 8 rather than waiting until the same information is latched up in the decode circuit 9*b*. Means are provided for decoding the relative address indicia for accessing the pre-determined location 15′ in the active storage circuit 17 and transferring the first operand address indicia to the register 40.

Means are provided for using the contents of the register 40 to address main store and interrogate the word located therein and place it into the assembler 8.

Means are also provided for taking the contents of the storage data bus out of the assembler on the bus 67 and placing it into an active storage location 16′ as directed by the contents of the P4, P5, P6 bits and the C2 byte, bits 1, 2, and 3.

The identification of the address type as form A from Table A and its resulting gating of the P4, P5, and P6 bits and the C1 byte, bits 1, 2, and 3 is performed by decode circuits 142 and 143 shown in FIGURES 3*k* and 3*o*. A plurality of standard decoding techniques can be employed for using the P4, P5, and P6 bits to identify a sector 700*c* and for using the C1 byte, bits 1, 2, and 3 of the current Storage Control Word to identify a major sub-division in that sector.

Each byte is read from a respective BOM 156 through 159 and placed on the bus 91. Suitable gating is accomplished in the assemblers 12 and 14 to route bytes 1, 2, and 3 of the second operand address into units 125, 126, and 127 of the register 40. The units 125, 126, and 127 together comprise a plurality of address bits.

A predetermined group of low order bits are not employed for accessing main memory. The remaining address bits are sufficient for accessing a unit of information while the low order bits are transferred to respective locations in the register 19 for use subsequently for addressing subunits of the infomation read from main memory. In the present embodiment, the two low order address bits are transferred to storage units 288 and 289 over a bus 296 and AND gates 298 and 300. The unit or word of information addressed by the remaining portion of the register is transferred to the first operand working area 16′ in storage 17.

During the second half of the storage control cycle, two major functions are performed. Means are provided for storing the data just interrogated from the main storage device 2 into a predetermined location 16′ in the active storage circuit 17. Secondly, the two low order bits, 6 and 7, of unit 127 of the register 40 are set into their respective locations 288 and 289 of the register 19. The selection and storage into location 16′ is controlled by the C2 byte, bits 0–3 of the current STORAGE word. The selection of the C2 byte information is made by a circuit 710, shown in FIGURE 3*i*, having an input AND gate 711 active. An AND gate 712 is now equipped with an enabling 1–2 time timing signal and an enabling not selector share signal. The AND gate 712 being active provides an input to the OR gate 588 for gating the C2 byte onto the bus 140. The output of the assembler 710 acts to apply bit 0 to an AND gate 714*a* to generate a further gating signal and the bits 1 and 2 to an AND gate 714*b*. Bit 3 is applied to an AND gate 715 shown in FIGURE 3*n*. These bits identify the selected form as well as provide the major sub-division address as shown in forms A, F, G, and H. The AND gates 714*a* and 714*b* form inputs to an OR gate 716. The OR gate has an enabling signal on its upper output line 590 when neither of its input conditions are satisfied. The OR gate generates an enabling signal on its lower output line 591 when either of its input conditions are satisfied. The enabling signal on the line 591 provides the gating signal to identify direct address forms A, F, and G. The enabling signal on the line 590 provides the gating signal to identify indirect address forms B, C, and E. The logic in the first stage 574 operates in a similar manner described for the fast paths 142 and 143 to decode the various input signal from the registers 28, 30, and 9*a*.

The address thus formed in the first stage 574 is decoded by the decode circuits 592 and 593 and selects location 16′ in the active storage circuit 17. The word available on the MDB 16 is stored in the location specified by the decode circuits 592 and 593.

The loading of positions 288 and 289 is controlled by the C2 byte, bits 4–7. The AND gate 306 shown in FIGURE 3*a* decodes the corresponding field C2, bits 4, 6, and 7 and generates an enabling signal for activating the AND gate 322, which in turn enables the AND gates 298 and 300 in the storage positions 288 and 289 to gate the low order address bits in these storage locations. Simultaneously, the OR gate 308, and AND gate 312 produces a disabling input signal at the AND gates 502 in each position 282 through 285 thereby causing a reset to the binary zero condition of these positions.

The next sequential Storage Control Word again employs form A in the C1 and C2 byte positions in the manner as previously described with reference to the handling of the retrieving of the field of the first operand. The operation of the current control word is identical with that just described. More specifically, a current control word accesses the second operand location 14′ in the active storage 17, reads out the address indicia located therein for transfer to the register 40. Using the contents of the register 40, the main storage circuit 2 is accessed and the first field of the second operand is placed on the main data bus 16 after gating through the various assemblers. Now using the C2 byte, bits 0–3, the active store is accessed and the contents of the main data bus are written in to working area 17′. Simultaneously with the storing of the data bus contents into active storage location 17′, the control indicia located in C2 byte, bits 4–7 now load the information from the bit 6 and 7 storage positions of the register 40 into storage locations 286 and 287 of the register 19. The AND gate 302 decodes the corresponding field of the C2 byte, bits 4, 6, and 7, and generates an enabling signal on the line 320 for application to the AND gate 318. The output of the AND gate 318 gates the contents of the AND gates 298 and 300 into the positions 286 and 287 of the register 19.

In review, the two fields which enter into the exclusive OR operation are now set up in working areas 16' and 17' of the active storage circuit 17. When these fields are retrieved from main storage, they are retrieved a unit at a time. No distinction is made between the beginning of one field and the ending of a contiguous field. More specifically, the data in either or both of the fields which participates in the present exclusive OR operation may begin at any sub-unit of the unit of information transferred from main storage 2. The contents of the register 19 specifies the sub-unit of information at which the exclusive OR operation is to be performed on both the first operand and the second operand words. This information is generated during instruction cycles and placed into the first operand and second operand locations 15' and 14' respectively and is transferred to the register 19 from the register 40. Accordingly, the arithmetic operation performing the exclusive OR operation indirectly addresses the sub-unit of each operand which participates in the exclusive OR function.

Referring to Table A, forms F and G, there is shown direct word indirect byte address form advantageously employed for use with working areas 16' and 17' specifically. Address form F corresponds to location 16' and address form G corresponds to location 17'. Referring to frames *n* and *o* of forms F and G, it is observed that T4 and T5, or T6 and T7 perform the sub-unit or byte selection of the fields participating in the exclusive OR function.

Figure 5C:
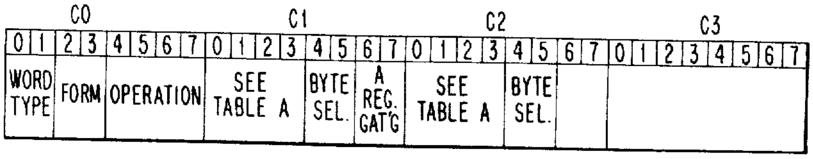

The arithmetic control word is of the type shown in FIGURE 5*c*. The access of the active storage location 16' is begun by a decode of the byte C1 position of the arithmetic word and the identification of the form F address form. The first access and the loading of the B register 23 is accomplished by the fast path gating circuits 142 and 143 previously described wherein the P5, P6, P7 positions of the P register and the C1 byte, bits 1, 2, and 3 address local store, read out the full word contained in location 16'. This word is transferred by the bus 91 to the unit assembler 12. Appropriate gating signals are available on the bus 98 for gating the selected sub-unit or byte of information to the B register 23. During the second half of the arithmetic cycle the slow path gating circuit is used to develop the address of the location 17'.

A second often-encountered machine operation is now employed to illustrate additional combinations of the instant invention for addressing major sub-divisions and minor sub-divisions in the active storage circuit 17. A MOVE OP is commonly encountered in a data processing system wherein the contents of one register is moved into another register. The registers participating in the transfer are identified. One is interrogated and its contents are transferred to the remaining register. The transfer path is immaterial to the present invention as it is primarily concerned with an improved mechanism for addressing the two registers.

During INSTRUCTION CYCLES concerning a MOVE OP, operand addresses are not generated since there is no access to the main storage circuit 2. In substitution thereof, the addresses or other identifying indicia of the two registers involved in the MOVE OP are placed in the register 30 by the main data bus 16. As an alternative to address indicia for identifying the participating registers, register numbers can be employed. More specifically, most data processing systems employ a plurality of general-purpose registers. For example, in a data processing system employing sixteen general-purpose registers, these registers are number zero to F (0000 to 1111) in hexadecimal notation. These registers are shown in sections **700*a* and 700*b* in FIGURE 4. Using a BRANCH and LINK control word as mentioned earlier, the register 28 is loaded with a 000 in positions P0, P1, and P2 over the bus 141 and the AND gates 551**.

The next control word is an arithmetic control word of the type shown in FIGURE 5*c*. The C1 byte of this arithmetic control word is decoded into a FORM E address form as shown in Table A. As in all other control words which occur, the first access to active storage circuit 17 is made through the fast path circuits 142 and 143. A decoding of the C1 byte by circuits 640 and 676 shown in FIGURES 3*k* and 3*o* provide the enabling inputs to the Y drivers 596 and the X drivers 595. An inspection of form E in Table A indicates the first group comprising P1, P2, and L4 select the sector while the second group L5, L6, and L7 selection the major sub-division within that sector. The first group is decoded by the circuit 675 and the AND/OR circuit 676 and 677. The second group is decoded by the AND gates 642.

In the selected MOVE OP code, the contents of the register addressed by the fast path circuits 142 and 143 are moved one sub-unit at a time. This step is followed since the transfer path includes the ALU 25 which is only one sub-unit in capacity. Byte selection is completely described in the previously mentioned K. A. Bell application.

In the subsequent arithmetic operation, form B identifying indicia is contained in the C2 byte. The enabling or form recognition signals are generated by the AND gates 632 and 678. The L1, L2, and L3 address indicia are decoded by the circuits 636 and 638. The P1, P2, and L0 address indicia are decoded by the AND gates 675 and 678.

This last-mentioned address indicia select the register into which the data is to be moved. The ALU is activated to ADD zero to the contents of B. The output of the ALU is placed on the bus 36. Byte selection is employed to move one byte to its selected destination. An additional three arithmetic control words are performed to move the remaining three bytes of data into the desired register. The address slow path circuit 139 shown in FIGURES 3*j* and 3*n* handles the same forms as the paths 142 and 143.

While the invention has been particularly shown and described with reference to a preferred embodiment thereof, it will be understood by those skilled in the art that various changes in form and details may be made therein without departing from the spirit and scope of the invention.

What is claimed is:

1. An electronic digital computing apparatus comprising,
   - a main data store having a plurality of separate storage positions and a fixed number of positions are combined into data storage units and each of said data storage units are further sub-divided into a plurality of sub-units and certain of said storage units being employed for storing microprogram control words and first signal controlled selection means for rendering any chosen one of said data storage units accessible and second signal controlled means for writing into any sub-unit storage position,
   - a secondary data store having a plurality of separate storage positions and a fixed number of positions are combined into a plurality of data storage units and said storage units are arranged into a plurality of sections and each unit comprises a plurality of sub-units and certain of said sub-units being employed for storing address indicia and third signal controlled selection means for rendering any chosen one of said data storage units accessible, transfer means including sub-unit selection means and a gated input circuit being intermediate said secondary data store and said main data store,
an arithmetic logic unit responsive to said transfer means for manipulating data applied therefrom,
a sub-unit identification means,
fourth signal controlled means responsive to said transfer means and said sub-unit identification means for writing a sub-unit of data into a location of said secondary data store identified by said sub-unit identification means,
said third signal controlled selection means comprising,
a first register responsive to said transfer means and being employed for storing address indicia to identify a section of unit storage positions,
a second register responsive to said transfer means and being employed for storing address indicia to identify a unit of data within said section identified by said first register,
a first address decode circuit responsive to said first register,
a second address decode circuit responsive to said second register, and
control means for gating said first register to said first decode means and for gating said second register to said second decode means.

2. An electronic digital computing apparatus comprising,
a main data store having a plurality of separate storage positions and a fixed number of positions are combined into data storage units and each of said data storage units are further sub-divided into a plurality of sub-units and certain of said storage units being employed for storing microprogram control words and first signal controlled selection means for rendering any chosen one of said data storage units accessible and second signal controlled means for writing into any sub-unit storage position,
a secondary data store having a plurality of separate storage positions and a fixed number of positions are combined into a plurality of data storage units and said storage units are arranged into a plurality of sections and each unit comprises a plurality of sub-units and certain of said sub-units being employed for storing address indicia and third signal controlled selection means for rendering any chosen one of said data storage units accessible,
transfer means including sub-unit selection means and a gated input circuit being intermediate said secondary data store and said main data store,
an arithmetic logic unit responsive to said transfer means for manipulating data applied therefrom,
a sub-unit identification means,
fourth signal controlled means responsive to said transfer means and said sub-unit identification means for writing a sub-unit of data into a location of said secondary data store identified by said sub-unit identification means,
said third signal controlled selection means comprising,
a first register sub-divided into portions and responsive to said transfer means and each of said portions being employed for storing address indicia to identify a section of unit storage positions,
a second register sub-divided into groups and responsive to said transfer means and each of said groups being employed for storing address indicia to identify a sub-unit of data within a section identified by a portion of said first register,
a first address decode circuit responsive selectably to said portions of said first register,
a second address decode circuit responsive selectably to said groups of said second register, and
first control means for selecting between said portions for application to said first decode circuit and for selecting between said sections for application to said second decode circuit and responsive to said microprogram control words.

3. The combination as recited in claim 2 wherein said sub-unit identification means comprises,
a first storage means responsive to said transfer means for storing the sub-unit identification portion of said address indicia,
means responsive to said first storage means for identifying the sub-unit of data being processed and for storing identification indicia for controlling the writing of said processed sub-units into said secondary data store.

4. The combination as recited in claim 3 wherein said transfer means further includes a gating input means responsive to said identified circuit accessed by said third signal controlled selection means for receiving a plurality of data sub-units and responsive to said first storage means for selecting one sub-unit for gatable passage to said arithmetic logic unit.

5. The combination as recited in claim 3, and further including,
second control means responsive to sub-unit identification indicia for generating sub-unit select control signals,
said transfer means further includes a second gating input means responsive to said output of said arithmetic logic unit and said sub-unit select control signals for applying said processed sub-unit to said fourth signal controlled means.

6. The combination as recited in claim 1, wherein said sub-unit identification means includes first means for identifying a plurality of sub-units of data in a unit which are processed on successive cycles of said arithmetic logic unit and
said second signal controlled means is responsive to said immediately above-mentioned first means for writing into only those sub-unit positions having been processed.

7. An electronic digital computing apparatus comprising,
a main data store having a plurality of separate storage positions and a fixed number of positions are combined into data storage units and each of said data storage units are further sub-divided into a plurality of sub-units and certain of said storage units being employed for storing microprogram control words and certain of said control words contain first address indicia and first signal controlled selection means for rendering any chosen one of said data storage units accessible and second signal controlled means for writing into any sub-unit storage position,
a secondary data store having a plurality of separate storage positions and a fixed number of positions are combined into a plurality of data storage units and said storage units are arranged into a plurality of sections and each unit comprises a plurality of sub-units and certain of said sub-units being employed for storing second address indicia and third signal controlled selection means for rendering any chosen one of said data storage units accessible,
first transfer means including sub-unit selection means and an input circuit being intermediate said secondary data store and said main data store,
an arithmetic logic unit responsive to said transfer means for manipulating data applied therefrom,
a sub-unit identification means,
fourth signal controlled means responsive to said transfer means and said sub-unit identification means for writing a sub-unit of data into a location of said secondary data store identified by said sub-unit identification means,
second transfer means responsive to said first signal controlled selection means for conveying said first address indicia,
said third signal controlled selection means comprising, a first register responsive to said transfer means and being employed for storing address indicia to identify a section of unit storage positions, a second register responsive to said transfer means and being employed for storing address indicia to identify a sub-unit of data within said section identified by said first register, a first address decode circuit having a first input circuit responsive to said first register and a second input circuit responsive to said second transfer means, a second address decode circuit having a first input circuit responsive to said second register and a second input circuit responsive to said second transfer means, and control means for selecting between said first register and second transfer means as a source of address indicia for said first decode means and for selecting between said second register and said second transfer means as a source of address indicia for said second decode circuit.

References Cited

UNITED STATES PATENTS

| | | | |
|---|---|---|---|
| 3,350,695 | 10/1967 | Kaufman et al. | 340—172.5 |
| 3,337,851 | 8/1967 | Dahm | 340—172.5 |
| 3,311,887 | 3/1967 | Muroga | 340—172.5 |
| 3,290,656 | 12/1966 | Lindquist | 340—172.5 |
| 3,248,702 | 4/1966 | Kilburn et al. | 340—172.5 |

GARETH D. SHAW, Primary Examiner